US012727599B2

(12) United States Patent
Amselem et al.

(10) Patent No.: US 12,727,599 B2
(45) Date of Patent: Sep. 8, 2026

(54) USE OF CYCLODEXTRINS AS AGROCHEMICAL DELIVERY SYSTEM

(71) Applicant: Adama Makhteshim Ltd., Beer Sheva (IL)

(72) Inventors: Shimon Amselem, Rehovot (IL); Lital Koren, Ness Ziona (IL); Tamás Sohajda, Halásztelek (HU); Zoltán Fülöp, Budapest (HU); István Puskás, Budapest (HU)

(73) Assignee: ADAMA MAKHTESHIM LTD., Beer Sheva (IL)

( * ) Notice: Subject to any disclaimer, the term of this patent is extended or adjusted under 35 U.S.C. 154(b) by 117 days.

(21) Appl. No.: 18/814,882

(22) Filed: Aug. 26, 2024

(65) Prior Publication Data

US 2025/0057161 A1 Feb. 20, 2025

Related U.S. Application Data

(63) Continuation of application No. 17/288,384, filed as application No. PCT/IB2019/059146 on Oct. 24, 2019, now Pat. No. 12,127,559.

(Continued)

(51) Int. Cl.

| | |
|---|---|
| ***A01N 43/38*** | (2006.01) |
| ***A01N 33/18*** | (2006.01) |
| ***A01N 43/56*** | (2006.01) |
| ***A01N 43/88*** | (2006.01) |
| ***A01N 47/14*** | (2006.01) |
| ***A01N 47/40*** | (2006.01) |
| ***A01P 3/00*** | (2006.01) |

(Continued)

(52) U.S. Cl.
CPC ............ *A01N 43/38* (2013.01); *A01N 33/18* (2013.01); *A01N 43/56* (2013.01); *A01N 43/88* (2013.01); *A01N 47/14* (2013.01); *A01N 47/40* (2013.01); *A01P 3/00* (2021.08); *A01P 7/04* (2021.08); *A01P 13/00* (2021.08)

(58) Field of Classification Search
CPC ........ A01N 43/38; A01N 33/18; A01N 43/56; A01N 43/88; A01N 47/14; A01N 47/40; A01P 3/00; A01P 7/04; A01P 13/00
See application file for complete search history.

(56) References Cited

U.S. PATENT DOCUMENTS

2012/0149564 A1 6/2012 Tam
2021/0386067 A1 12/2021 Amselem

FOREIGN PATENT DOCUMENTS

CN 1040987 A 4/1990
CN 1425291 A 6/2003

(Continued)

OTHER PUBLICATIONS

Apr. 29, 2022 Search Report issued by the China National Intellection Property Administration in connection with Chinese Application No. 201980070445.8.

(Continued)

*Primary Examiner* — Trevor Love
(74) *Attorney, Agent, or Firm* — Gary J. Gershik

(57) ABSTRACT

The present invention relates pesticidal complexes, pesticidal delivery systems and compositions, as well as processes of preparation and uses thereof. The present invention also relates to the use of cyclodextrins for increasing biological activity and improving uptake, penetration, retention and/or bioavailability of agrochemicals such as pesticides.

20 Claims, 9 Drawing Sheets

Related U.S. Application Data

(60) Provisional application No. 62/749,992, filed on Oct. 24, 2018.

(51) Int. Cl.
*A01P 7/04* (2006.01)
*A01P 13/00* (2006.01)

(56) References Cited

FOREIGN PATENT DOCUMENTS

| | | | |
|---|---|---|---|
| CN | 1425292 | A | 6/2003 |
| CN | 1425293 | A | 6/2003 |
| CN | 1443449 | A | 9/2003 |
| CN | 101019531 | A | 3/2007 |
| CN | 101401572 | A | 9/2008 |
| CN | 103125497 | A | 12/2012 |
| CN | 103404512 | A | 7/2013 |
| CN | 114304143 | A | 12/2021 |
| DE | 19751631.9 | | 5/1999 |
| DE | 102015217762.9 | | 3/2017 |
| EP | 0579435 | B1 | 3/1999 |
| EP | 2848122 | A1 | 3/2015 |
| WO | WO 90/02141 | | 3/1990 |
| WO | WO 91/04026 | | 4/1991 |
| WO | WO 2005/039287 | | 5/2005 |
| WO | WO 2014/085518 | | 6/2014 |
| WO | WO 2017/137351 | A1 | 8/2017 |

OTHER PUBLICATIONS

May 9, 2022 First Office Action issued by the China National Intellection Property Administration in connection with Chinese Application No. 201980070445.8 (including English translation).
Mar. 1, 2023 Second Office Action issued by the China National Intellection Property Administration in connection with Chinese Application No. 201980070445.8 (including English translation).
May 30, 2023 Decision of Rejection issued by the China National Intellection Property Administration in connection with Chinese Application No. 201980070445.8 (including English translation).
May 6, 2023 Response to Preliminary Office Action filed with the Brazilian Patent Office in connection with Brazilian Application No. BR 11 2021 007498 8 (including English translation).
Search Report issued by the Russian Patent Office in connection with Russian Application No. 2021113881/10.
Office Action issued by the Russian Patent Office in connection with Russian Application No. 2021113881/10.
Dec. 24, 2021 Response to Communication pursuant to Rule 161-162 EPC issued by the European Patent Office in connection with European Application No. 19795353.2.
Olah, J. et al. "β-Cyclodextrin enhanced biological detoxification of industrial wastewaters." Water Research, vol. 22, No. 11, Nov. 1988, pp. 1345-1351 (abstract attached).
Yu, C. et al. "Inclusion Complexes of γ-Cyclodextrin with Pendimethalin." Chemical Journal of Chinese Universities, vol. 36, No. 2, Feb. 2015, pp. 306-309 (including English abstract).
International Search Report issued Jan. 17, 2020 in connection with PCT International Application No. PCT/IB2019/059146.
Written Opinion (form PCT/ISA/237) issued Jan. 17, 2020 in connection with PCT International Application No. PCT/IB2019/059146.
Garrido, E.M. et al. "Molecular Encapsulation of Herbicide Terbuthylazine in Native and Modified [beta]-Cyclodextrin." Journal of Chemistry, vol. 2017, Jan. 1, 2017, pp. 1-9.
Fernandes, C. et al. "Influence of Hydroxypropyl-[beta]-Cyclodextrin on the Photostability of Fungicide Pyrimethanil." International Journal of Photoenergy, vol. 2014, Jan. 1, 2014, pp. 1-8.
Sharma, N. and Baldi, A. "Exploring versatile application of cyclodextrins: an overview." Drug Delivery, vol. 23, No. 3, Jul. 22, 2014, pp. 729-747.
Yanez, C. et al. "Cyclodextrin Inclusion Complex to Improve Physicochemical Properties of Herbicide Bentazon: Exploring Better Formulations." PLOS ONE, vol. 7, No. 8, Aug. 27, 2012, p. e41072.
International Preliminary Report on Patentability issued Apr. 27, 2021 in connection with PCT International Application No. PCT/IB2019/059146.

Native-neutral Cyclodextrins

Fig. 2 Beta cyclodextrin derivatives
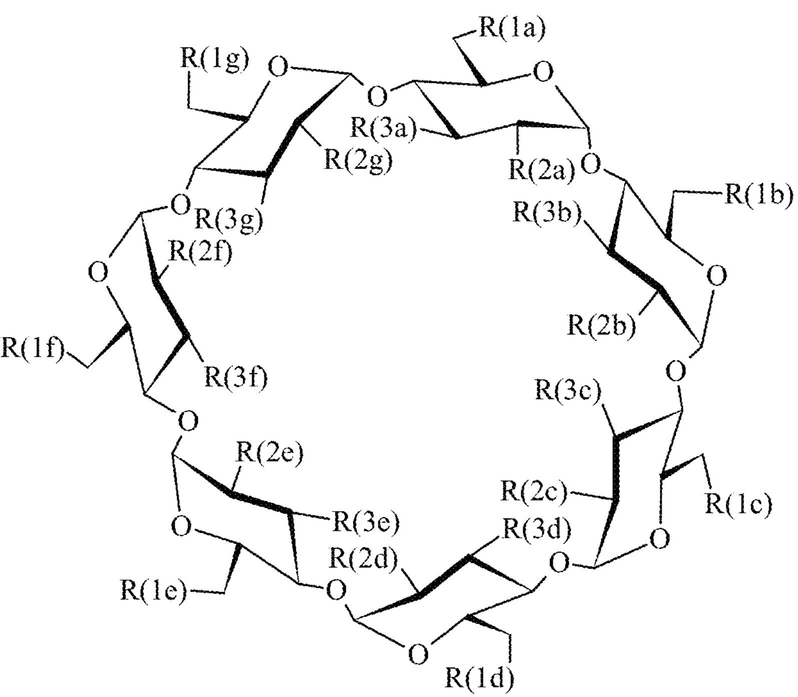
R(1a-f), R(2a-f), R(3a-f) is independently -OH or $-O-CH_2-CH(OH)-CH_3$ (2-hydroxypropyl beta cyclodextrin)
R(1a-f), R(2a-f), R(3a-f) is independently -OH or $-O-CH_2-CH_2-CH_2-CH_2-SO_3Na$: (sulfobutyl ether beta cyclodextrin)
R(1a-f), R(2a-f), R(3a-f) is independently -OH or $-O-CH_3$ (methyl beta cyclodextrin)

Fig. 3 Gamma cyclodextrin derivatives
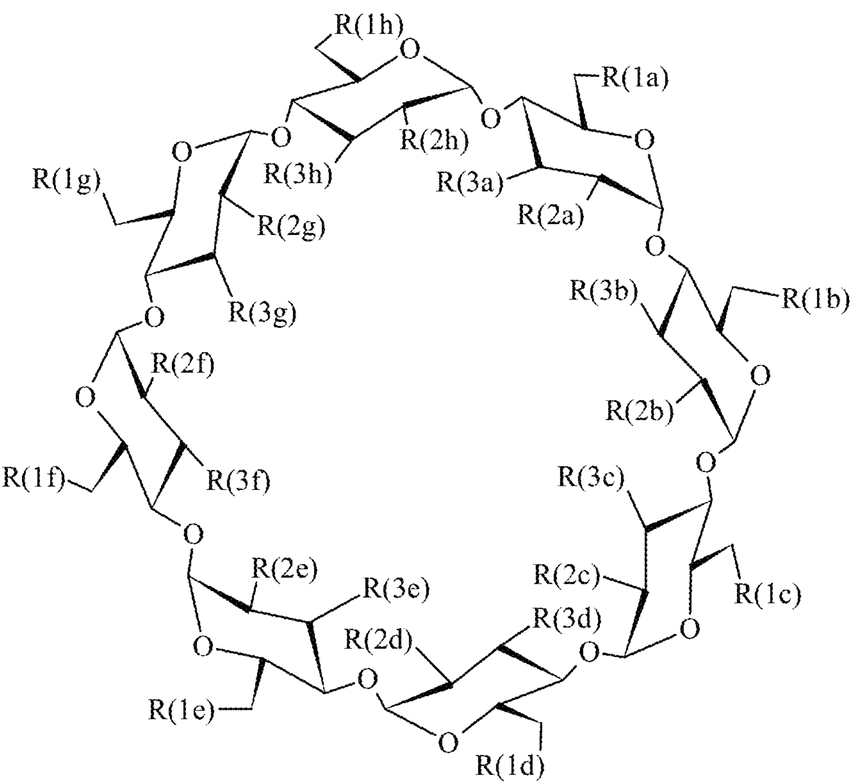
R(1a-h), R(2a-h), R(3a-h) is independently--OH or $-CH_2-CH(OH)-CH_3$ (2-hydroxypropyl gamma cyclodextrin)
R(1a-h), R(2a-h), R(3a-h) is independently -OH or $-CH_2-CH_2-CH_2-CH_2-SO_3Na$ (sulfobutyl ether gamma cyclodextrin)

USE OF CYCLODEXTRINS AS AGROCHEMICAL DELIVERY SYSTEM

CROSS-REFERENCE TO RELATED APPLICATIONS

This application is a continuation of U.S. application Ser. No. 17/288,384, filed Apr. 23, 2021, which is a 371 national stage of PCT International Application No. PCT/IB2019/059146, filed Oct. 24, 2019, claiming benefit of U.S. Provisional Application No. 62/749,992, filed Oct. 24, 2018, the entire contents of each of which are hereby incorporated by reference into the subject application.

Throughout this application various publications are referenced. The disclosures of these documents in their entireties are hereby incorporated by reference into this application in order to more fully describe the state of the art to which this invention pertains.

TECHNICAL FIELD

The present invention relates pesticidal complexes, pesticidal delivery systems and compositions, as well as processes of preparation and uses thereof. The present invention also relates to use of cyclodextrins as an agrochemical d livery system for increasing biological activity.

BACKGROUND

Biological activity of pesticides is affected by the ability of the active component to penetrate the target such as plant's cuticle (protective film covering the epidermis of leaves which consists of lipid and hydrocarbon polymers impregnated with wax) and the mobility of the active component through the multi-layer barrier of the leaves.

Biological activity of pesticides is also influenced by various parameters of the plant, the pest and the pesticide. These parameters include physical properties of the pesticide, dispersion of the pesticide over the leaves and contact of the pesticide with the leaves. Physical properties of the pesticide refer to lipophilicity, polarity, molecular weight and size of the pesticide molecule.

Pesticides are organic compounds having different polarities. Increasing biological activity of pesticides can be achieved by increasing solubility, preventing crystallization, prolonging contact between the pesticide and t e leaves, and/or reducing evaporation of the drop medium. Efficiency of pesticides usually depends on and is affected by the ability of the active component to penetrate the barrier. Solute pesticides where the active components are dissolved are usually tore efficient and have better biological activity than suspension pesticides where the active components are suspended as particles.

To increase pesticide activity, adjuvants may be used to enhance solubility, adhesiveness, wetting, penetration, uptake, retention and/or bioavailability. Adjuvants increase the biological activity of the pesticide but can affect the stability of the composition which makes the formulating process more challenging.

Based on the above, there is a need in the art to find a simple and uniform solution for increasing the biological effect of pesticides and aqueous compositions which are free of additional additives.

SUMMARY

The present invention provides a pesticidal complex comprising at least one pesticide and cyclodextrin, wherein the pesticide is selected from the group consisting of phthalimide fungicide, dithiocarbamate fungicide, diamide insecticide, voltage dependent sodium channel blocker insecticide, dinitroaniline herbicide and any combination thereof.

The present invention also provides a pesticidal delivery system comprising any one of the pesticidal complexes, including pesticidal guest/host inclusion complexes, described herein.

The present invention also provides a pesticidal delivery system comprising (i) an amount of at least one pesticide selected from phthalimide fungicide, dithiocarbamate fungicide, diamide insecticide, voltage dependent sodium channel blocker insecticide, dinitroaniline herbicide and any combination thereof, and (ii) at least one cyclodextrin, wherein the pesticide interact with the cyclodextrin through intermolecular force(s) or the pesticide is complexed with or encapsulated by or within the cyclodextrin.

The present invention also provides a composition comprising any one of the pesticidal complexes or pesticidal delivery systems described herein.

The present invention provides a composition comprising (i) an amount of at least one pesticide and (ii) at least one cyclodextrin, wherein the pesticide is selected from the group consisting of phthalimide fungicide, dithiocarbamate fungicide, diamide insecticide, voltage dependent sodium channel blocker insecticide, dinitroaniline herbicide and any combination thereof.

The present invention also provides a method for:

(i) controlling pest using a pesticide,
(ii) prolonging the controlling effect of a pesticide on a pest,
(iii) increasing the biological activity of a pesticide on a target,
(iv) increasing penetration of a pesticide into a target,
(v) increasing uptake and/or absorbance of a pesticide by a target,
(vi) increasing retention of a pesticide by the plant,
(vii) increasing bioavailability of a pesticide,
(viii) decreasing the half maximal effective concentration (EC50) of a pesticide,
(ix) decreasing the lethal concentration 50 (LC50) of a pesticide and/or
(x) decreasing the lethal concentration 90 (LC90) of a pesticide, comprising contacting (i) the pest or a locus thereof, (ii) a plant or a locus or propagation material thereof, (iii) soil, and/or (iv) an area in which pest infestation is to be prevented with at least one of the pesticidal complexes, pesticidal delivery systems or compositions described herein so as to thereby (i) control the pest using the pesticide,
(ii) prolong the controlling effect of the pesticide on the pest,
(iii) increase biological activity of the pesticide on the target,
(iv) increase penetration of the pesticide into the target,
(v) increase uptake and/or absorbance of the pesticide by the target,
(vi) increase retention of a pesticide by the target,
(vii) increase bioavailability of the pesticide,
(viii) decrease the half maximal effective concentration (EC50) of the pesticide,
(ix) decrease the lethal concentration 50 (LC50) of the pesticide, and/or
(x) decrease the lethal concentration 90 (LC90) of the pesticide.

The present invention provides a method for improving pest control comprising applying any one of the pesticidal complexes, pesticidal delivery systems or compositions described herein to a plant/or soil.

The present invention also provides processes for preparing the pesticidal complexes, pesticidal delivery systems and compositions described herein.

BRIEF DESCRIPTION OF THE DRAWINGS

FIG. 2 shows the structure of alkylated beta cyclodextrins.

FIG. 3 shows the structure of alkylated gamma cyclodextrins.

DETAILED DESCRIPTION

Definitions

Figure 1A:
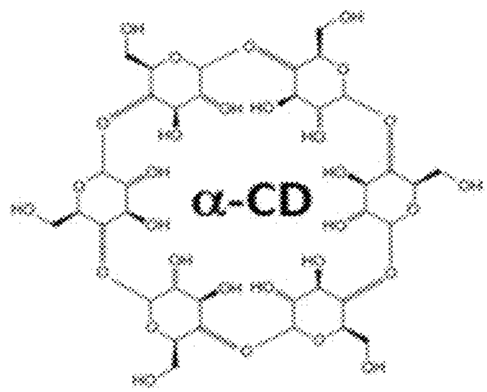
FIG. 1A-1C shows the structures of alpha cyclodextrin, beta cyclodextrin and gamma cyclodextrin, respectively.

Unless defined otherwise, all technical and scientific terms used herein have the meaning commonly understood by persons of ordinary skill in the art to which this subject matter belongs.

As used herein, the term "effective" when used to describe a method for controlling of undesired pest means that the method provides a good level of control of the undesired pest without significantly interfering with the normal growth and development of the crop.

As used herein, the term "effective amount" refers to an amount of an active ingredient, mixture or composition that, when ingested, contacted with or sensed, is sufficient to achieve a good level of control.

As used herein, the term "agriculturally acceptable carrier" means a carrier which is known and accepted in the art for the formation of compositions for agricultural or horticultural use.

As used herein, the term "adjuvant" is broadly defined as any substance that is not an active ingredient but enhances or is intended to enhance the effectiveness of the active ingredient, i.e. pesticide, with which it is used. Adjuvants may be understood to include spreading agents, penetrants, compatibility agents and drift retardants.

As used herein, the term "agriculturally acceptable inert additive" is defined as any substance that is not an active ingredient but is added to the composition such as sticking agents, surfactants, synergists, anti-oxidation agent, defoaming agents and thickeners.

As used herein, the term "additive" is defined as any substance that is not an active ingredient but is added to the composition such as sticking agents, surfactants, synergists, buffers, acidifiers, defoaming agents and thickeners.

As used herein, the term "tank mix" means that one or more chemical pesticides or compositions are mixed in the spray tank at the time of spray application.

As used herein, the term "plant" includes reference to the whole plant, plant organ (e.g., leaves, stems, twigs, roots, trunks, limbs, shoots, fruits etc.), or plant cells. As used herein, the term "plant" includes reference to agricultural crops include field crops (soybean, maize, wheat, rice, etc.), vegetable crops (potatoes, cabbages, etc.) and fruits (peach, etc.). When used in connection with herbicide, especially as target for herbicide, the term "plant" refers to weed.

As used herein the term "propagation material" is to be understood to denote all the generative parts of the plant such as seeds and spores, vegetative structures such as bulbs, corms, tubers, rhizomes, roots stems, basal shoots, stolons and buds.

As used herein, the terms "biological activity" and "biological efficacy" includes reference to pesticidal, herbicidal, insecticidal and/or nematocide activity or efficacy. Biological activity and efficacy include, for example, growth promoting effects, enhanced plant growth rates and enhanced yield.

As used herein, the term "cyclodextrin" refers to a family of cyclic oligosaccharides made up of anhydroglucose subunits bound together in a ring.

As used herein the terms "chemically" refer to a guest/host molecular structure wherein the guest molecules are complexed with and/or encapsulated within the host molecule. For example, the guest agrochemical molecules are complexed with and/or encapsulated within the cyclodextrin host molecule. "(Interact) chemically", "chemically (interacted)" or "(interacted) chemically" includes interaction through intermolecular force(s).

In some embodiments, interacting chemically refers to non-covalent interaction.

Guest/host molecular structure refers to the complex of a guest agrochemical molecule with the host cyclodextrin molecule and/or encapsulation of the guest agrochemical molecule within the host cyclodextrin molecule.

Complex may refer to inclusion complex.

As used herein, the term "intermolecular force(s)" may include, but is not limited to, non-covalent interactions such as ionic interactions, hydrogen bonds, dipole-dipole interactions, van der Waals interactions and hydrophobic interaction.

Complex may refer to adsorption interactions.

As used herein, the term "locus" includes not only areas where weeds may already be growing, but also areas where weeds have yet to emerge, and also to areas under cultivation.

As used herein the term "ha" refers to hectare.

As used herein, the term "mixture" or "combination" refers, but is not limited to, a combination in any physical form, e.g., blend, solution, suspension, dispersion, emulsion, alloy, or the like.

As used herein "substantially free" means that the composition contains an amount of adjuvant that does not significantly affect the biological activity/efficacy of the pesticide. In preferred embodiments, the adjuvant is in amount of ess than 0.3%, or less than 0.2% by weight based on the weight of the pesticide and/of composition.

As used herein, the term "curative treatment" or "curative activity" means an application of one or more pesticide for controlling pest infection of the plant or locus, after an infection or after disease symptoms are shown and/or when the disease pressure is high. Disease pressure may be assessed based on the conditions associated with disease development such as spore concentration and certain environmental conditions. In some embodiments, the pest is a fungus.

As used herein, the term "preventative treatment" or "preventative activity" means an application of one or more pesticide for controlling pest infection of the plant or locus, before an infection or before disease symptoms are shown and/or when the disease pressure is low. Disease pressure may be assessed based on the conditions associated with disease development such as spore concentration and certain environmental conditions. In some embodiments, the pest is a fungus.

As used herein the term "knockdown treatment" or "knockdown activity" means an application of one or more pesticide for controlling pest infestation of the plant or locus before and/or after an infestation or before and/or after insect damage are shown and/or when the pest pressure is low/high. Pest pressure may be assessed based on the conditions associated with pest development such as population density and certain environmental conditions. In some embodiments, the pest is an insect.

As used herein the term "persistence treatment" or "persistence activity" means an application of one or more pesticide for controlling pest infection of the plant or locus over an extended period of time, before an infection or before disease symptoms are shown and/or when the disease pressure is low. Disease pressure may be assessed based on the conditions associated with disease development such as spore concentration and certain environmental conditions.

In particular, when the term "persistence treatment" or "persistence activity" is used in connection with a fungicide, the term means application of one or more fungicide for controlling fungal infection of the plant or locus over an extended period of inoculation, before an infection or before disease symptoms are shown and/or when the disease pressure is low. Disease pressure may be assessed based on the conditions associated with disease development such as spore concentration and certain environmental conditions.

In particular, when the term "persistence treatment" or "persistence activity" is used in connection with an insecticide, the term means an application of one or more insecticide for controlling insect infestation of the plant or locus over an extended period of time, before and/or after an infestation or before and/or after insect damage are shown and/or when the insect pressure is low/high. Insect pressure may be assessed based on the conditions associated with insect development such as population density and certain environmental conditions.

The term "a" or "an" as used herein includes the singular and the plural, unless specifically stated otherwise. Therefore, the terms "a," "an" or "at least one" can be used interchangeably in this application.

Throughout the application, descriptions of various embodiments use the term "comprising"; however, it will be understood by one of skill in the art, that in some specific instances, an embodiment can be described using the language "consisting essentially of" or "consisting of."

The term "about" as used herein specifically includes ±10% from the indicated values in the range. In addition, the endpoints of all ranges directed to the same component or property herein are inclusive of the endpoints, are independently combinable, and include all intermediate points and ranges. It is understood that where a parameter range is provided, all integers within that range, and tenths thereof, are also provided by the invention. For example, "10-50%" includes 10.0%, 10.1%, 10.2%, 10.3%, etc. up to 50%.

Efficiency of an agrochemical is often reduced by limited uptake, penetration, and/or bioavailability of the agrochemical. Penetration occurs through the cuticle layer of the leaves or through the plant's roots. Agrochemical that does not effectively penetrate through the leaf cuticle is more affected by leakage from the leaf surface, resulting in reduced efficiency and need to increase the rate of application. Adding penetration and/or bioavailability enhancing agents affect the uptake rate of the active component. Increasing uptake decreases the rate of application and increases the efficacy of the treatment.

Leaf cuticles are coated with a protective film that is highly hydrophobic. Cyclodextrins, like water, are very polar compounds and are expected to be rejected from the leaf surface and to have less effect on the tension of the leaf surface. In some embodiments, the high polarity of cyclodextrin refers to the exterior (rims) of cyclodextrin molecules.

Surprisingly, it was found that cyclodextrins affect the biological activity of pesticides directly and indirectly. Cyclodextrins help link the agrochemical onto the leaves. As a result, penetration of the pesticide is increased, and biological activity of the pesticide is enhanced. It was found that by chemically interacting a pesticide with cyclodextrins to form inclusion complexes and/or by encapsulating molecules of the pesticide within molecules of the cyclodextrin, the biological activity of the pesticide is increased. The biological efficacy of cyclodextrin compositions comprising the chemically interacted pesticide guest/host molecular structure is much more pronounced and the improvement is significant compared to compositions of the same pesticide using surfactants, organic solvents, suspending agents or other adjuvants.

Cyclodextrins are known as dissolving agents which enhance the solubility of lipophilic compounds in water. However, it was found that increasing only the solubility of a pesticide does not improve its biological activity.

Cyclodextrins are inactive ingredients but were found to affect the biological activity of the guest pesticide when chemically interacted with the guest pesticide by forming inclusion complexation or encapsulating the guest pesticide within the host cyclodextrin molecular structure. The advantage of the present invention is that the carrier is water and not organic solvents which may be toxic to humans and the environment. In addition, there is no need for an additional adjuvant or other additives for increasing the activity of the pesticide. Furthermore, as a composition, the physical and chemical properties of the active agent are not greatly affected, and the composition can be easily controlled.

Cyclodextrins are known to have different uses in the pharmaceutical, food and agriculture industries. However, use of cyclodextrins for improving the biological activity of agrochemicals by enhancing uptake, penetration, retention and/or bioavailability of the agrochemicals is new and opens a whole new approach for delivering agrochemicals and plant protection agents into a plant and the pest.

Cyclodextrins, in addition to increasing solubility and reducing volatility, were found to enhance uptake, penetration, bioavailability, retention and/or efficacy of the pesticide.

Pesticidal Complexes, Delivery Systems and Compositions

The present invention provides a pesticidal complex comprising at least one pesticide and cyclodextrin, wherein the pesticide is selected from the group consisting of phthalimide fungicide, dithiocarbamate fungicide, diamide insecticide, voltage dependent sodium channel blocker insecticide, dinitroaniline herbicide and any combination thereof.

In some embodiments, the voltage dependent sodium channel blocker insecticide is an oxadiazine insecticide. In some embodiments, the voltage dependent sodium channel blocker insecticide is a semicarbazone insecticide.

The present invention also provides a pesticidal complex comprising at least one pesticide and cyclodextrin, wherein the pesticide is selected from phthalimide fungicide, dithiocarbamate fungicide, diamide insecticide, oxadiazine insecticide, semicarbazone insecticide and dinitroaniline herbicide.

In some embodiments, the pesticidal complex is a fungicidal complex comprising at least one phthalimide fungicide or dithiocarbamate fungicide. In some embodiments, the pesticidal complex is an insecticidal complex comprising at least one diamide insecticide or voltage dependent sodium channel blocker insecticide. In some embodiments, the pesticidal complex is an herbicidal complex comprising at least one dinitroaniline herbicide.

In some embodiments, the pesticide is selected from the group consisting of folpet, captan, mancozeb, chlorantraniliprole, indoxacarb, metaflumizone, pendimethalin and any combination thereof.

In some embodiments, the pesticidal complex is a pesticidal guest/host inclusion complex comprising (i) guest pesticide and (ii) host cyclodextrin.

The present invention provides a pesticidal guest/host inclusion complex comprising (i) guest pesticide and (ii) host cyclodextrin, wherein the guest pesticide is selected from phthalimide fungicide, dithiocarbamate fungicide, diamide insecticide, oxadiazine insecticide, semicarbazone insecticide and dinitroaniline herbicide.

In some embodiments, the guest/host inclusion complex comprises guest pesticide and host cyclodextrin in any one of the following ranges of molar ratios between guest pesticide and host cyclodextrin: 1:1 to 1:50, 1:1 to 1:40, 1:1 to 1:30, 1:1 to 1:20, 1:1 to 1:10, 1:1 to 1:9, 1:1 to 1:8, 1:1 to 1:7, 1:1 to 1:6, 1:1 to 1:5, 1:1 to 1:4, 1:1 to 1:3 and 1:1 to 1:2.

In some embodiments, the guest/host inclusion complex comprises guest pesticide and host cyclodextrin in any one of the following ranges of weight ratios between guest pesticide and host cyclodextrin: 1:1 to 1:50, 1:1 to 1:40, 1:1 to 1:30, 1:1 to 1:20, 1:1 to 1:10, 1:1 to 1:9, 1:1 to 1:8, 1:1 to 1:6, 1:1 to 1:5, 1:1 to 1:4, 1:1 to 1:3 and 1:1 to 1:2.

In some embodiments, the guest/host inclusion complex comprises guest folpet and host methylated β-cyclodextrin in weight ratio of 1:1 to 1:5. In some embodiments, the guest/host inclusion complex comprises guest folpet and host methylated β-cyclodextrin in weight ratio of 1:2. In some embodiments, the guest/host inclusion complex comprises guest captan and host methylated β-cyclodextrin in weight ratio of 1:1 to 1:5. In some embodiments, the guest/host inclusion complex comprises guest mancozeb and host methylated β-cyclodextrin in weight ratio of 1:1 to 1:50. In some embodiments, the guest/host inclusion complex comprises guest mancozeb and host methylated β-cyclodextrin in weight ratio of 1:2. In some embodiments, the guest/host inclusion complex comprises guest chlorantraniliprole and host alpha-cyclodextrin in weight ratio of 1:1 to 1:5. In some embodiments, the guest/host inclusion complex comprises guest chlorantraniliprole and host alpha-cyclodextrin in eight ratio of 1:1. In some embodiments, the guest/host inclusion complex comprises guest indoxacarb and host cyclodextrin in weight ratio of 1:1 to 1:5. In some embodiments, the guest/host inclusion complex comprises guest metaflumizone and host cyclodextrin in weight ratio of 1:1 to 1:5. In some embodiments, the guest/host inclusion complex comprises guest pesticide and host alpha-cyclodextrin in weight ratio of 1:1 to 1:5. In some embodiments, the guest/host inclusion complex comprises guest pesticide and host beta-cyclodextrin in weight ratio of 1:1 to 1:5. In some embodiments, the guest/host inclusion complex comprises guest pesticide and host gamma-cyclodextrin in weight ratio of 1:1 to 1:5. In some embodiments, the guest/host inclusion complex comprises guest pesticide and host methylated β-cyclodextrin in weight ratio of 1:1 to 1:5. In some embodiments, the guest/host inclusion complex comprises guest pesticide and host hydroxypropyl-β-cyclodextrin in weight ratio of 1:1 to 1:5. In some embodiments, the guest/host inclusion complex comprises guest pesticide and host sulfobutylether-β-cyclodextrin in weight ratio of 1:1 to 1:5. In some embodiments, the guest/host inclusion complex comprises guest pesticide and host hydroxypropyl-γ-cyclodextrin in weight ratio of 1:1 to 1:5. In some embodiments, the guest/host inclusion complex comprises guest pesticide and host sulfobutylether-γ-cyclodextrin weight in ratio of 1:1 to 1:5.

The present invention also provides a pesticidal delivery system comprising any one of the pesticidal complexes, including pesticidal guest/host inclusion complexes, described herein.

The present invention also provides a pesticidal delivery system comprising (i) an amount of at least one pesticide selected from phthalimide fungicide, dithiocarbamate fungicide, diamide insecticide, oxadiazine insecticide, semicarbazone insecticide and dinitroaniline herbicide and (ii) at least one cyclodextrin, wherein the pesticide interact with the cyclodextrin through intermolecular force(s).

The present invention also provides a fungicidal delivery system comprising (i) an effective amount of at least one phthalimide fungicide and/or dithiocarbamate fungicide, and (ii) cyclodextrin, wherein molecules of the phthalimide fungicide interact with molecules of the cyclodextrin through intermolecular force(s).

The present invention also provides an insecticidal delivery system comprising (i) an effective amount of diamide insecticide, oxadiazine insecticide, and/or semicarbazone insecticide, and (ii) cyclodextrin, wherein molecules of the diamide insecticide interact with molecules of the cyclodextrin through intermolecular force(s).

The present invention also provides an insecticidal delivery system comprising an effective amount of voltage dependent sodium channel blocker insecticide and cyclodextrin wherein molecules of the voltage dependent sodium channel blocker insecticide interact with molecules of the cyclodextrin through intermolecular force(s).

The present invention also provides an herbicidal delivery system comprising an effective amount of dinitroaniline herbicide and cyclodextrin wherein molecules of the dinitroaniline herbicide interact with molecules of the cyclodextrin through intermolecular force(s).

The present invention also provides a composition comprising any one of the pesticidal complexes, including pesticidal guest/host inclusion complexes, described herein.

The present invention also provides a composition comprising any one of the pesticidal delivery systems described herein.

The present invention provides a composition comprising (i) an amount of at least one pesticide and (ii) at least one cyclodextrin, wherein the pesticide is selected from the group consisting of phthalimide fungicide, dithiocarbamate fungicide, diamide insecticide, voltage dependent sodium channel blocker insecticide, dinitroaniline herbicide and any combination thereof.

In some embodiments, the voltage dependent sodium channel blocker insecticide is oxadiazine insecticide. In some embodiments, the voltage dependent sodium channel blocker insecticide is semicarbazone insecticide.

The present invention provides a composition comprising (i) an amount of at least one pesticide and (ii) at least one cyclodextrin, wherein the pesticide is selected from phthalimide fungicide, dithiocarbamate fungicide, diamide insecticide, oxadiazine insecticide, semicarbazone insecticide and dinitroaniline herbicide.

In some embodiments, the composition comprises an effective amount of the pesticide. In some embodiments, the amount of pesticide is effective for controlling pest.

The present invention provides a composition comprising (i) an effective amount of at least one pesticide and (ii) at least one cyclodextrin, wherein the pesticide is selected from phthalimide fungicide, dithiocarbamate fungicide, diamide insecticide, oxadiazine insecticide, semicarbazone insecticide and dinitroaniline herbicide.

The present invention provides a composition comprising an effective amount of at least one pesticide and cyclodextrin, wherein molecules of the pesticide interact with molecules of the cyclodextrin through intermolecular force(s).

The present invention provides a composition comprising an effective amount of at least one pesticide and cyclodextrin, wherein molecules of the pesticide interact chemically with molecules of the cyclodextrin through intermolecular force(s).

In some embodiments, the composition is a fungicidal composition. In some embodiments, the fungicidal composition comprises a phthalimide fungicide. In some embodiments, the fungicidal composition comprises a dithiocarbamate fungicide.

In some embodiments, the composition is an insecticidal composition. In some embodiments, the insecticidal composition comprises a diamide insecticide. In some embodiments, the insecticidal composition comprises a voltage dependent sodium channel blocker insecticide. In some embodiments, the insecticidal composition comprises an oxadiazine insecticide. In some embodiments, the insecticidal composition comprises a semicarbazone insecticide.

In some embodiments, the composition is an herbicidal composition. In some embodiments, the herbicidal composition comprises a dinitroaniline herbicide.

In some embodiments, the composition comprises an agriculturally acceptable carrier.

The present invention also provides a composition comprising (i) an effective amount of at least one pesticide; (ii) cyclodextrin and (iii) an agriculturally acceptable carrier.

In some embodiments, the agriculturally acceptable carrier is water.

In some embodiments, the composition is substantially free of an agriculturally acceptable organic solvent. In some embodiments, the composition is substantially free of an agriculturally acceptable additive. In some embodiments, the composition is substantially free of any adjuvant. In some embodiments, the composition is free of any adjuvant.

In some embodiments, the composition comprises one type of cyclodextrin. In some embodiments, the composition comprises a mixture of two or more types of cyclodextrins.

In some embodiments, the composition is substantially free of an adjuvant.

In some embodiments, the cyclodextrin acts as a built-in adjuvant for the pesticide. In some embodiments, the cyclodextrin acts as a built-in adjuvant for the fungicide, insecticide or herbicide.

Built-in adjuvant refers to composition wherein the pesticide and the adjuvant are formulated together as one composition comprising both pesticide and adjuvant.

In some embodiments, the concentration of cyclodextrin in the composition is between 0.1 to 20 g/kg. In some embodiments, the concentration of cyclodextrin in the composition is between 0.1 to 5 g/kg. In some embodiments, the concentration of cyclodextrin in the composition is between 5 to 10 g/kg. In some embodiments, the concentration of cyclodextrin in the composition is between 10 to 15 g/kg. In some embodiments, the concentration of cyclodextrin in the composition is between 15 to 20 g/kg.

In some embodiments, the concentration of the pesticide in the composition is between 0.1 to 20 g/kg. In some embodiments, the concentration of the pesticide in the composition is between 0.1 to 5 g/kg. In some embodiments, the concentration of the pesticide in the composition is between 5 to 10 g/kg. In some embodiments, the concentration of the pesticide in the composition is between 10 to 15 g/kg. In some embodiments, the concentration of the pesticide in the composition is between 15 to 20 g/kg.

In some embodiments, the concentration of the pesticide in the composition is 10-50% by weight based on the total weight of the stable composition. In some embodiments, the concentration of the pesticide in the composition is 10-20% by weight based on the total weight of the stable composition. In some embodiments, the concentration of the pesticide in the composition is 20-30% by weight based on the total weight of the stable composition. In some embodiments, the concentration of the pesticide in the composition is 30-40% by weight based on the total weight of the stable composition. In some embodiments, the concentration of the pesticide in the composition is 40-50% by weight based on the total weight of the stable composition.

In some embodiments, the concentration of the cyclodextrin in the composition is 10-90% by weight based on the total weight of the stable composition. In some embodiments, the concentration of the cyclodextrin in the composition is 10-50% by weight based on the total weight of the stable composition. In some embodiments, the concentration of the cyclodextrin in the composition is 10-25% by weight based on the total weight of the stable composition. In some embodiments, the concentration of the cyclodextrin in the composition is 25-50% by weight based on the total weight of the stable composition. In some embodiments, the concentration of the cyclodextrin in the composition is 50-90% by weight based on the total weight of the composition. In some embodiments, the concentration of the cyclodextrin in the composition is 50-75% by weight based on the total weight of the stable composition. In some embodiments, the concentration of the cyclodextrin in the composition is 75-90% by weight based on the total weight of the stable composition.

In some embodiments, molecules of the pesticide interact with molecules of the cyclodextrin through intermolecular force(s). In some embodiments, molecules of the pesticide are partially interacted with molecules of the cyclodextrin through intermolecular force(s). In some embodiments, molecules of the pesticide are entirely interacted with molecules of the cyclodextrin through intermolecular force(s).

Interacting through intermolecular force(s) includes interacting chemically through intermolecular force(s). In some embodiments, molecules of the pesticide interact chemically with molecules of the cyclodextrin through intermolecular force(s).

Interacting chemically includes interacting non-covalently. In some embodiments, molecules of the pesticide interact non-covalently with molecules of the cyclodextrin through intermolecular force(s).

In some embodiments, molecules of the pesticide are complexed with molecules of the cyclodextrin. In some embodiments, molecules of the pesticide are encapsulated by or within the molecules of the cyclodextrin.

Complexing the pesticide with the cyclodextrin includes adsorbing molecules of the pesticide with molecules of the cyclodextrin.

In some embodiments, molecules of the pesticide are adsorbed with molecules of the cyclodextrin. In some embodiments, molecules of the pesticide are adsorbed chemically with molecules of the cyclodextrin through intermolecular force(s). In some embodiments, molecules of the pesticide are adsorbed non-covalently with molecules of the cyclodextrin through intermolecular force(s).

In some embodiments, molecules of the pesticide are partially interacted chemically with molecules of the cyclodextrin(s). In some embodiments, at least 20%, 30%, 40%, 50%, 60%, 70%, 80% or 90% of the molecules of the pesticide are interacted chemically with the molecules of the cyclodextrin(s).

In some embodiments, molecules of the pesticide are partially adsorbed chemically with molecules of the cyclodextrin(s). In some embodiments, at least, 20%, 30%, 40%, 50%, 60%, 70%, 80% or 90% of the molecules of the pesticide are adsorbed chemically with the molecules of the cyclodextrin(s).

In some embodiments, at least 90%, at least 80%, at least 70%, at least 60%, at least 50%, at least 40%, at least 30% or at least 20% of the pesticide selected from phthalimide fungicide, dithiocarbamate fungicide, diamide insecticide, oxadiazine insecticide, semicarbazone insecticide and dinitroaniline herbicide, is interact chemically with the cyclodextrin at a molecular level.

In aqueous solutions, guest/host cyclodextrin (inclusion) complexes and molecular encapsulation structures may both be present. This inclusion complex behaves just as the free, dissolved molecule, due to its very dynamic dissociation equilibrium. When dispersing cyclodextrin complexes in water, the chemical composition of the formed guest/host matrix system will depend upon the physical and chemical properties of both the guest pesticide and host cyclodextrin matrix complex.

In some embodiments, the molecules of the pesticide are encapsulated or complexed within the molecules of the cyclodextrin by suspension method. In some embodiments, the molecules of the pesticide are encapsulated or complexed within the molecules of the cyclodextrin or the cyclodextrin molecular complex by preparing a physical powder mixture blend.

In some embodiments, the molecules of the pesticide are encapsulated or complexed within the molecules of the cyclodextrin or the cyclodextrin molecular complex by kneading method. In some embodiments, the molecules of the pesticide are encapsulated or complexed within the molecules of the cyclodextrin or the cyclodextrin molecular complex by preparing a physical powder mixture blend.

Pesticides that may be used in connection with the subject invention are described below.

In some embodiments, the pesticide is a phthalimide fungicide. In some embodiments, the pesticide is a dithiocarbamate fungicide. In some embodiments, the pesticide is a diamide insecticide. In some embodiments, the pesticide is a voltage dependent sodium channel blocker insecticide. In some embodiments, the pesticide is an oxadiazine insecticide. In some embodiments, the pesticide is a semicarbazone insecticide. In some embodiments, the pesticide is a dinitroaniline herbicide.

In some embodiments, the pesticide is a fungicide. In some embodiments, the pesticide is an insecticide. In some embodiments, the pesticide is an herbicide.

In some embodiments, the fungicide is a phthalimide fungicide. In some embodiments, the fungicide is a dithiocarbamate fungicide.

In some embodiments, the insecticide is a diamide insecticide. In some embodiments, the insecticide is a voltage dependent sodium channel blocker insecticide. In some embodiments, the insecticide is an oxadiazine insecticide. In some embodiments, the insecticide is a semicarbazone insecticide.

In some embodiments, the herbicide is a dinitroaniline herbicide.

In some embodiments, the phthalimide fungicide is captan, folpet or a combination of captan and folpet. In some embodiments, the phthalimide fungicide is folpet. In some embodiments, the pesticidal complex, pesticidal delivery system or composition comprises folpet and methylated beta cyclodextrin. In some embodiments, the phthalimide fungicide is captan.

In some embodiments, the dithiocarbamate fungicide is selected from the group consisting of mancozeb, zineb, thiram, ziram, ferbam, metiram, ptopineb, maneb and any combination thereof. In some embodiments, the dithiocarbamate fungicide is mancozeb.

In some embodiments, the diamide insecticide is selected from the group consisting of broflanilide, chlorantraniliprole, cyantraniliprole, cyclaniliprole, cyhalodiamide flubendiamide, tetraniliprole and any combination thereof. In some embodiments, the diamide insecticide is chlorantraniliprole. In some embodiments, the pesticidal complex, pesticidal delivery system or composition comprises chlorantraniliprole and alpha cyclodextrin.

In some embodiments, the voltage dependent sodium channel blocker insecticide is oxadiazine insecticide, semicarbazone insecticide or a combination of oxadiazine insecticide and semicabazone insecticide. In some embodiments, the oxadiazine insecticide is indoxacarb. In some embodiments, the pesticidal complex, pesticidal delivery system or composition comprises indoxacarb and methyl-beta-cyclodextrin. In some embodiments, the semicarbazone insecticide is metaflumizone.

In some embodiments, the dinitroaniline herbicide is selected from the group consisting of benfluralin, butralin, chlornidine, dinitramine, dipropalin, ethalfluralin, fluchloralin, isopropalin, methalpropalin, nitralin, oryzalin, pendimethalin, prodiamine, profluralin and any combination thereof. In some embodiments, the dinitroaniline herbicide is pendimethalin. In some embodiments, the dinitroaniline herbicide is other than trifluralin. In some embodiment, the pesticide is other than trifluralin.

In some embodiments, the pesticide is any one of or any combination of folpet, captan, mancozeb, chlorantraniliprole, indoxacarb, metaflumizone and pendimethalin.

The partition coefficient (log P) and dissociation constant (pKa) of a pesticide active ingredient are known to be determinants of pesticide mobility in plants. The log P of a given molecule describes its lipophilicity or hydrophilicity, where lipophilicity describes a molecule's ability to dissolve in lipophilic (non-aqueous) solutions, allowing permeation through biological membranes. The pKa value of a given molecule defines the pH at which it is neutral. At greater pH values, acid groups will be charged, while at lower pH values base groups will be charged. The number and distribution of charges on a molecule affect its aqueous solubility. It is well accepted that the solubility of the active ingredient is thus determined by its lipophilicity and dissociation constant, and an understanding of these physicochemical properties is a vital component of pesticide composition development.

Lipophilic active ingredient molecules may resist solubility in water, the most common medium for agricultural sprays, and typically require composition with organic solvents or oils. In contrast, hydrophilic active ingredient molecules are easily solubilized in aqueous spray solutions, while the uptake of these molecules across lipophilic plant leaf barriers often requires the inclusion of surfactants in the final product. Delay or insufficient uptake of the active ingredient may lead to reduced efficacy, wash-off of the active ingredient by rain or UV-degradation of the unprotected molecules.

The polar surface area (PSA) of a molecule is defined as the surface area occupied by oxygen and nitrogen atoms, and hydrogen atoms bound to these heteroatoms. The transport process across lipid barriers, according to the solubility/diffusion model and the pH-partitioning theory, is dependent on three properties: i) the partitioning between membrane and water; ii) the charge; and iii) the size of the solute (since the diffusion rate in the membrane is assumed to be dependent on the size of the solute).

Membrane partitioning has been considered as a two-step process and this model has been applied successfully to describe passive transport of active compounds across cell membranes and lipid barriers. The application of a two-step partitioning process can be motivated if we consider the insertion of a polar, but lipophilic, molecule into a lipid membrane. In the first step, lipophilicity is the major driving force for drug incorporation into the lipid bilayer. By contrast, in the second step, in which the drug is transferred into the interior of the lipid bilayer, the interactions between the bilayer and the polar parts of the solute are more important than is the lipophilicity and can be largely accounted for by hydrogen bonding and polarity.

With the two-step partitioning process, the PSA, which is generally assumed to be related to hydrogen bonding capacity, is particularly considered as a good predictor of passive membrane permeability. Indeed, a search of the literature showed that this factor had already been introduced as a descriptor for blood-brain partitioning of active substances. Active ingredients that are transported passively by transcellular route should not display a PSA>$120A^2$. Active ingredients that are completely absorbed through lipophilic barriers/membranes should have a PSA<60-$70A^2$ (Kelder et al, Pharm. res., 16, 1514-1519, 1999).

PSA can be used as a predictor of membrane permeability also in tissues other than the intestinal epithelium. A similar conclusion was reached by Clark, who derived a simple quantitative structure-activity relationship (QSAR) model for brain penetration from a combination of PSA and log P. PSA has been combined with other predictive molecular descriptors such as calculated log P and the number of rotatable bonds, or been included in rule-based systems such as the Lipinski's rule of five, with good results. Thus, brain penetration is predicted for active compounds with high log P and low PSA [Clark, J. Pharmac. Sci., 88, 807, 1999].

The study of the transport of organic compounds through biological barriers has also been investigated in plant systems. Plant-uptake was described using the transpiration stream concentration factor (TSCF), a ratio of chemical concentration in the xylem pore water to the chemical concentration in the feed solution. Typically, models relate the TSCF to hydrophobicity [i.e., octanol-water partitioning (log P)], generally demonstrating bell-shaped curves, where moderately hydrophobic compounds (log P values of 1-3) show the greatest levels of uptake. Additionally, moderately hydrophobic compounds are most likely to be translocated by plants with most translocatable compounds exhibiting a log P between 1 and 4, translocatable compounds generally having a molecular mass of <350 Da, hydrogen bond donor and acceptor appear to have cutoffs around 4 and 7 respectively and rotatable bond cutoff of 7. The PSA cutoff for plant-translocatable compounds is ~90A 2 [Limmer et al, Environ. Sci. Technol. Lett. 2014, 1, 156-161, 2014].

In some embodiments, the pesticide in the present invention has a log P value between 1 to 7.

Cyclodextrins that may be used in connection with the subject invention are described below.

The size of the cyclodextrin which is used in the present invention correlates with the size and structure of the agrochemical, for example, the pesticide.

In some embodiments, the cyclodextrin is α (alpha)-cyclodextrin: 6-membered ring sugar molecule. In some embodiments, the cyclodextrin is β (beta)-cyclodextrin: 7-membered ring sugar molecule. In some embodiments, the cyclodextrin is γ (gamma)-cyclodextrin: 8-membered ring sugar molecule.

In some embodiments, the cyclodextrin is a native/neutral derivative.

In some embodiments, the native cyclodextrin derivative is α (alpha)-cyclodextrin: 6-membered ring sugar molecule. In some embodiments, the native derivative of cyclodextrin is β (beta)-cyclodextrin: 7-membered ring sugar molecule. In some embodiments, the cyclodextrin is γ (gamma)-cyclodextrin: 8-membered ring sugar molecule.

In some embodiments, the cyclodextrin is a synthetic derivative of alpha, beta and/or gamma cyclodextrin.

Synthetic derivative of cyclodextrins may include, but is not limited, to alkylated cyclodextrins, cyclodextrin polymers, acetyl cyclodextrins, carboxymethyl cyclodextrins, succinyl, cyclodextrins, phosphate cyclodextrins, maltosyl cyclodextrins and amine (ammonium) cyclodextrins.

In some embodiments, the synthetic derivative of cyclodextrin is an alkylated cyclodextrin. In some embodiments, the hydroxy groups of the cyclodextrin is alkylated with $C_1$-$C_5$ alkyl group. In some embodiments, the hydroxy groups of the cyclodextrin is methylated.

In some embodiments, the hydroxyl group is substituted with alkyl group.

In some embodiments, the alkyl group is substituted with hydroxyl group.

In some embodiments, the alkyl group is substituted with sulfonate.

In some embodiments, the hydroxyl group is substituted with sulfonate.

In some embodiments, the sulfonate comprises four methylene units.

Sulfonate refers to salt of sulfonic acid.

Salts includes sodium, aluminum, potassium, calcium and ammonium salts.

Cyclodextrin includes methyl derivatives of cyclodextrin, hydroxypropyl derivatives of cyclodextrin, quaternary ammonium derivatives of cyclodextrin and sulfobutylether derivatives of cyclodextrin.

In some embodiments, the cyclodextrin is an alpha-cyclodextrin. In some embodiments, the cyclodextrin is a beta-cyclodextrin. In some embodiments, the cyclodextrin is a gamma-cyclodextrin. In some embodiments, the cyclodextrin is a 2-hydroxypropyl-beta-cyclodextrin. In some embodiments, the cyclodextrin is a sulfobutylether beta cyclodextrin. In some embodiments, the cyclodextrin is a methylated beta cyclodextrin.

In some embodiments, the cyclodextrin is substituted with at least one alkyl group. In some embodiments, the cyclodextrin is substituted with an alkyl group. In some embodiments, the cyclodextrin is substituted with a $C_1$-$C_5$ alkyl group. In some embodiments, the alkyl substitution is positioned randomly on the cyclodextrin (as seen in FIGS. 2-3).

In some embodiments, the alkyl group is selected from methyl, hydroxypropyl and butyl sulfonate (sulfobutyl) group. In some embodiments, the alkyl group is methyl, hydroxypropyl and butyl sulfonate (sulfobutyl) group.

In some embodiments, the alkyl group is substituted with hydroxyl group. In some embodiments, the alkyl group is substituted with sulfobutyl salt.

Suitable cyclodextrins that may be used in connection with the subject invention include but are not limited to alpha cyclodextrin, beta-cyclodextrin, gamma-cyclodextrin, Cavasol™ W7M (methyl-beta-cyclodextrin), RAMEB (methyl-beta-cyclodextrin), Cavasol™ W7HP (hydroxypropyl-beta-cyclodextrin), Captisol® (sulfobutylether beta cyclodextrin) and Dexolve® (sulfobutylether beta cyclodextrin) manufactured by Cyclolab.

Examples of cyclodextrin polymers include β-cyclodextrin polymer (BCDPS), quaternary amino β-cyclodextrin polymer (QABCDPS), and soluble (2-hydroxy-3-N,N,N-trimethylamino)propyl-beta-cyclodextrin polymer.

Examples of amine (ammonium) cyclodextrin are a quaternary amino β-cyclodextrin (QABCD), 2-Hydroxy-3-N,N,N-trimethylamino)propyl-beta-cyclodextrin chloride, (2-Hydroxy-3-N,N,N-trimethylamino)propyl-alpha-cyclodextrin chloride, 2-Hydroxy-3-N,N,N-trimethylamino)propyl-gamma-cyclodextrin chloride, 2-Hydroxy-3-N,N,N-trimethylamino)propyl-beta-cyclodextrin chloride, Heptakis (2,3-di-O-methyl)-hexakis(6-O-methyl)-6-monodeoxy-6-monoamino-beta-cyclodextrin hydrochloride, 6-Monodeoxy-6-monoamino-random-methyl-beta-cyclodextrin hydrochloride, Octakis(6-deoxy-6-amino)-gamma-cyclodextrin octahydrochloride, Heptakis(6-deoxy-6-amino)-beta-cyclodextrin heptahydrochloride and 6-Monodeoxy-6-monoamino-beta-cyclodextrin hydrochloride.

In some embodiments, the cyclodextrin is a methyl-beta-cyclodextrin.

In some embodiments, the cyclodextrin is a hydroxypropyl-beta-cyclodextrin.

In some embodiments, the cyclodextrin is sulfobutylether beta cyclodextrin.

In some embodiments, the cyclodextrin has the following structure:

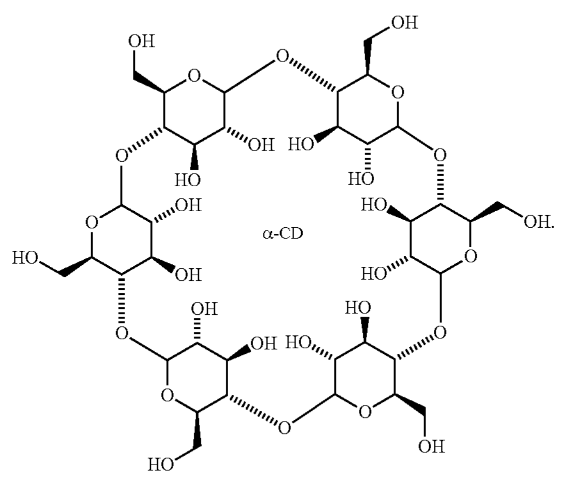

In some embodiments, the cyclodextrin has the following structure:

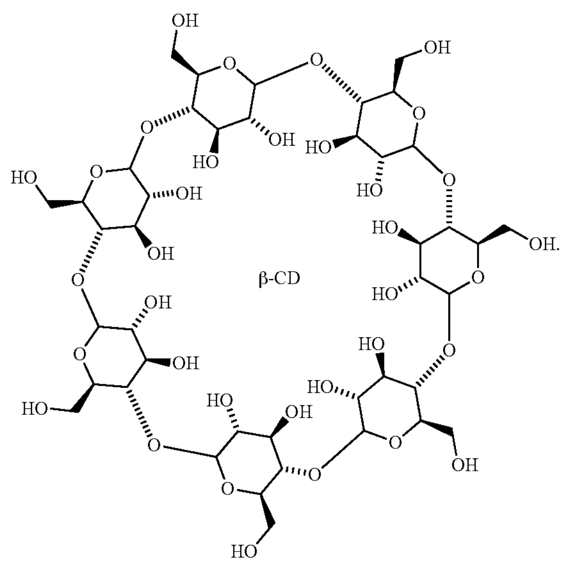

In some embodiments, the cyclodextrin has the following structure:

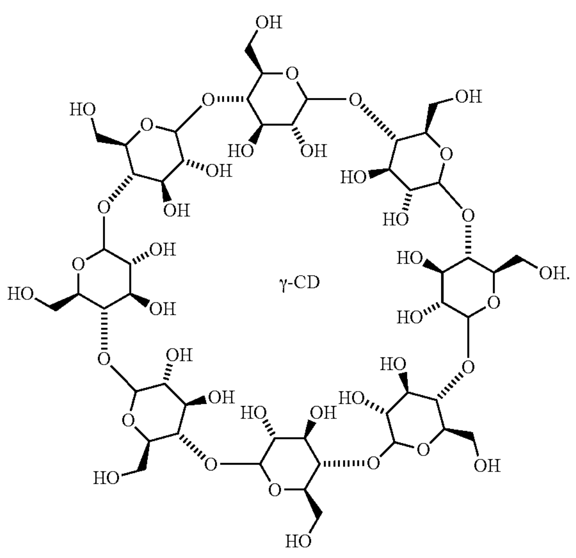

In some embodiments, the cyclodextrin has the following structure:

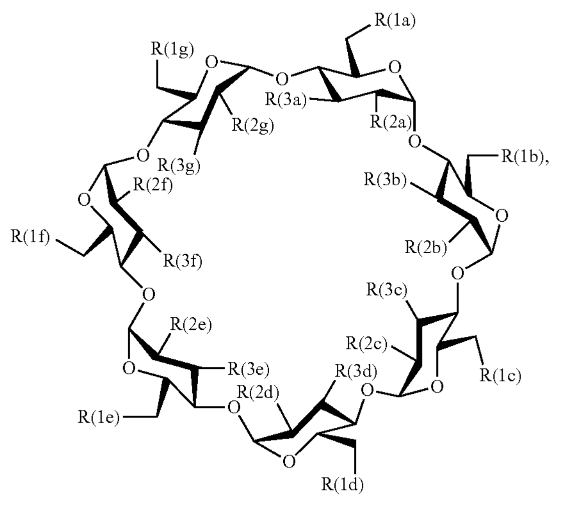

wherein R(1a-f), R(2a-f), R(3a-f) is independently —OH or —O—$CH_2$—CH(OH)—$CH_3$ (2-hydroxypropyl beta cyclodextrin).

In some embodiments, the cyclodextrin has the following structure:

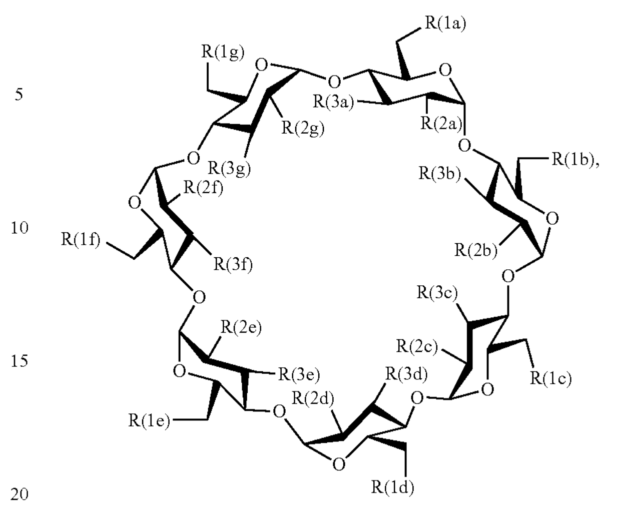

wherein R(1a-f), R(2a-f), R(3a-f) is independently —OH or —O—$C_2$—$CH_2$—$CH_2$—$CH_2$—$SO_3$Na: (sulfobutyl ether beta cyclodextrin).

In some embodiments, the cyclodextrin has the following structure:

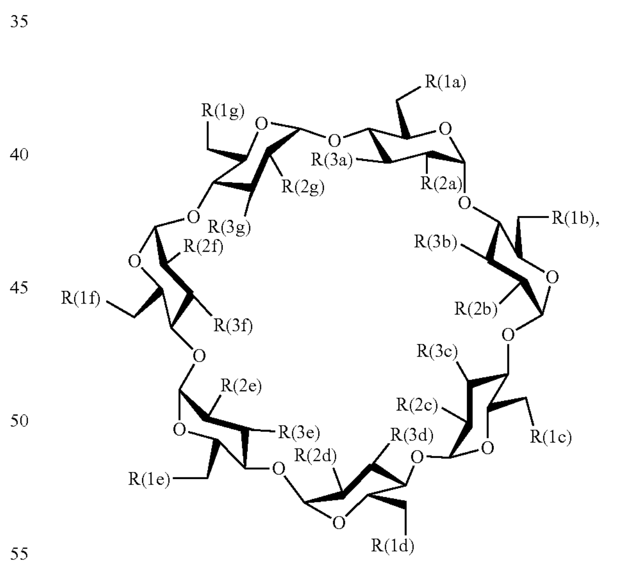

wherein R(1a-f), R(2a-f), R(3a-f) is independently —OH or —O—$CH_3$ (methyl-beta-cyclodextrin).

In some embodiments, the cyclodextrin has the following structure:

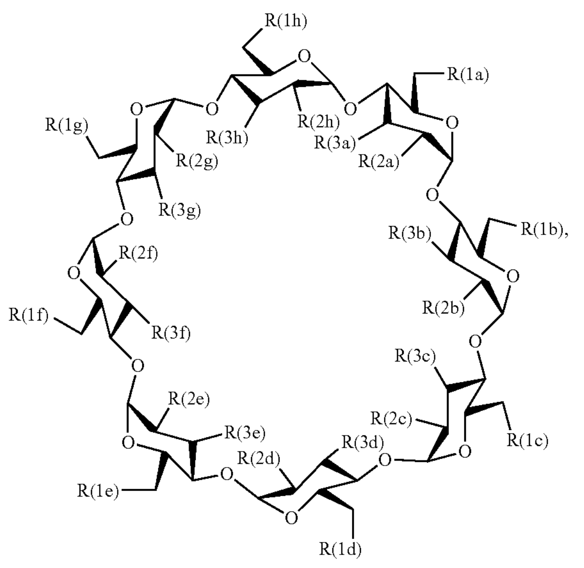

wherein R(1a-h), R(2a-h), R(3a-h) is independently —OH or $—CH_2—CH(OH)—CH_3$ (2-hydroxypropyl gamma cyclodextrin).

In some embodiments, the cyclodextrin has the following structure:

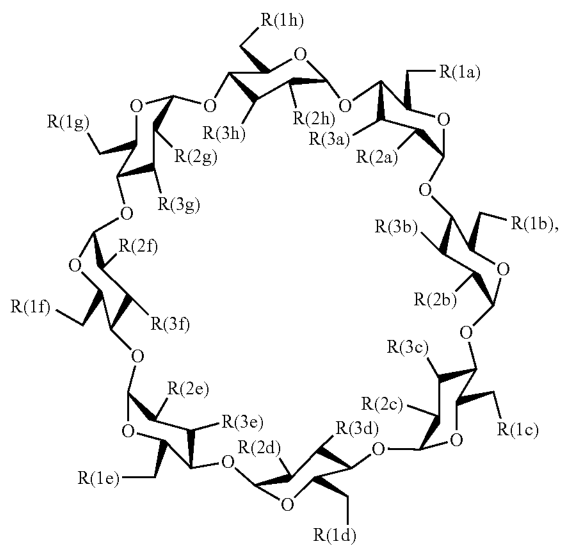

wherein R(1a-h), R(2a-h), R(3a-h) is independently —OH or $—CH_2—CH_2—CH_2—CH_2—SO_3Na$ (sulfobutyl ether gamma cyclodextrin).

Figure 1B:
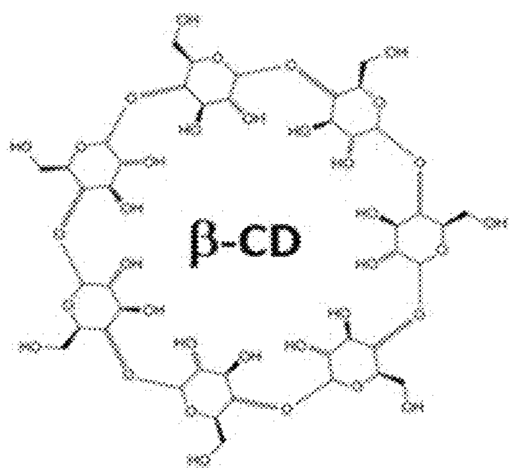
Figure 1C:
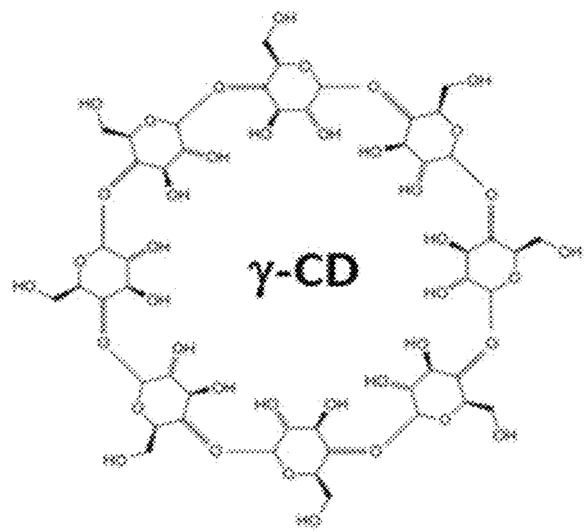

In some embodiments, the cyclodextrin has the structure as describe in FIGS. 1 to 3.

In some embodiments, the pesticidal complex, pesticidal delivery system or composition comprises at least one type of cyclodextrin. In some embodiments, the pesticidal complex, pesticidal delivery system or composition comprises at least two types of cyclodextrins.

In some embodiments, the molar ratio between the pesticide and the cyclodextrin is 1:1 to 1:50. In some embodiments, the molar ratio between the pesticide and the cyclodextrin is 1:1 to 1:40. In some embodiments, the molar ratio between the pesticide and the cyclodextrin is 1:1 to 1:30. In some embodiments, the molar ratio between the pesticide and the cyclodextrin is 1:1 to 1:20. In some embodiments, the molar ratio between the pesticide and the cyclodextrin is 1:1 to 1:10. In some embodiments, the molar ratio between the pesticide and the cyclodextrin is 1:1 to 1:9. In some embodiments, the molar ratio between the pesticide and the cyclodextrin is 1:1 to 1:8. In some embodiments, the molar ratio between the pesticide and the cyclodextrin is 1:1 to 1:7. In some embodiments, the molar ratio between the pesticide and the cyclodextrin is 1:1 to 1:6. In some embodiments, the molar ratio between the pesticide and the cyclodextrin is 1:1 to 1:5. In some embodiments, the molar ratio between the pesticide and the cyclodextrin is 1:1 to 1:4. In some embodiments, the molar ratio between the pesticide and the cyclodextrin is 1:1 to 1:3. In some embodiments, the molar ratio between the pesticide and the cyclodextrin is 1:1 to 1:2.

In some embodiments, the weight ratio between the pesticide and the cyclodextrin is 1:1 to 1:50. In some embodiments, the weight ratio between the pesticide and the cyclodextrin is 1:1 to 1:40. In some embodiments, the weight ratio between the pesticide and the cyclodextrin is 1:1 to 1:30. In some embodiments, the weight ratio between the pesticide and the cyclodextrin is 1:1 to 1:20. In some embodiments, the weight ratio between the pesticide and the cyclodextrin is 1:1 to 1:10. In some embodiments, the weight ratio between the pesticide and the cyclodextrin is 1:1 to 1:9. In some embodiments, the weight ratio between the pesticide and the cyclodextrin is 1:1 to 1:8. In some embodiments, the weight ratio between the pesticide and the cyclodextrin is 1:1 to 1:6. In some embodiments, the weight ratio between the pesticide and the cyclodextrin is 1:1 to 1:5. In some embodiments, the weight ratio between the pesticide and the cyclodextrin is 1:1 to 1:4. In some embodiments the weight ratio between the pesticide and the cyclodextrin is 1:1 to 1:3. In some embodiments, the weight ratio between the pesticide and the cyclodextrin is 1:1 to 1:2.

In some embodiments, presently described compositions may include additional agrochemicals.

Various agrochemicals may be used. Exemplary among such agrochemicals without limitation are crop protection agents, for example pesticides, safeners, plant growth regulators, repellents, bio stimulants or preservatives such as bacteriostats or bactericides.

Pesticide include but are not limited to herbicide, insecticide, fungicide, nematocide, mollusks repellent and control agent.

In some embodiments, the fungicide is a succinate dehydrogenase inhibitor.

In some embodiments, the succinate dehydrogenase inhibitor is selected from the group consisting of fluxapyroxad, benzovindiflupyr, penthiopyrad, isopyrazam, bixafen, boscalid, penflufen, and fluopyram.

In some embodiments, the fungicide is a strobilurin fungicide.

In some embodiments, the strobilurin fungicide is selected from the group consisting of pyraclostrobin, fluoxastrobin, azoxystrobin, trifloxystrobin, picoxystrobin, and kresoxim-methyl.

In some embodiments, the fungicide is a multisite inhibitor.

In some embodiments, the fungicidal multisite inhibitor is selected from a group consisting of chlorothalonil, mancozeb, folpet, and captan.

In some embodiments, the fungicide is selected from the group consisting of: 5-fluoro-4-imino-3-methyl-1-tosyl-3,4-dihydropyrimidin-2 (1H)-one, fluxapyroxad, 2-phenylphenol; 8-hydroxyquinoline sulphate; acibenzolar-S-methyl;

imibenconazole; fluquinconazole aldimorph; amidoflumet; ampropylfos; ampropylfos-potassium; andoprim; anilazine; azaconazole; azoxystrobin; benalaxyl; benalaxyl-M; benodanil; benomyl; benthiavalicarb-isopropyl; benzamacril; benzamacril-isobutyl; bilanafos; bina-pacryl; biphenyl; bitertanol; itraconazole; blasticidin-S; boscalid; bromuconazole; bupirimate; buthiobate; butylamine; calcium polysulphide; capsimycin; captafol; captan; carbendazim; carboxin; carpropamid; carvone; quinomethionate; chlobenthiazone; chlorfenazole; chloroneb; chlorothalonil; chlozolinate; clozylacon; cyazofamid; cyflufenamid; cymoxanil; cyproconazole; cyprodinil; cyprofuram; Dagger G; debacarb; dichlofluanid; dichlone; dichlorophen; diclocymet; diclomezine; dicloran; diethofencarb; difenoconazole; diflumetorim; dimethirimol; dimethomorph; dimoxystrobin; diniconazole; diniconazole-M; dinocap; diphenylamine; dipyrithione; ditalimfos; dithianon; dodine; drazoxolon; edifenphos; epoxiconazole; ethaboxam; ethirimol; etridiazole; famoxadone; fenamidone; fenapanil; fenarimol; fenbuconazole; fenfuram; fenhexamid; fenitropan; fenoxanil; fenpiclonil; fenpropidin; fenpropimorph; ferbam; fluazinam; flubenzimine; fludioxonil; flumetover; flumorph; fluoromide; fluoxastrobin; flurprimidol; flusilazole; flusulfamide; flutolanil; flutriafol; prothioconazole; folpet; fosetyl-A1; fosetyl-sodium; fuberidazole; furalaxyl; furametpyr; furcarbanil; furmecyclox; guazatine; hexachlorobenzene; hexaconazole; hymexazol; imazalil; iminoctadine triacetate; iminoctadine tris(albesilate); iodocarb; ipconazole; iprobenfos; iprodione; iprovalicarb; irumamycin; isoprothiolane; isovaledione; kasugamycin; kresoxim-methyl; mancozeb; maneb; meferimzone; mepanipyrim; mepronil; metalaxyl; metalaxyl-M; metconazole; methasulfocarb; methfuroxam; metiram; metominostrobin; metsulfovax; mildiomycin; myclobutanil; myclozolin; natamycin; nicobifen; nitrothal-isopropyl; noviflumuron; nuarimol; ofurace; orysastrobin; oxadixyl; oxolinic acid; oxpoconazole; oxycarboxin; oxyfenthiin; paclobutrazol; pefurazoate; penconazole; pencycuron; phosdiphen; phthalide; picoxystrobin; piperalin; polyoxins; polyoxorim; probenazole; prochloraz; procymidone; propamocarb; propanosine-sodium; propiconazole; propineb; proquinazid; prothioconazole; pyraclostrobin; pyrazophos; pyrifenox; pyrimethanil; pyroquilon; pyroxyfur; pyrroInitrine; quinconazole; quinoxyfen; quintozene; silthiofam; simeconazole; spiroxamine; sulfur; tebuconazole; tecloftalam; tecnazene; tetcyclacis; tetraconazole; thiabendazole; thicyofen; thifluzamide; thiophanate-methyl; thiram; tioxymid; tolclofos-methyl; tolylfluanid; triadimefon; triadimenol; triazbutil; triazoxide; tricyclamide; tricyclazole; tridemorph; trifloxystrobin; triflumizole; triforine; triticonazole; uniconazole; validamycin A; vinclozolin; zineb; ziram; zoxamide; (2S)-N-[2-[4-[[3-(4-chlorophenyl)-2-propynyl]oxy]-3-methoxy-phenyl]ethyl]-3-methyl-2-[(methylsulfonyl)amino]butanamide; 1-(1-naphthalenyl)-1H-pyrrole-2,5-dione; 2,3,5,6-tetrachloro-4-(methylsulfonyl)pyridine; 2-amino-4-methyl-N-phenyl-5-thiazolecarboxamide; 2-chloro-N-(2,3-dihydro-1,1,3-trimethyl-1H-inden-4-yl)-3-pyridinecarboxamide; 3,4,5-trichloro-2,6-pyridinedicarbonitrile; actinovate; cis-1-(4-chlorophenyl)2-1H-1,2,4-triazol-1-yl)cycloheptanol; methyl 1-(2,3-dihydro-2,2-dimethyl-1H-inden-1-yl)-1H-imidazole-5-carboxylate; monopotassium carbonate; N-6-methoxy-3-pyridinyl)cyclopropanecarboxamide; N-butyl-8-(1,1-dimethylethyl)-1-oxa-spiro[4,5]decan-3-amine; sodium tetracarbonate; N-3'4'-dichloro-5-fluorobiphenyl-2-yl)-3-(difluoromethyl)-1-methyl-1H-pyrazole-4-carboxamide; and copper salts and preparations, such as Bordeaux mixture; copper hydroxide, copper naphthenate; copper oxychloride; copper sulphate; cufraneb; cuprous oxide; mancopper; oxine copper. Bactericides: bronopol, dichlorophen, nitrapyrin, nickel-dimethyldithiocarbamate, kasugamycin, octhilinone, furancarboxylic acid, oxytetracyclin, streptomycin, tecloftalam, copper sulphate and other copper preparations.

In some embodiments, the pesticide is an insecticide.

In some embodiments, insecticide is an acetylcholinesterase (AChE) inhibitors carbamates (for example alanycarb, aldicarb, aldoxycarb, allyxycarb, aminocarb, azamethiphos, bendiocarb, benfuracarb, bufencarb, butacarb, butocarboxim, butoxycarboxim, carbaryl, carbofuran, carbosulfan, chloethocarb, coumaphos, cyanofenphos, cyanophos, dimetilan, ethiofencarb, fenobucarb, fenothiocarb, formetanate, furathiocarb, isoprocarb, metam-sodium, methiocarb, methomyl, metolcarb, oxamyl, pirimicarb, promecarb, propoxur, thiodicarb, thiofanox, triazamate, trimethacarb, XMC, xylylcarb), organophosphates (for example acephate, azamethiphos, azinphos (-methyl, -ethyl), bromophos-ethyl, bromfenvinfos (-methyl), butathiofos, cadusafos, carbophenothion, chlorethoxyfos, chlorfenvinphos, chlormephos, chlorpyrifos (-methyl/-ethyl), coumaphos, cyanofenphos, cyanophos, chlorfenvinphos, demeton-S-methyl, demeton-S-methyl sulphone, dialifos, diazinon, dichlofenthion, dichlorvos/DDVP, dicrotophos, dimethoate, dimethylvinphos, dioxabenzofos, disulfoton, EPN, ethion, ethoprophos, etrimfos, famphur, fenamiphos, fenitrothion, fensulfothion, fenthion, flupyrazofos, fonofos, formothion, fosmethilan, fosthiazate, heptenophos, iodofenphos, iprobenfos, isazofos, isofenphos, isopropyl O-salicylate, isoxathion, malathion, mecarbam, methacrifos, methamidophos, methidathion, mevinphos, monocrotophos, naled, omethoate, oxydemeton-methyl, parathion (-methyl/-ethyl), phenthoate, phorate, phosalone, phosmet, phosphamidon, phosphocarb, phoxim, pirimiphos (-methyl/-ethyl), profenofos, propaphos, propetamphos, prothiofos, prothoate, pyraclofos, pyridaphenthion, pyridathion, quinalphos, sebufos, sulfotep, sulprofos, tebupirimfos, temephos, terbufos, tetrachlorvinphos, thiometon, triazophos, triclorfon, vamidothion).

In some embodiments, the insecticide is a sodium channel modulators/voltage-dependent sodium channel blockers pyrethroids (for example acrinathrin, allethrin (d-cis-trans, d-trans), beta-cyfluthrin, bifenthrin, bioallethrin, bioallethrin-S-cyclopentyl-isomer, bioethanomethrin, biopermethrin, bioresmethrin, chlovaporthrin, cis-cypermethrin, cis-resmethrin, cis-permethrin, clocythrin, cycloprothrin, cyfluthrin, cyhalothrin, cypermethrin (alpha-, beta-, theta-, zeta-), cyphenothrin, DDT, deltamethrin, empenthrin (1R isomer), esfenvalerate, etofenprox, fenfluthrin, fenpropathrin, fenpyrithrin, fen-valerate, flubrocythrinate, flucythrinate, flufenprox, flumethrin, fluvalinate, fubfenprox, gamma-cyhalothrin, imiprothrin, kadethrin, lambda-cyhalothrin, metofluthrin, permethrin (cis-, trans-), phenothrin (1R-trans isomer), prallethrin, profluthrin, protrifenbute, pyresmethrin, resmethrin, RU 15525, silafluofen, tau-fluvalinate, tefluthrin, terallethrin, tetramethrin (1R-isomer), tralomethrin, transfluthrin, ZXI 8901, pyrethrins (pyrethrum)) oxadiazines (for example indoxacarb).

In some embodiments, the insecticide is an acetylcholine receptor agonist/antagonist, chloronicotinyls/neonicotinoid (for example acetamiprid, clothianidin, dinotefuran, imidacloprid, nitenpyram, nithiazine, thiacloprid, and thiamethoxam), nicotine, bensultap, or cartap.

In some embodiments, the insecticide is an acetylcholine receptor modulator such as spinosyns (for example spinosad).

In some embodiments, the insecticide is a GABA-controlled chloride channel antagonist, cyclodiene organochlorine (for example camphechlor, chlordane, endosulfan, gamma-HCH, HCH, heptachlor, lindane and methoxychlor), or fiprol (for example acetoprole, ethiprole, fipronil and vaniliprole).

In some embodiments, the insecticide is a chloride channel activator or mectin (for example abamectin, avermectin, emamectin, emamectin-benzoate, ivermectin, milbemectin, and milbemycin).

In some embodiments, the insecticide is a Juvenile Hormone Mimetic (for example diofenolan, epofenonane, fenoxycarb, hydroprene, kinoprene, methoprene, pyriproxifen, and triprene).

In some embodiments, the insecticide is an ecdysone Agonists/Disruptors, diacylhydrazines (for example chromafenozide, halofenozide, methoxyfenozide, and tebufenozide).

In some embodiments, the insecticide is a chitin biosynthesis inhibitor, benzoylurea (for example bistrifluoron, chlofluazuron, diflubenzuron, fluazuron, flucycloxuron, flufenoxuron, hexaflumuron, lufenuron, novaluron, noviflumuron, penfluoron, teflubenzuron and triflumuron), buprofezin or cyromazine.

In some embodiments, the insecticide is an inhibitor of oxidative phosphorylation, ATP disruptors, diafenthiuron, or organotin compound (for example azocyclotin, cyhexatin, and fenbutatin-oxide).

In some embodiments, the insecticide is a pyrrole-based uncoupler of oxidative phosphorylation by interrupting the H proton gradient, (for example chlorfenapyr) or dinitrophenol (for example binapacyri, dinobuton, dinocap, and DNOC).

In some embodiments, the insecticide is a Site-I electron transport inhibitor, METI (for example fenazaquin, fenpyroximate, pyrimidifen, pyridaben, tebufenpyrad, and tolfenpyrad), hydramethylnon, or dicofol.

In some embodiments, the insecticide is rotenone, a Site-II electron transport inhibitor.

In some embodiments, the insecticide is a Site-III electron transport inhibitors, such as acequinocyl and fluacrypyrim.

In some embodiments, the insecticide is a microbial disruptor of the insect gut membrane *Bacillus thuringiensis* strains.

In some embodiments, the insecticide is a Fat Synthesis Inhibitor, such as tetronic acids (for example, spirodiclofen and spiromesifen), tetramic acids [for example 3-(2,5-dimethylphenyl)-8-methoxy-2-oxo-1-azaspiro[4,5]dec-3-en-4-yl ethyl carbonate (also known as: carbonic acid, 3-(2,5-dimethylphenyl)-8-methoxy-2-oxo-1-azaspiro[4,5]dec-3-en-4-yl ethyl ester, CAS-Reg. No.: 382608-10-8) and carbonic acid, cis-3-(2,5-dimethylphenyl)-8-methoxy-2-oxo-1-azaspiro[4.5]dec-3-en-4-yl ethyl ester (CAS-Reg. No.: 203313-25-1)].

In some embodiments, the insecticide is a carboxamide. In some embodiments, the carboxamide is flonicamid.

In some embodiments, the insecticide is an octopaminergic agonist. In some embodiments, the octopaminergic agonist is amitraz.

In some embodiments, the insecticide is an inhibitor of magnesium-stimulated ATPase.

In some embodiments, the inhibitor of magnesium-stimulated ATPase is propargite.

In some embodiments, the insecticide is a phthalimide (for example N<2>-[1,1-dimethyl-2-(methylsulphonyl) ethyl]-3-iodo-N<1>-[2-methyl-4-[1,2,2,2-tetrafluoro-1(trifluoromethyl)ethyl]phenyl]-1,2-benzenedicarboxamide (CAS-Reg. No.: 272451-65-7), flubendiamide).

In some embodiments, the insecticide is a nereistoxin analogue. In some embodiments, the nereistoxin analogue is thiocyclam hydrogen oxalate or thiosultap-sodium.

In some embodiments, the insecticide is a biological, hormone or pheromone (for example, azadirachtin, *Bacillus* spec., *Beauveria* spec., codlemone, *Metarrhizium* spec., *Paecilomyces* spec., thuringiensin, and *Verticillium* spec.).

In some embodiments, the insecticide is an active compound with unknown or unspecific mechanisms of action, fumigant (for example, aluminium phosphide, methyl bromide, and sulphuryl fluoride), selective antifeedant (for example, cryolite, flonicamid, and pymetrozine), mite growth inhibitor (for example, clofentezine, etoxazole, and hexythiazox), amidoflumet, benclothiaz, benzoximate, bifenazate, bromopropylate, buprofezin, quinomethionate, chlordimeform, chlorobenzilate, chloropicrin, clothiazoben, cycloprene, cyflu-metofen, dicyclanil, fenoxacrim, fentrifanil, flubenzimine, flufenerim, flutenzin, gossyplure, hydramethylnone, japonilure, metoxadiazone, petroleum, piperonyl butoxide, potassium oleate, pyrafluprole, pyridalyl, pyriprole, sulfluramid, tetradifon, tetrasul, triarathene, or verbutin.

In some embodiments, the pesticide is an herbicide.

In some embodiments, the herbicide is an anilide such as, for example, diflufenican and propanil; arylcarboxylic acid such as, for example, dichloropicolinic acid, dicamba and picloram; aryloxyalkanoic acid such as, for example, 2,4-D, 2,4-DB, 2,4-DP, fluoroxypyr, MCPA, MCPP and triclopyr; aryloxyphenoxy-alkanoic ester such as, for example, diclofop-methyl, fenoxaprop-ethyl, fluazifop-butyl, haloxyfop-methyl and quizalofop-ethyl; azinone such as, for example, chloridazon and norflurazon; carbamate such as, for example, chlorpropham, desmedipham, phenmedipham and propham; chloroacetanilide such as, for example, alachlor, acetochlor, butachlor, metazachlor, metolachlor, pretilachlor and propachlor; dinitroaniline such as, for example, oryzalin, pendimethalin and trifluralin; diphenyl ether such as, for example, acifluorfen, bifenox, fluoroglycofen, fomesafen, halosafen, lactofen and oxyfluorfen; urea such as, for example, chlortoluron, diuron, fluometuron, isoproturon, linuron and methabenzthiazuron; hydroxylamine such as, for example, alloxydim, clethodim, cycloxydim, sethoxydim and tralkoxydim; imidazolinone such as, for example, imazethapyr, imazamethabenz, imazapyr and imazaquin; nitrile such as, for example, bromoxynil, dichlobenil and ioxynil; oxyacetamide such as, for example, mefenacet; sulphonylurea such as, for example, amidosulfuron, bensulfuron-methyl, chlorimuron-ethyl, chlorsulfuron, cinosulfuron, metsulfuron-methyl, nicosulfurin, primisulfuron, pyrazosulfuron-ethyl, thifensulfuron-methyl, triasulfuron and tribenuron-methyl; thiocarbamate such as, for example, butylate, cycloate, di-allate, EPTC, esprocarb, molinate, prosulfocarb, thio-bencarb and tri-allate; triazine such as, for example, atrazin, cyanazin, simazin, simetryne, terbutryne and terbutylazin; triazinone such as, for example, hexazinon, metamitron and metribuzin; and another herbicide such as, for example, aminoazoleazole, 4-amino-N-(1,1-dimethylethyl)-4,5-dihydro-3-(1-methylethyl)-5-oxo-1H-1,2,4-azoleazole-1-carboxamide, benfuresate, bentazone, cinmethylin, clomazone, clopyralid, difenzoquat, dithiopyr, ethofumesate, fluorochloridone, glufosinate, glyphosate, isoxaben, pyridate, quinchlorac, quinmerac, sulphosate and tridiphane.

In some embodiments, the pesticide is a nematocide and/or mollusks repellent and control agent such as for example fluensulfone.

Examples of plant growth regulators which may be used are chlorocholine chloride, thidiazuron, cyclanilide, ethephon, benzyladenine and gibberellic acid.

Examples of the safener groups which may be used are mefenpyr, isoxadifen and cloquintocet-mexyl.

Examples of repellents which may be used are diethyltolylamide, ethylhexanediol and butopyronoxyl.

In some embodiments, the composition further comprises a physical stabilizer. In some embodiments, the physical stabilizer is selected from the group consisting of buffers, acidifiers, defoaming agents, thickeners and drift retardants.

In some embodiments, the composition further comprises at least one additive.

In some embodiments, the additive is selected from buffers, acidifiers, defoaming agents, thickeners, drift retardants, surfactant, pigments, wetting agents, safeners, and preservatives.

Additives refer but are not limited to surfactants, pigments, wetting agents, as well as safeners, or such preservatives as bacteriostats or bactericides.

Surfactants may include but are not limited to ionic or non-ionic surface-active agents. Examples of surfactants are alkyl-end-capped ethoxylate glycol, alkyl-end-capped alkyl block alkoxylate glycol, dialkyl sulfosuccinate, phosphate esters, alkyl sulfonates, alkyl aryl sulfonates, tristyrylphenol alkoxylates, natural or synthetic fatty acid alkoxylates, natural or synthetic fatty alcohols alkoxylates, alkoxylated alcohols (such as n-butyl alcohol poly glycol ether), block copolymers (such as ethylene oxide-propylene oxide block copolymers and ethylene oxide-butylene oxide block copolymers) or combinations thereof.

The agrochemical compositions according to the invention, for example in the dosage forms which are conventional for liquid preparations, can be applied either as such or after previously having been diluted with water, that is to say for example as emulsions, suspensions, dispersions or solutions. The application here is accomplished by the customary methods for example, by spraying, pouring or injecting.

The application rate of the agrochemical compositions according to the invention can be varied within a substantial range. It depends on the agrochemical active substance in question and on their content in the compositions.

The present invention also provides a package comprising any one of the pesticidal complexes, pesticidal delivery systems or compositions described herein.

Methods of Use of Cyclodextrin Complexes, Compositions and Delivery Systems

The present invention also provides a method for:

(i) controlling pest using a pesticide,
(ii) prolonging the controlling effect of a pesticide on a pest,
(iii) increasing the biological activity of a pesticide on a target,
(iv) increasing penetration of a pesticide into a target,
(v) increasing uptake and/or absorbance of a pesticide by a target,
(vi) increasing retention of a pesticide by a plant,
(vii) increasing the amount of time a pesticide is in contact with a plant,
(viii) increasing bioavailability of a pesticide,
(ix) decreasing the half maximal effective concentration (EC50) of a pesticide,
(x) decreasing the lethal concentration 50 (LC50) of a pesticide, and/or
(xi) decreasing the lethal concentration 90 (LC90) of a pesticide, comprising contacting (i) the pest or a locus thereof, (ii) a plant or a locus or propagation material thereof, (iii) soil, and/or (iv) an area in which pest infestation is to be prevented with at least one of the pesticidal complexes, pesticidal delivery systems or compositions described herein so as to thereby (i) control the pest using the pesticide,
(ii) prolong the controlling effect of the pesticide on the pest,
(iii) increase biological activity of the pesticide on the target,
(iv) increase penetration of the pesticide into the target,
(v) increase uptake and/or absorbance of the pesticide by the target,
(vi) increase retention of a pesticide by the target,
(vii) increase the amount of time the pesticide is in contact with the plant,
(viii) increase bioavailability of the pesticide,
(ix) decrease the half maximal effective concentration (EC50) of the pesticide,
(x) decrease the lethal concentration 50 (LC50) of the pesticide, and/or
(xi) decrease the lethal concentration 90 (LC90) of the pesticide.

The present invention also provides (i) use of the pesticidal complexes, pesticidal delivery systems and compositions described herein for, or (ii) the pesticidal complexes, pesticidal delivery systems or compositions disclosed h rein for use in:

(i) controlling pest using a pesticide,
(ii) prolonging the controlling effect of a pesticide on a pest,
(iii) increasing the biological activity of a pesticide on a target,
(iv) increasing penetration of a pesticide into a target,
(v) increasing uptake and/or absorbance of a pesticide by a target,
(vi) increasing retention of a pesticide by the plant,
(vii) Increasing the amount of time a pesticide is in contact with a plant,
(viii) increasing bioavailability of a pesticide,
(ix) decreasing the half maximal effective concentration (EC50) of a pesticide,
(x) decreasing the lethal concentration 50 (LC50) of a pesticide, and/or
(xi) decreasing the lethal concentration 90 (LC90) of a pesticide, comprising contacting (i) the pest or a locus thereof, (ii) a plant or a locus or propagation material thereof, (iii) soil, and/or (iv) an area in which pest infestation is to be prevented.

The present invention provides a method for improving pest control comprising applying any one of the compositions, inclusion complexes or delivery systems described herein to a plant/or soil.

The present invention provides (i) use of any one of the pesticidal complexes, pesticidal delivery systems or compositions described herein for, or (ii) the pesticidal complexes, pesticidal delivery systems or compositions disclosed herein for use in improving pest control comprising applying the pesticidal complexes, pesticidal delivery systems or compositions described herein to a plant/or soil.

In some embodiments, the pest is phytopathogenic fungi. In some embodiments, the pest is unwanted insect. In some embodiments, the pest is unwanted weed.

In some embodiments, controlling pest comprises preventing pest infestation. In some embodiments, controlling pest comprises curing pest infestation. In some embodiments, controlling pest comprises curing pest infestation as curative treatment and the pesticide is other than folpet and captan. In some embodiments, controlling pest comprises curing pest infestation as curative treatment and the phthalimide fungicide is other than folpet and captan.

In some embodiment, the method is effective as a curative treatment. In some embodiments, the method is effective as a preventative treatment.

In some embodiments, the method is effective as a knock down treatment. In some embodiments, the method is effective for increasing persistence of the pesticide. In some embodiments, the method is effective as a persistence treatment.

In some embodiments, systemic and translaminar fungicide can be used for curative, preventing and persistence activity/treatment.

In some embodiments, contact fungicide can be used for preventing and persistence activity/treatment.

In some embodiments, the method prolongs the controlling effect of the pesticide. In some embodiments, the method increases the biological activity of the pesticide on the pest. In some embodiments, the method increases penetration of the pesticide into a plant. In some embodiments, the method increases uptake or absorbance of the pesticide by a plant. In some embodiments, the method increases bioavailability of the pesticide. In some embodiments, the method increases retention of the pesticide by a plant. In some embodiments, the method decreases the half maximal effective concentration (EC50) of the pesticide. In some embodiments, the method decreases the lethal concentration 50 (LC50) of the pesticide. In some embodiments, the method decreases the lethal concentration 90 (LC90) of the pesticide.

The present invention also provides a method for:

(i) controlling pest using a pesticide, (ii) prolonging the controlling effect of a pesticide on a pest, (iii) increasing the biological activity of a pesticide on a target, (iv) increasing penetration of a pesticide into a target, (v) increasing uptake and/or absorbance of a pesticide by a target, (vi) increasing retention of a pesticide by the plant, (vii) increasing the amount of time a pesticide is in contact with a plant, (viii) increasing bioavailability of a pesticide, (ix) decreasing the half maximal effective concentration (EC50) of a pesticide, (x) decreasing the lethal concentration 50 (LC50) of a pesticide, and/or (xi) decreasing the lethal concentration 90 (LC90) of a pesticide, comprising interacting the pesticide with cyclodextrin through intermolecular force(s) prior to application of the pesticide to a plant and/or soil so as to thereby (i) control the pest using the pesticide, (ii) prolong the controlling effect of the pesticide on the pest, (iii) increase biological activity of the pesticide on the target, (iv) increase penetration of the pesticide into the target, (v) increase uptake and/or absorbance of the pesticide by the target, (vi) increase retention of a pesticide by the target, (xii) increase the amount of time a pesticide is in contact with a plant, (vii) increase bioavailability of the pesticide, (viii) decrease the half maximal effective concentration (EC50) of the pesticide, (ix) decrease the lethal concentration 50 (LC50) of the pesticide, and/or (x) decrease the lethal concentration 90 (LC90) of the pesticide.

In some embodiments, controlling pest comprises preventing pest infestation. In some embodiments, controlling pest comprises curing pest infestation.

In some embodiments, the method is effective as a preventive treatment. In some embodiments, the method is effective as a curative treatment. In some embodiments, the method is effective as a curative treatment and the pesticide is other than folpet and captan. In some embodiments, the method is effective as a curative treatment and the phthalimide fungicide is other than folpet and captan. In some embodiments, the method is effective as a knock down treatment. In some embodiments, the method is effective as a persistence treatment. In some embodiments, the method is effective for increasing persistence of the pesticide.

In some embodiments, the method comprises partially or entirely interacting molecules of the pesticide with molecules of the cyclodextrin through intermolecular force(s). In some embodiments, the method comprises chemically interacting molecules of the pesticide with molecules of the cyclodextrin through intermolecular force(s). In some embodiments, the method comprises non-covalently interacting molecules of the pesticide with molecules of the cyclodextrin through intermolecular force(s).

In some embodiments, the method comprises complexing molecules of the pesticide with molecules of the cyclodextrin. In some embodiments, the method comprises encapsulating molecules of the pesticide within the molecules of the cyclodextrin. In some embodiments, the method comprises adsorbing molecules of the pesticide with molecules of the cyclodextrin. In some embodiments, molecules of the pesticide are adsorbed chemically with molecules of the cyclodextrin through intermolecular force(s). In some embodiments, molecules of the pesticide are adsorbed non-covalently with molecules of the cyclodextrin through intermolecular force(s).

In some embodiments, molecules of the pesticide are entirely complexed with molecules of the cyclodextrin prior to application. In some embodiments, molecules of the pesticide are partially complexed with molecules of the cyclodextrin prior to application. In some embodiments, molecules of the pesticide are entirely encapsulated within with molecules of the cyclodextrin prior to application. In some embodiments, molecules of the pesticide are partially encapsulated within molecules of the cyclodextrin prior to application.

In some embodiments, at least 20% of the molecules of the pesticide are complexed with the molecules of the cyclodextrin prior to application. In some embodiments, at least 20% of the molecules of the pesticide are encapsulated within the molecules of the cyclodextrin prior to application.

In some embodiments, the pesticide is selected from the group consisting of phthalimide fungicide, dithiocarbamate fungicide, diamide insecticide, voltage dependent sodium channel blocker insecticide, dinitroaniline herbicide and any combination thereof.

Preferred embodiments regarding pesticides that may be used in connection with the subject invention are described above.

In some embodiments, pesticide is other than folpet. In some embodiments, the pesticide is other than captan.

In some embodiments, the cyclodextrin is α (alpha)-cyclodextrin: 6-membered ring sugar molecule. In some embodiments, the cyclodextrin is β (beta)-cyclodextrin: 7-membered ring sugar molecule. In some embodiments, the cyclodextrin is γ (gamma)-cyclodextrin: 8-membered ring sugar molecule.

Preferred embodiments regarding cyclodextrins that may be used in connection with the subject invention are described above. Preferred combinations of pesticide(s) and cyclodextrin(s) are also described above.

In some embodiments, the cyclodextrin increases the contact uptake of the insecticide compared to chewing and/or sucking uptake by the pest.

Increasing biological activity refers to curative activity, knockdown activity, preventive activity and/or persistence performance. In some embodiments, the biological activity refers to curative activity and the pesticide is other than folpet and captan. In some embodiments, the biological activity refers to curative activity and the phthalimide fungicide is other than captan and folpet.

In some embodiments, the target is a plant. In some embodiments, the target is a pest. In some embodiments, the pest is a fungus. In some embodiments, t e pest is an insect. In some embodiments, the pest is a weed.

The present invention also provides a method for pest control by preventive and/or knock down treatment of a plant disease caused by insect comprising contacting a plant, a locus thereof or propagation material thereof with an effective amount of any one of the herein disclosed cyclodextrin compositions complexing or encapsulating the insecticide selected from diamide insecticide, oxadiazine insecticide and semicarbazone insecticide.

The present invention also provides a method for pest control by preventive and/or knock down treatment comprising contacting a plant, a locus thereof or propagation material thereof with an effective amount of any one of the herein disclosed cyclodextrin compositions complexing or encapsulating the insecticide selected from diamide insecticide, oxadiazine insecticide and semicarbazone insecticide.

The present invention also provides a method for pest control by preventive, curative or persistence treatments of a plant disease caused by phytopathogenic fungi comprising contacting a plant, a locus thereof or propagation material thereof with an effective amount of any one of the compositions, inclusion complexes or delivery system disclosed herein.

The present invention also provides a method for pest control by preventive, curative or persistence treatments comprising contacting a plant, a locus thereof or propagation material thereof with an effective amount of any one of the compositions, inclusion complexes or delivery system disclosed herein.

The present invention also provides a method for controlling unwanted insects comprising applying to an area infested with said insects an effective amount of at least one of any one of the compositions, inclusion complexes or delivery system disclosed herein.

The present invention also provides a method for controlling unwanted weed comprising applying to an area infested with said weed an effective amount of at least one of any one of the compositions, inclusion complexes or delivery system disclosed herein.

Controlling refers to preventive, persistence, curative and/or knock down treatments.

The present invention also provides a method for pest control by preventive, curative and/or persistence treatment of a plant disease caused by phytopathogenic fungi comprising contacting a plant, a locus thereof or propagation material thereof with an effective amount of any one of the herein disclosed cyclodextrin compositions complexing or encapsulating the phthalimide fungicide.

The present invention also provides a method for pest control by preventive, curative or persistence treatment comprising contacting a plant, a locus thereof or propagation material thereof with an effective amount of any one of herein disclosed cyclodextrin compositions complexing or encapsulating a phthalimide fungicide.

The present invention provides a method of controlling a disease caused by phytopathogenic fungi on plants or propagation material thereof, comprising contacting the plants, the locus thereof or propagation material thereof with at least one of the herein defined complexes, compositions or delivery systems.

The present invention also provides a method for pest control by preventive, curative and/or persistence treatment of a plant disease caused by insect comprising contacting a plant, a locus thereof or propagation material thereof with an effective amount of any one of the herein disclosed cyclodextrin compositions complexing or encapsulating the diamide insecticide.

The present invention also provides a method for pest control by preventive, curative and/or persistence treatment comprising contacting a plant, a locus thereof or propagation material thereof with an effective amount of any one of the herein disclosed cyclodextrin compositions complexing or encapsulating the diamide insecticide.

The present invention provides a method for controlling unwanted insects comprising applying to an area infested with said insects at least one of the herein defined complexes and/or compositions.

Exemplary, non-limiting pests that can be controlled in this regard include herbs, fungi, insects, and nematodes.

The present compositions can be diluted and applied in a customary manner, for example by watering (drenching), drip irrigation, spraying, and/or atomizing.

The described compositions or mixtures may be applied to healthy or diseased plants.

In another embodiment, the described compositions or mixtures can be used on various plants including but not limited to crops, seeds, bulbs, propagation material, or ornamental species.

In some embodiments, the fungus is one of Leaf Blotch of Wheat (*Mycosphaerella graminicola*; anamorph: *Septoria tritici*), Wheat Brown Rust (*Puccinia triticina*), Stripe Rust (*Puccinia striiformis* f sp. *tritici*), Scab of Apple (*Venturia iraequalis*), Blister Smut of Maize (*Ustilago maydis*), Powdery Mildew of Grapevine (*Uncinula necator*), Barley scald (*Rhynchosporium secalis*), Blast of Rice (*Magnaporthe grisea*), Rust of Soybean (*Phakopsora pachyrhizi*), Glume Blotch of Wheat (*Leptosphaeria nodorum*), Powdery Mildew of Wheat (*Blumeria graminis* f. sp. *tritici*), Powdery Mildew of Barley (*Blumeria graminis* f sp. *hordei*), Powdery Mildew of Cucurbits (*Erysiphe cichoracearum*), Anthracnose of Cucurbits (*Glomerella lagenarium*), Leaf Spot of Beet (*Cercospora beticola*), Early Blight of Tomato (*Alternaria solani*), and Net Blotch of Barley (*Pyrenophora teres*).

Insects may include but are not limited to sucking insects and chewing insects.

Sucking insects may include but are not limited to aphids and stink bugs, chewing insects may include but are not limited to *lepidoptera, Helicoverpa*, pollen beetle and other chewing.

In some embodiments, the insect is one of Isopoda (*Oniscus asellus, Armadillidium vulgare, Porcellio scaber*), Diplopoda (*Blaniulus guttulatus*), Chilopoda (*Geophilus carpophagus, Scutigera* spp), Symphyla (*Scutigerella immaculata*), Thysanura (*Lepisma saccharina*), Collembola (*Onychiurus armatus*), Orthoptera (*Acheta domesticus, Gryllotalpa* spp., *Locusta migratoria migratorioides, Melanoplus* spp., *Schistocerca gregaria*), *Blattaria* (*Blatta orientalis, Periplaneta americana, Leucophaea maderae, Blattella germanica*), Dermaptera (*Forficula auricularia*), Isoptera (*Reticulitermes* spp), Phthiraptera (*Pediculus humanus corporis, Haematopinus* spp., *Linognathus* spp., *Trichodectes* spp., *Damalinia* spp), Thysanoptera (*Hercinothrips femoralis, Thrips tabaci, Thrips palmi, Frankliniella occidentalis*), Heteroptera (*Eurygaster* spp., *Dysdercus intermedius, Piesma quadrata, Cimex lectularius, Rhodnius prolixus, Triatoma* spp.) Homoptera (*Aleurodes brassicae, Bemisia tabaci, Trialeurodes vaporariorum, Aphis gossypii, Brevicoryne brassicae, Cryptomyzus ribis, Aphis fabae, Aphis pomi, Eriosoma lanigerum, Hyalopterus arundinis, Phylloxera vastatrix, Pemphigus* spp., *Macrosiphum avenae, Myzus* spp., *Phorodon humuli, Rhopalosiphum padi, Empoasca* spp., *Euscelis bilobatus, Nephotettix cincticeps, Lecanium comi, Saissetia oleae, Laodelphax striatellus, Nilaparvata lugens, Aonidiella aurantii, Aspidiotus hederae, Pseudococcus* spp., *Psylla* spp), *lepidoptera* (*Pectinophora gossypiella, Bupalus piniarius, Chematobia brumata, Lithocolletis blancardella, Hyponomeuta padella, Plutella xylostella, Malacosoma neustria, Euproctis chrysorrhoea, Lymantria* spp., *Bucculatrix thurberiella, Phyllocnistis citrella, Agrotis* spp., *Euxoa* spp., *Feltia* spp., *Earias insulana, Heliothis* spp., *Mamestra brassicae, Panolis flammea, Spodoptera* spp., *Trichoplusia ni, Carpocapsa pomonella, Pieris* spp., *Chilo* spp., *Pyrausta nubilalis, Ephestia kuehniella, Galleria mellonella, Tineola bisselliella, Tinea pellionella, Hofmannophila pseudospretella, Cacoecia podana, Capua reticulana, Choristoneura fumiferana, Clysia ambiguella, Homona magnanima, Tortrix viridana, Cnaphalocerus* spp., *Oulema oryzae*), From the order of the Coleoptera, for example, *Anobium punctatum, Rhizopertha dominica, Bruchidius obtectus, Acanthoscelides obtectus, Hylotrupes bajulus, Agelastica alni, Leptinotarsa decemlineata, Phaedon cochleariae, Diabrotica* spp., *Psylliodes chrysocephala, Epilachna varivestis, Atomaria* spp., *Oryzaephilus* surinamensis, *Anthonomus* spp., *Sitophilus* spp., *Otiorrhynchus sulcatus, Cosmopolites sordidus, Ceuthorrhynchus assimilis, Hypera postica, Dermestes* spp., *Trogoderma* spp., *Anthrenus* spp., *Attagenus* spp., *Lyctus* spp., *Meligethes aeneus, Ptinus* spp., *Niptus hololeucus, Gibbium psylloides, Tribolium* spp., *Tenebrio molitor, Agriotes* spp., *Conoderus* spp., *Melolontha, Amphimallon solstitialis, Costelytra zealandica, Lissorhoptrus oryzophilus*), Hymenoptera (*Diprion* spp., *Hoplocampa* spp., *Lasius* spp., *Monomorium pharaonis, Vespa* spp), Diptera (*Aedes* spp., *Anopheles* spp., *Culex* spp., *Drosophila melanogaster, Musca* spp., *Fannia* spp., *Calliphora erythrocephala, Lucilia* spp., *Chrysomyia* spp., *Cuterebra* spp., *Gastrophilus* spp., *Hyppobosca* spp., *Stomoxys* spp., *Oestrus* spp., *Hypoderma* spp., *Tabanus* spp., *Tannia* spp., *Bibio hortulanus, Oscinella frit, Phorbia* spp., *Pegomyia hyoscyami, Ceratitis capitata, Dacus oleae, Tipula paludosa, Hylemyia* spp., *Liriomyza* spp), Siphonaptera (*Xenopsylla cheopis, Ceratophyllus* spp), Arachnida (*Scorpio maurus, Latrodectus mactans, Acarus siro, Argas* spp., *Ornithodoros* spp., *Dermanyssus gallinae, Eriophyes ribis, Phyllocoptruta oleivora, Boophilus* spp., *Rhipicephalus* spp., *Amblyomma* spp., *Hyalomma* spp., *Ixodes* spp., *Psoroptes* spp., *Chorioptes* spp., *Sarcoptes* spp., *Tarsonemus* spp., *Bryobia praetiosa, Panonychus* spp., *Tetranychus* spp., *Hemitarsonemus* spp., *Brevipalpus* spp), plant-parasitic nematodes include (*Pratylenchus* spp., *Radopholus similis, Ditylenchus dipsaci, Tylenchulus semipenetrans, Heterodera* spp., *Globodera* spp., *Meloidogyne* spp., *Aphelenchoides* spp., *Longidorus* spp., *Xiphinema* spp., *Trichodorus* spp., *Bursaphelenchus* spp).

In some embodiments, the weed is one of *Alopecurus myosuroides* (ALOMY), *Lolium perenne* (LOLPE), *Matricaria recutita* (MATCH), *Papaver rhoeas* (PAPRH), and *Veronica persica* (VERPE).

In some embodiments, the treatment with the herbicide cyclodextrin complex is pre-emergence. In some embodiments, the treatment with the herbicide cyclodextrin complex is post-emergence.

Crops include cereals such as wheat, barley, rye, oats, sorghum and millet, rice, cassava and maize, or else crops of peanut, sugar beet, cotton, soya, oilseed rape, potato, tomato, peach and vegetables.

In some embodiments, the method comprises an application rate of 1 g active ingredient (a.i.)/ha to 1000 g a.i./ha. In some embodiments, the application rate is any one of the following rates: 1 g a.i./ha to 800 g a.i./ha, 1 g a.i./ha to 750 g a.i./ha, 1 g a.i./ha to 500 g a.i./ha, 1 g a.i./ha to 350 g a.i./ha, 200 g a.i./ha to 800 g a.i./ha, 300 g a.i./ha to 750 g a.i./ha, 350 g a.i./ha to 750 g a.i./ha, 1 g a.i./ha to 300 g a.i./ha, 1 g a.i./ha to 150 g a.i./ha, 1 g a.i./ha to 100 g a.i./ha, 1 g a.i./ha to 75 g a.i./ha, or 5 g a.i./ha to 55 g a.i./ha. In some embodiments, the application rate is any one of the following rates: 760 g a.i./ha, 750 g a.i./ha, 605 g a.i./ha, 380 g a.i./ha, 350 g a.i./ha, 300 g a.i./ha, 50 g a.i./ha, 25 g a.i./ha, 12.5 g a.i./ha, 7.5 g a.i./ha or 6.25 g a.i./ha.

In some embodiments, the pesticide is applied at any one of the following rates: 1 g a.i./ha to 1000 g a.i./ha, 1 g a.i./ha to 750 g a.i./ha, 1 g a.i./ha to 500 g a.i./ha, 1 g a.i./ha to 350 g a.i./ha, 200 g a.i./ha to 800 g a.i./ha, 300 g a.i./ha to 750 g a.i/ha, 350 g a.i./ha to 750 g a.i./ha, 1 g a.i./ha to 300 g a.i./ha, 1 g a.i./ha to 150 g a.i./ha, 1 g a.i./ha to 100 g a.i./ha, 1 g a.i./ha to 75 g a.i./ha or 5 g a.i./ha to 55 g a.i./ha. In so e embodiments, the pesticide is applied at any one of the following rates: 750 g a.i./ha, 605 g a.i./ha, 350 g a.i./ha, 300 g a.i./ha, 75 g a.i./ha, 6.25 g a.i/ha, 12.5 g a.i/ha, 25 g a.i./ha or 50 g a.i./ha.

In some embodiments, the pesticide is applied at a rate effective for controlling the pest. In some embodiments, the pesticide is applied at a rate effective for preventing infestation of the pest. In some embodiments, the pesticide is applied at a rate effective for curing infestation of the pest.

In some embodiments, the method is effective for preventing infestation of the pest. In some embodiments, the method is effective for curing infestation of the pest. In some embodiments, the method is effective for increasing the pesticidal activity of the pesticide. In some embodiments, the method is effective for prolonging the pesticidal effect of the pesticide. In some embodiments, the method is effective for increasing uptake of the pesticide by the plant, increasing penetration of the pesticide into the plant, increasing retention of the pesticide by the plant, and/or increasing the bioavailability of the pesticide to the plant.

In some embodiments, the method is effective for decreasing the half maximal effective concentration ($EC_{50}$) of the pesticide. In some embodiments, the method is effective for decreasing the $EC_{50}$ by at least 10, at least 25%, at least 35% or at least 50%.

In some embodiments, the method is effective for decreasing the $LC_{50}$ of the pesticide. In some embodiments, the method is effective for decreasing the $LC_{50}$ by at least 10%, at least 25%, at least 50%, at least 75% or at least 90%.

In some embodiments, the method is effective for decreasing the $LC_{90}$ of the pesticide. In some embodiments, the method is effective for decreasing the $LC_{90}$ by at least 10%, at least 25%, at least 50%, at least 75% or at least 90%.

In some embodiments, the method further comprises applying at least one additional agrochemical to the pest or the plant or the locus or propagation material thereof.

In some embodiments, the composition, inclusion complex or delivery system is tank mixed with an additional agrochemical. In some embodiments, the composition, inclusion complex or delivery system is applied sequentially with the additional agrochemical.

In some embodiments, the composition, inclusion complex or delivery system is tank mixed with an additional adjuvant. In some embodiments, the composition, inclusion complex or delivery system is applied sequentially with an additional adjuvant.

The additional agrochemicals which may be used in connection with the present invention are described hereinabove.

Uses of Cyclodextrins

The present invention provides a method for (i) prolonging and/or facilitating the controlling or biological effect of a pesticide on a pest,
(ii) increasing and/or enhancing the biological activity of a pesticide on a target,
(iii) increasing penetration of a pesticide into a target,
(iv) increasing uptake and/or absorbance of a pesticide by a target,
(v) increasing retention of a pesticide by the plant,
(vi) increasing the amount of time a pesticide is in contact with a plant,
(vii) increasing bioavailability of a pesticide,
(viii) decreasing the half maximal effective concentration (EC50) f a pesticide,
(ix) decreasing the lethal concentration 50 (LC50) of a pesticide, and/or
(x) decreasing the lethal concentration 90 (LC90) of a pesticide comprising interacting the pesticide with cyclodextrin through intermolecular force(s) or complexing or encapsulating the pesticide within the cyclodextrin.

The present invention provides the (i) use of cyclodextrin for or (ii) cyclodextrins for use in:

(i) prolonging and/or facilitating the controlling or biological effect of a pesticide on a pest,
(ii) increasing and/or enhancing the biological activity of a pesticide on a target,
(iii) increasing penetration of a pesticide into a target,
(iv) increasing uptake and/or absorbance of a pesticide by a target,
(v) increasing retention of a pesticide by the plant,
(vi) increasing the amount of time a pesticide is in contact with a plant,
(vii) increasing bioavailability of a pesticide,
(viii) decreasing the half maximal effective concentration (EC50) of a pesticide,
(ix) decreasing the lethal concentration 50 (LC50) of a pesticide, and/or
(x) decreasing the lethal concentration 90 (LC90) of a pesticide.

In some embodiments, the biological activity is pesticidal activity.

The present invention provides the use of cyclodextrin for or cyclodextrins for use in increasing the pesticidal activity of a pesticide selected from phthalimide fungicide, dithiocarbamate fungicide, diamide insecticide, oxadiazine insecticide, semicarbazone insecticide and dinitroaniline herbicide.

In some embodiments, the pesticidal activity is fungicidal activity and the pesticide is a phthalimide fungicide or dithiocarbamate fungicide. In some embodiments, the pesticidal activity is insecticidal activity and the pesticide is a diamide insecticide or voltage dependent sodium channel blocker insecticide. In some embodiments, the pesticidal activity is insecticidal activity and the pesticide is a diamide insecticide, oxadiazine insecticide or semicarbazone insecticide. In some embodiments, the pesticidal activity is herbicidal activity and the herbicide is a dinitroaniline herbicide.

The present invention provides the use of cyclodextrin for or cyclodextrins for use in prolonging and/or facilitating the biological effect of a pesticide selected from phthalimide fungicide, diamide insecticide, oxadiazine insecticide, semicarbazone insecticide and dinitroaniline herbicide.

In some embodiments, the biological effect is pesticidal effect.

In some embodiments, the pesticidal effect is fungicidal effect and the pesticide is a phthalimide fungicide or dithiocarbamate fungicide. In some embodiments, the pesticidal effect is insecticidal effect and the pesticide is a diamide insecticide or voltage dependent sodium channel blocker insecticide. In some embodiments, the pesticidal effect is insecticidal effect and the pesticide is a diamide insecticide, oxadiazine insecticide or semicarbazone insecticide. In some embodiments, the pesticidal effect is herbicidal effect and the herbicide is a dinitroaniline herbicide.

In some embodiments, the pesticide is selected from the group consisting of phthalimide fungicide, dithiocarbamate fungicide, diamide insecticide, voltage dependent sodium channel blocker insecticide, dinitroaniline herbicide and any combination thereof.

Preferred embodiments regarding pesticides that may be used in connection with the present invention are described above.

In some embodiments, the cyclodextrin is α (alpha)-cyclodextrin: 6-membered ring sugar molecule. In some embodiments, the cyclodextrin is β (beta)-cyclodextrin: 7-membered ring sugar molecule. In some embodiments, the cyclodextrin is γ (gamma)-cyclodextrin: 8-membered ring sugar molecule.

Preferred embodiments regarding cyclodextrins that may be used in connection with the present invention are described above.

In some embodiments, the method or use comprises interacting molecules of the pesticide with molecules of the cyclodextrin through intermolecular force(s). In some embodiments, the method or use comprises chemically interacting molecules of the pesticide with molecules of the cyclodextrin through intermolecular force(s). In some embodiments, the method or use comprises partially or entirely interacting molecules of the pesticide with molecules of the cyclodextrin through intermolecular force(s). In some embodiments, the method or use comprises non-covalently interacting molecules of the pesticide with molecules of the cyclodextrin through intermolecular force(s).

In some embodiments, the method or use comprises adsorbing molecules of the pesticide with molecules of the cyclodextrin. In some embodiments, the method or use comprises chemically adsorbing molecules of the pesticide with molecules of the cyclodextrin through intermolecular force(s). In some embodiments, the method or use comprises non-covalently adsorbing molecules of the pesticide with molecules of the cyclodextrin through intermolecular force(s). In some embodiments, the method or use comprises complexing molecules of the pesticide with molecules of the cyclodextrin. In some embodiments, the method or use comprises encapsulating molecules of the pesticide by or within the molecules of the cyclodextrin.

In some embodiments, the method or use comprises chemically interacting the pesticide with the cyclodextrin by complexing or encapsulating molecules of the pesticide entirely or partially within molecules of the cyclodextrin prior to application of the pesticide to a plant and/or soil. In some embodiments, the method or use comprises interacting the pesticide with cyclodextrin through intermolecular force (s) prior to application of the pesticide to a plant/or soil.

Cyclodextrin was also found to act as an inactive ingredient which affects the persistence activity of the pesticide.

In some embodiments, the persistence activity of the pesticide lasts for at least 1 week, 2 weeks, 3 weeks, 4 weeks, or 5 weeks after application.

In some embodiments, the biological activity of the pesticide lasted for at least 7 days, 14 days, or 21 days after application.

The present invention also provides a method for increasing pesticidal activity of a pesticide on a pest comprising interacting the pesticide with cyclodextrin through intermolecular force(s) prior to application of the pesticide to a plant/or soil so as to thereby increase pesticidal activity of the pesticide.

In some embodiments, the pesticidal activity is fungicidal activity, the pest is a fungus and the pesticide is a phthalimide fungicide or dithiocarbamate fungicide. In some embodiments, the pesticidal activity is insecticidal activity, the pest is an insect and the pesticide is a diamide insecticide or voltage dependent sodium channel blocker insecticide. In some embodiments, the voltage dependent sodium channel blocker insecticide is an oxadiazine insecticide. In some embodiments, the voltage dependent sodium channel blocker insecticide is a semicarbazone insecticide. In some embodiments, the pesticidal activity is herbicidal activity, the pest is a weed and the pesticide is a dinitroaniline herbicide.

The present invention provides the use of cyclodextrin for or cyclodextrins for use in increasing bioavailability of a pesticide selected from the group consisting of phthalimide fungicide, dithiocarbamate fungicide, diamide insecticide, voltage dependent sodium channel blocker insecticide, dinitroaniline herbicide and any combination thereof.

Methods for Preparing Pesticidal Complexes

Cyclodextrin inclusion complexes with pesticides are prepared at several weight and molar ratios.

The pesticidal complexes of the present invention may be prepared us ng the suspension method. In some embodiments, the non-covalent interaction is obtained by suspension method.

The pesticidal complexes of the present invention may be prepared using the kneading method. In some embodiments, the non-covalent interaction is obtained by kneading method.

Suspension Method:

Cyclodextrin inclusion complexes with pesticides may be prepared by (i) dissolving or suspending the cyclodextrin in water to prepare a solution, (ii) addirng pesticide to the solution of step (i) to prepare a suspension, and (iii) stirring the suspension of step (ii). In some embodiments, the stirring is continued for 1-24 hours.

Cyclodextrin inclusion complexes with pesticides may also be prepared by the suspension method by (i) preparing a suspension comprising the pesticide and the cyclodextrin and (ii) adding water to the suspension and stirring the suspension. In some embodiments, the stirring is continued for 1-24 hours.

After the pesticide is interacted with the cyclodextrin, the water is removed.

Water may be removed using drying techniques including, but not limited to, lyophilization (freeze drying), spray drying, film drying, heating, other acceptable drying techniques and any combination thereof to give the cyclodextrin-pesticide complex (without removing the non-reacted pesticide).

The content of pesticide in the complex may be determined by HPLC and the complexation may be proven by DSC (differential scanning calorimetry).

Kneading Method:

Cyclodextrin inclusion complexes with pesticides may be prepared by (i) homogenizing the cyclodextrin and the pesticide in dry powder form to obtain a mixture, (ii) adding water to the powder mixture of step (i), and (iii) allowing the homogenized powder to form a thick, concentrated suspension by a pestle at room temperature and thoroughly homogenized by pestle.

In some embodiments, the composition is dried by vacuum drying.

In some embodiments, the dry composition is ground to fine powder.

In some embodiments, the grounded powder is sieved.

In some embodiments, the powder is sieved through 0.5 mm mesh size screen/mesh.

The content of pesticide in the complex is determined by HPLC and the complexation is proven by DSC (differential scanning calorimetry).

The present invention provides a process for preparing the pesticidal complex, pesticidal delivery system and compositions described herein, wherein the process comprises (i) complexing the pesticide within cyclodextrin to form a pesticide-cyclodextrin inclusion complex, and (ii) dissolving the pesticide-cyclodextrin complex in an aqueous carrier to form the composition.

The present invention provides a process for preparing the pesticidal complex, pesticidal delivery system and compositions described herein, wherein the process comprises (i) complexing the pesticide within cyclodextrin to form a pesticide-cyclodextrin inclusion complex, and (ii) diluting the pesticide-cyclodextrin complex in an aqueous carrier to form the composition.

In some embodiments, the pesticide is a phthalimide fungicide. In some embodiments, the pesticide is a diamide insecticide. In some embodiments, the pesticide is oxadiazine insecticide. In some embodiments, the insecticide is semicarbazone insecticide. In some embodiments, the pesticide is dinitroaniline herbicide.

The present invention provides a process for preparing the pesticidal complex, pesticidal delivery system and compositions described herein, wherein the process comprises (i) encapsulating the pesticide within cyclodextrin to form a pesticide-cyclodextrin molecular assembly structure, and (ii) dissolving the pesticide-cyclodextrin structure in an aqueous carrier to form the composition.

The present invention provides a process for preparing the pesticidal complex, pesticidal delivery system and compositions described herein, wherein the process comprises (i) encapsulating the pesticide within cyclodextrin to form a pesticide-cyclodextrin structure molecular assembly, and (ii) diluting the pesticide-cyclodextrin structure in an aqueous carrier to form the composition.

In some embodiments, the pesticide is a phthalimide fungicide. In some embodiments, the pesticide is a dithiocarbamate fungicide. In some embodiments, the pesticide is a diamide insecticide. In some embodiments, the pesticide is oxadiazine insecticide. In some embodiments, the insecticide is semicarbazone insecticide. In some embodiments, the pesticide is dinitroaniline herbicide.

In some embodiments the encapsulation step comprises a suspension method.

In some embodiments, the suspension method comprises the steps of:

(a) suspending pesticide into a cyclodextrin solution, and (b) isolating the complex and the non reacted pesticide by lyophilization or drying of the remaining solution.

The present invention provides a pesticidal complex, pesticidal delivery system or composition prepared using any one of the processes described herein.

In some embodiments, the weight ratio of the pesticide to the cyclodextrin is about 1:1 to 1:5. In some embodiments, the weight ratio of the pesticide to the cyclodextrin is about 1:2. In some embodiments, the weight ratio of the pesticide to the cyclodextrin is about 1:3. In some embodiments, the weight ratio of the pesticide to the cyclodextrin is about 1:4.

In some embodiments, the agrochemical content of the agrochemical-cyclodextrin complex is determined by HPLC.

Each embodiment disclosed herein is contemplated as being applicable to each of the other disclosed embodiments. Thus, all combinations of the various elements described herein are within the scope of the invention. In addition, the elements recited in pesticidal complex, pesticidal delivery system and composition embodiments can be used in the method, use, process and package embodiments described herein and vice versa. In addition, when lists are provided, the list is to be considered as a disclosure of any one member of the list.

This invention will be better understood by reference to the Experimental Details which follow, but those skilled in the art will readily appreciate that the specific experiments detailed are only illustrative of the invention as described more fully in the claims which follow thereafter.

The invention is illustrated by the following examples without limiting it thereby.

Experimental Section:

Six types of cyclodextrins were tested; unsubstituted cyclodextrin (alpha, beta and gamma) and three derivatives of substituted cyclodextrins (methylated cyclodextrin, sulfobutyleter cyclodextrin and hydroxypropyl cyclodextrin) in different weight and molar ratios between cyclodextrin and pesticide.

The cyclodextrin-pesticide was formulated in aqueous composition in different concentrations.

Preparation of Cyclodextrin-Pesticide Complexes

Cyclodextrin pesticide complexes may be prepared at several weight and molar ratios.

In some embodiments, the complex is obtained by suspension method.

In some embodiments, the complex is obtained by kneading method

Suspension Method:

Cyclodextrin inclusion complexes with pesticides may be prepared by dissolving the cyclodextrin in water to prepare a cyclodextrin solution, adding pesticide to the cyclodextrin solution to prepare a suspension, and stirring the resulting suspension for period of 1 to 24 hours.

Cyclodextrin inclusion complexes with pesticides may also be prepared by the suspension method by preparing a suspension of pesticide in the presence of cyclodextrin, adding water and stirring the resulting suspension for a period of hours.

After reaction, the water may be removed by lyophilization or drying to give the cyclodextrin-pesticide complex (without removing the non-reacted pesticide).

The content of pesticide in the complex may be determined by HPLC.

Kneading Method:

The cyclodextrin and the pesticide may be homogenized in dry powder form. To the powder mixture, water may be added in small portions. The homogenized powder forms a thick, concentrated suspension by a pestle at room temperature and thoroughly homogenized by pestle.

The resulting suspension is frozen and lyophilized. The freeze-dried composition may then be ground to fine powder and sieved through 0.5 mm mesh size screen.

The content of pesticide in the complex may be determined by HPLC.

Example 1. Preparation of Folpet-Cyclodextrin Complexes (DT-CL-F1-300)

The preparation of the complexes was performed by dissolving randomly methylated beta cyclodextrin (RAMEB, 132.5 g) in water (525 ml) at 25° C. Folpet (57 g) was added and the mixture was stirred for 4 hours. Isolation of the cyclodextrin-folpet complex (pale yellow suspension) was conducted by lyophilization (frozen and lyophilized). The freeze-dried composition was ground to fine powder and sieved through 0.5 mm mesh size screen Folpet content: 30.6% (by HPLC).

The weight ratio of folpet to cyclodextrin was approximately 1:2. The content of folpet in the complex was determined by HPLC. Phase solubility isotherms were carried out for the folpet-cyclodextrin complexes. RAMEB cyclodextrin showed the highest complexation ability indicating that the cavity size of methyl beta cyclodextrin is sufficiently large for formation of the inclusion complexation.

The obtained folpet-cyclodextrin prototype was diluted with water to obtain an aqueous suspension composition.

The fungicidal efficacy of folpet as solid composition (commercial Folpan® 50SC, sold by Adama) was compared to the fungicidal efficacy of folpet-cyclcodextrin prototype (DT-CL-F1 300) at five rates of application (350, 450, 550, 650, 750 g/ha). Folpet was used against different pathogens in different crops and the efficacy was measured.

Test 1: In planta evaluation of the new folpet-cyclodextrin compositions towards *Zymoseptoria Tritici* (Syn. *Mycosphaerella graminicola*) strain Mg-StA in wheat and *P. pachyrhizi* strain THAI1 in soybean.

Test 1a: Preventive Treatment Test:

The folpet-cyclodextrin compositions were prepared in a volume of water corresponding to 200 l/ha (350, 450, 550, 650, and 750 g/ha corresponding to 1175, 2250, 2750, 3250 and 3750 mg a.i./L or ppm). Folpan® 50 SC and the present invention composition were sprayed by the aim of a hand sprayer. Control plants were treated with distilled water. Three replicated (pots) of 6 wheat plant each were used for each condition tested.

After treatment, wheat plants were left to dry at room temperature for 1 hour and then placed in a climatic chamber with a temperature of 24° C. day/18° C. night, photoperiod of 16 h light/8 hour dark and relative humidity of 65%.

Wheat leaf fragments of the first leaf were cut and transferred in Petri dish containing adapted water agar (6 leaf fragments per Petri dish). Leaf fragment were inoculated with a calibrated pycnospores suspension of *Z. tritici* strain Mg StA.

Disease assessments were carried out 21 days post inoculation (dpi) and 28 dpi by measuring the length of the necrosis of the leaf fragment. The intensity of infection was then determined in percent of the total length of the leaf fragment.

The fungicidal activity of folpet-cyclodextrin prototype composition and Folpan® 50 SC composition was measured.

It was found that prototype DT-CL-F1-300 (EC50 of <350 g a.i/ha, 1175 ppm) had a higher efficiency than the reference Folpan® SC50 (EC50 of 605 g a.i/ha, 3025 ppm) towards *Z. tritici* strain Mg StA.

Figure 4:
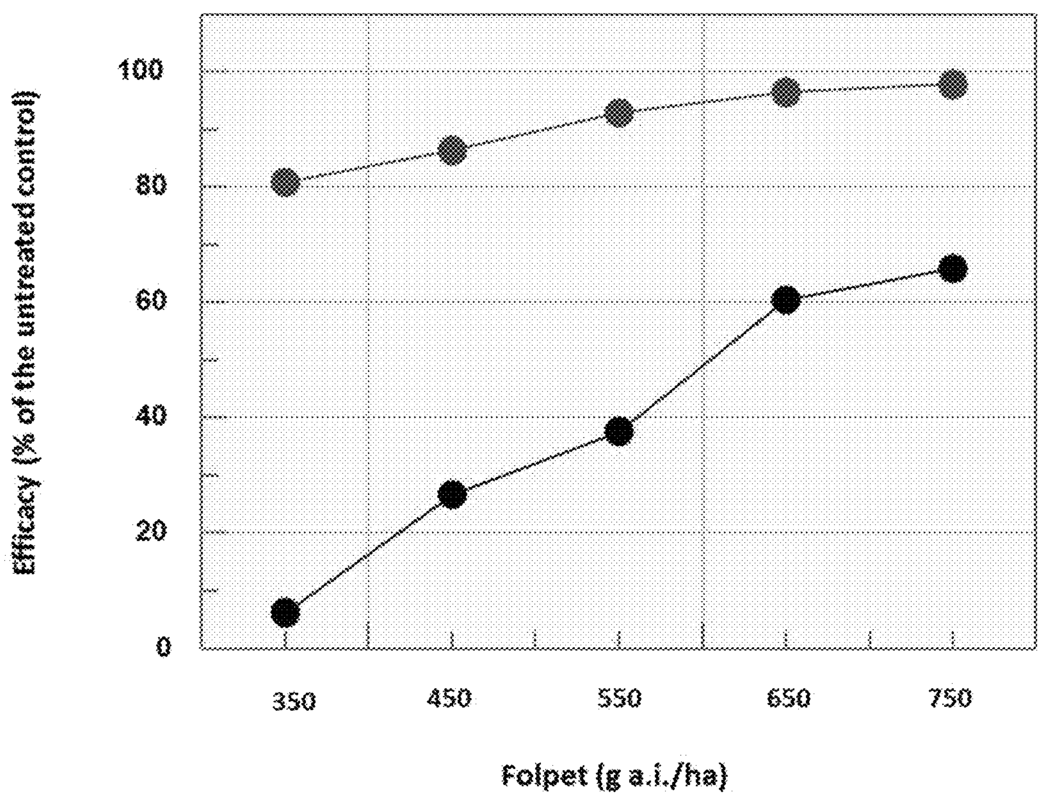
FIG. 4 shows the dose response curves, obtained from the area under the disease progress curve (AUDPC) values, for DT-CL-F1-300 (upper line —●—) and Folpan® 50 SC (lower line —●—) towards *Zymoseptoria tritici* strain StA, sensible to all fungicides obtained from the intensity of infection of wheat leaf fragments cultivar ALIXANIN controlled condition.

The efficacy results are shown in Table 1 and FIG. 4.

TABLE 1

| $EC_{50}$ values of DT-CL-F1-300 and Folpan ® 50SC towards *Zymoseptoria Tritici* strain Mg Tri-StA. | |
|---|---|
| Product | $EC_{50}$ |
| DT-CL-F1-300-01T | <350 g a.i./ha (1175 μg a.i./ml or ppm) |
| FOLPAN 50SC | 605 g a.i./ha (3025 μg a.i./ml or ppm) |

Our results showed that the new folpet prototype formulation DT-CL-F1-300 was much more efficient in controlled conditions than the folpet reference formulation Folpan® 50SC towards the *Z. tritici* strain Mg StA. Indeed, at the lowest folpet rate tested, i.e. 350 g/ha (1175 ppm), for the new folpet prototype formulation exhibited 81% of efficacy, whereas the Folpan® 50SC had only 6% of efficacy in controlled conditions.

Test 1b: Persistence Efficiency Evaluation Showing Prolonged Biological Activity in Wheat.

The folpet-cyclodextrin prototype DT-CL-F1-300 composition and Folpan® 50 SC composition were tested at a range rates between 350 to 750 g a.i./ha, corresponding to 1175 to 3750 ppm, respectively. The fungicides were prepared in a volume of water corresponding to 200 l/ha and pulverized by the aim of a hand sprayer. Control seedlings were treated with distilled water. Three replicates (pots) of 6 wheat plants each were used for each condition tested.

After treatment, wheat plants were left to dry at room temperature for 1 hour and then placed in a climatic chamber: temperature of 24° C. day/18° C. night—photoperiod of 16 h light/8 h dark and a relative humidity of 65%.

Wheat leaf fragments of the first leaf were cut and transferred in Petri dish containing adapted water agar (6 leaf fragments per Petri dish). After periods of 1 week, 2 weeks and 3 weeks, leaf fragments were inoculated with a calibrated pycnospores suspension of *Z. tritici* strain Mg Tri-StA.

After inoculation, Petri dishes were placed in a climatic chamber: temperature of 20° C. day/17° C. night—photoperiod of 16 h light/8 h dark and controlled relative humidity.

Figure 5A:
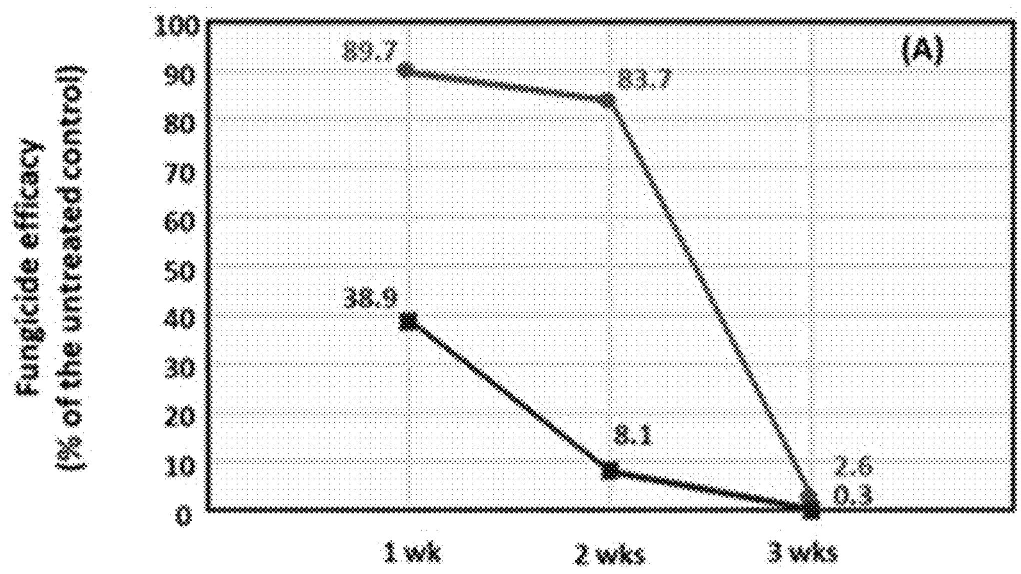
FIG. 5A shows the fungicidal efficacy of the folpet prototype DT-CL-F1-300-01T (—●—) and Folpan® 50 SC (—■—) when applied at 3250 ppm to wheat plants at 1 week, 2 weeks or 3 weeks before the wheat plants were inoculated with pycniospores of *Z. tritici* strain Mg StA.
Figure 5B:
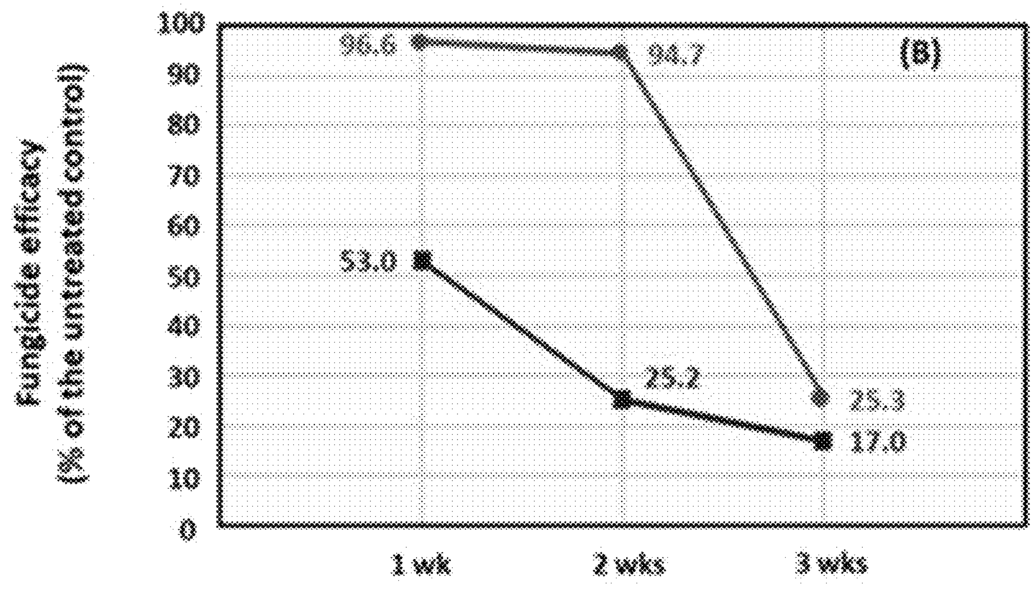
FIG. 5B shows the fungicidal efficacy of the folpet prototype DT-CL-F1-300-01T (—●—) and Folpan® 50 SC (—■—) when applied at 3750 ppm to wheat plants at 1 week, 2 weeks or 3 weeks before the wheat plants were inoculated with pycniospores of *Z. tritici* strain Mg StA.
Figure 6:
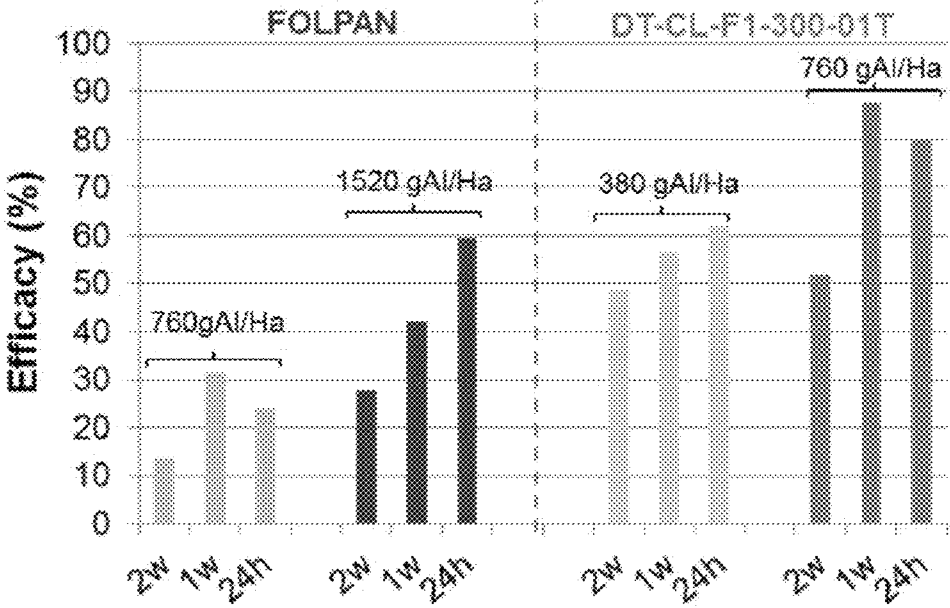
FIG. 6 shows the efficacy of the folpet prototype DT-CL-F1-300-01 (applied at 380 g a.i./ha and 760 g a.i./ha) and Folpan® 50 SC (applied at 760 g a.i./ha and 1520 g a.i./ha) when applied to wheat plants at 24 hours, 1 week and 2 weeks before the wheat plants were inoculated with pycniospores of *Z. tritici* strain Mg StA.

The fungicidal activity of the folpet-cyclodextrin prototype composition and Folpan® 50 SC composition were measured. Results are shown in Table 2 below and FIGS. 5 and 6.

TABLE 2

| Staphyt codes | Product | Doses (Kg/HA) | Doses A.I (g/Ha) | Positioning of treatment | Leaf analyzed | Conditions | Mean level of attack (%) | SD | Efficacy (%) |
|---|---|---|---|---|---|---|---|---|---|
| | TNT | — | — | | | 1 | 96.9 | 4.8 | 0 |
| 18 1098 00 | FOLPAN 800 WDG | 0.95 Kg/Ha | 760 g AI/Ha | 2 weeks | F2 | 2 | 83.5 | 13.3 | 13.7 |
| | (800 g Folpet/Kg) | 1.9 Kg/Ha | 1520 g AI/Ha | before | | 3 | 70 | 10.3 | 27.7 |
| 10 1099 00 | DT-CL-F1-300-01T | 1.27 Kg/Ha | 380 g AI/Ha | inoculation | | 4 | 49.8 | 10.2 | 48.5 |
| | (300 g Folpet/Kg) | 2.53 Kg/Ha | 760 g AI/Ha | | | 5 | 46.5 | 11.5 | 52 |
| | TNT | — | — | | | 6 | 100 | 0 | 0 |
| 10 1098 00 | FOLPAN 800 WDG | 0.95 Kg/Ha | 760 g AI/Ha | 1 week | F2 | 7 | 68.6 | 11.3 | 31.4 |
| | (800 g Folpet/Kg) | 1.9 Kg/Ha | 1520 g AI/Ha | before | | 8 | 58.0 | 25.8 | 42.0 |
| 10 1099 00 | DT-CL-F1-300-01T | 1.27 Kg/Ha | 380 g AI/Ha | inoculation | | 9 | 43.5 | 25.0 | 56.4 |
| | (300 g Folpet/Kg) | 2.53 Kg/Ha | 760 g AI/Ha | | | 10 | 12.4 | 13.5 | 87.6 |
| | TNT | — | | | | 11 | 70.5 | 29.7 | 0 |
| 10 1098 00 | FOLPAN 800 WDG | 0.95 Kg/Ha | 760 g AI/Ha | 24 hours | F3 | 12 | 53.5 | 14.8 | 24.1 |
| | (800 g Folpet/Kg) | 1.9 Kg/Ha | 1520 g AI/Ha | before | | 13 | 28.5 | 19.4 | 59.6 |
| 10 1099 00 | DT-CL-F1-300-01T | 1.27 Kg/Ha | 380 g AI/Ha | inoculation | | 14 | 26.8 | 21.1 | 62 |
| | (300 g Folpet/Kg) | 2.53 Kg/Ha | 760 g AI/Ha | | | 15 | 14.3 | 12.1 | 79.8 |

Results showed that the invention folpet-cyclodextrin prototype composition brings an added value in terms of persistence treatment compared to the reference Folpan 50 SC towards *Zymoseptoria Tritici* (Syn. *Mycosphaerella graminicola*) strain Mg-StA in wheat.

Test 1c: Persistence Efficiency Evaluation Showing Prolonged Biological Activity in Soybean.

First pair of unfolded true leaves (unifoliolate leaves on the first node) of soybean seedlings of a susceptible Asian rust cultivar (RAS04, RAGT) at the BBCH 12 growth stage were cut and treated on their adaxial face with water (control), the new folpet prototype formulation DT-CL-F1-300-01T (at 300 g/kg of folpet) or the reference folpet formulation (Folpan® 50SC, at 500 g/L of folpet) at two rate (75 g a.i./ha and 7.5 g a.i./ha, corresponding to 500 and 50 mg a.i./L or ppm) with 1% CAC. The fungicides were prepared in a volume of water corresponding to 150 l/ha and pulverized by the aim of a hand sprayer. Control true leaves were treated with distilled water. After treatment, soybean leaves were left to dry at room temperature and then placed adaxial face up on 120×120 cm Petri dishes containing 0.4% water agar supplemented with antibiotic and anti-senescing product (3 replicates per treatment).

One (1), two (2) and three (3) weeks after treatment, soybean true lea es plantlets were inoculated with a calibrated uredospores suspension of the reference *P. pachyrhizi* strain THAI1. The inoculated soybean leaves were incubated in a climatic chamber.

The fungicidal activity of the folpet-cyclodextrin prototype composition and Folpan® 50 SC compositions was measured.

The results are summarized in Table 3 below and FIGS. 7A and 7B. Results showed that the invention folpet-cyclodextrin prototype composition had an added value in terms of persistence treatment compared to the reference Folpan® 50 SC towards *P. pachyrhizi* strain THAI1 in soybean.

The new folpet formulation prototype DT-CL-F1-300-01T was more persistent than the folpet reference formulation Folpan 50SC at the 2 doses tested towards *Phakopsora pachyrhizi* in controlled conditions.

TABLE 3

| Treatment | g a.i./ha | Mg a.i./ml or ppm | AUDPC (Fungicide efficiency %) 1 week | 2 weeks | 3 weeks |
|---|---|---|---|---|---|
| Control + 1% CAC | — | — | 1038.9a +/− 67.4 | 1023.8a +/− 91.9 | 1085.0a +/− 56.3 |
| DT-CL-F1-300-01T + 1% CAC | 7.5 | 50 | 273.0c +/− 114.5 (73.7%)α | 523.3b +/− 107.5 (48.9%) | 781.7b +/− 82.3 (28.0%) |
| Folpan 50SC + 1% CAC | 7.5 | 50 | 781.1b +/− 119.2 (24.8%) | 1008.6a +/− 27.3 (1.5%) | 1044.2a +/− 84.1 (3.8%) |

αEach value corresponds to mean +/− standard error.

The values between brackets correspond to the fungicide efficacy in percent of the untreated control.

Values in a column followed by the same letter are not significantly different according to the Newman & Keuls test (P = 0.05).

Figure 7A:
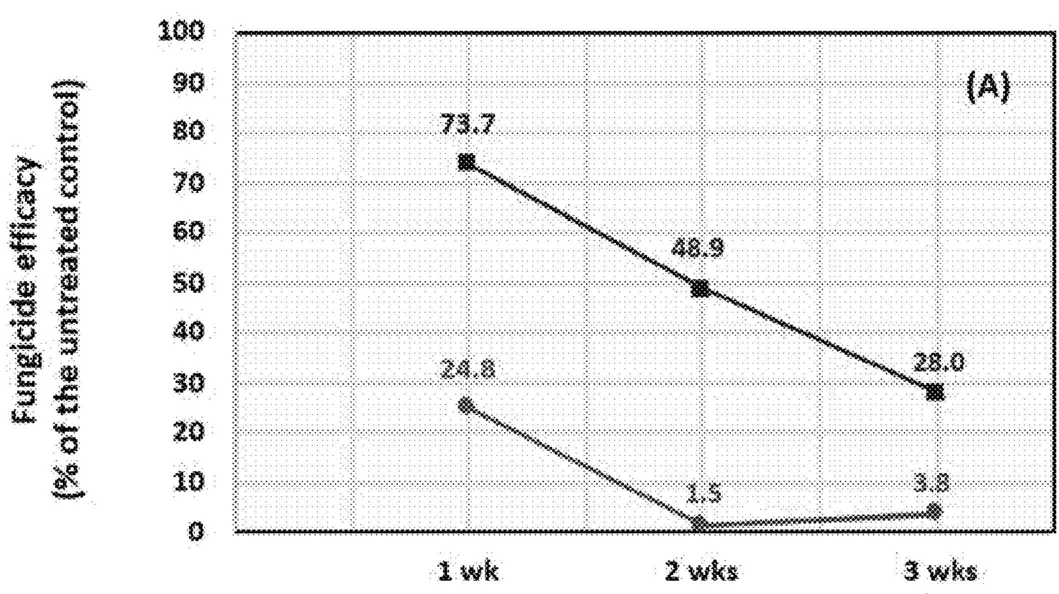
FIG. 7A shows the fungicidal efficacy of the folpet prototype DT-CL-F1-300-01T (—■—) and Folpan® 50 SC (—●—) when applied at 7.5 g a.i./ha with 1% CAC to soybean leaves at 1 week, 2 weeks or 3 weeks before the soybean leaves e inoculated with spores of *P. pachyrhizi* strain THAI1.

As shown in FIG. 7A, when inoculations were carried out 1 week after treatment, the new folpet prototype DT-CL-F1-300-01T composition at 7.5 g a.i./ha with 1% CAC exhibited 74% efficacy, while that of the reference folpet formulation (Folpan® 50SC) exhibited only 25% efficacy. When inoculations were carried out 2 weeks after treatment, the new folpet prototype DT-CL-F1-300-01T composition still exhibited 49% efficacy, while that of the reference folpet formulation (Folpan® 50SC) exhibited only 2% efficacy. When inoculations were carried out 3 weeks after treatment, the new folpet prototype DT-CL-F1-300-01T composition still exhibited 28% efficacy, while that of the reference folpet formulation (Folpan® 50SC) exhibited only 4% efficacy.

Figure 7B:
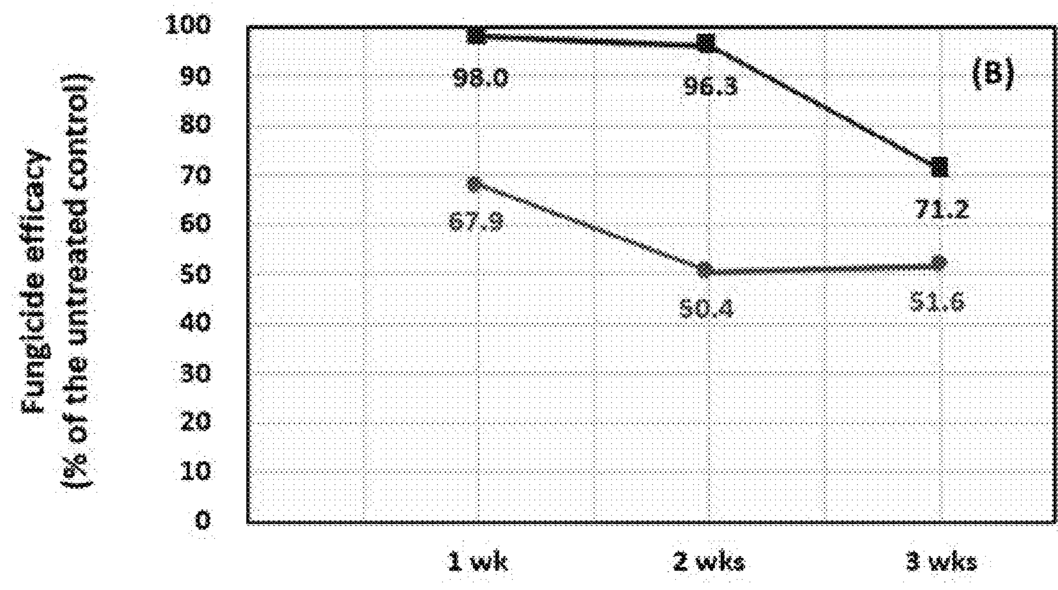
FIG. 7B shows the fungicidal efficacy of the folpet prototype DT-CL-F1-300-01T (—■—) and Folpan® 50 SC (—●—) when applied at 7.5 g a.i./ha with 1% CAC to soybean leaves at 1 week, 2 weeks or 3 weeks before the soybean leaves are inoculated with spores of *P. pachyrhizi* strain THAI1.

As shown in FIG. 7B, when inoculations were carried out 1 week after treatment, the new folpet prototype DT-CL-F1-300-01T composition exhibited 98% efficacy, while that of the reference folpet formulation (Folpan® 50SC) exhibited only 68% efficacy. When inoculations were carried out 2 weeks after treatment, the new folpet prototype DT-CL-F1-300-01T composition still exhibited 96% efficacy, while that of the reference folpet formulation (Folpan® 50SC) dropped to 50% efficacy. When inoculations were carried out 3 weeks after treatment, the new folpet prototype DT-CL-F1-300-01T composition still exhibited 71% efficacy, while the folpet reference formulation (Folpan® 50SC) exhibited only 52% efficacy.

Example 2. Preparation of Captan-Cyclodextrin Complexes

The preparation of the complexes is performed by the suspension method.

The obtained captan-cyclodextrin prototype is diluted with water to obtain an aqueous suspension composition.

The fungicidal efficacy of captan as solid composition (commercial Captan 50 WP) is compared to the fungicidal efficacy of captan-cyclodextrin prototype. Captan is used against different pathogens in different crops and the efficacy is measured.

In planta evaluation of new captan-cyclodextrin prototypes fungicide compositions towards *Z. tritici* strain Mg Tri-StA in wheat and *P. pachyrhizai* strain THAI1 in soybean.

Test 2a: Preventive Treatment Test

The captan-cyclodextrin compositions are prepared. Captan 50 WP and present invention compositions are pulverized by the aim of a hand sprayer. Controlled seedlings are treated with distilled water. Three replicated (pots) of 6 wheat plant each are used for each condition tested.

After treatment, wheat plants are left to dry at room temperature for 1 hour and then placed in a climatic chamber with a temperature of 24° C. day/18° C. night, photoperiod of 16 h light/8 hour dark and relative humidity of 65%.

Wheat leaf fragments of the first leaf are cut and transferred in Petri dish containing adapted water agar (6 leaf fragments per Petri dish). Leaf fragments are inoculated with *tritici* strain Mg Tri-StA.

The fungicidal activity of captan-cyclodextrin prototype composition and Captan 50 WP composition is measured.

Results show that the invention captan-cyclodextrin prototype composition brings an added value in terms of preventing compared to the reference Captan 50 WP towards *tritici* strain Mg Tri-StA.

Test 2b: Persistence Efficiency Evaluation

Prototype captan-cyclodextrin composition and Captan 50 WP composition are tested. The fungicides are prepared in water and are pulverized by the aim of a hand sprayer. Control seedlings are treated with distilled water. Three replicate (pots) of 6 wheat plants each are used for each condition tested.

After periods of 1 week, 2 weeks and 3 weeks, leaf fragments of treated wheat leaf are inoculated with a calibrated *tritici* strain Mg Tri-StA.

The fungicidal activity of the captan-cyclodextrin prototype composition and Captan 50 WP composition is measured.

Results show that the invention captan-cyclodextrin prototype composition brings an added value in terms of persistence compared to the reference Captan 50 WP towards *tritici* strain Mg Tri-StA.

Test 2c: Persistence Efficiency Evaluation

First pair of unfolded true leaves (unifoliolate leaves on the first node) of soybean seedlings of a susceptible Asian rust cultivar (RASO4, RAGT) at the BBCH 12 growth stage are cut and treated on their adaxial face with water (control), the new captan prototype formulation, or the reference captan formulation (Captan 50 WP) at various rates.

After treatment, soybean leaves are left to dry at room temperature and placed adaxial face up on 120×120 cm Petri dishes containing 0.4% water agar supplemented with antibiotic and anti-senescing product (3 replicates per treatment).

One (1), two (2) and three (3) weeks after treatment, soybean true leaves plantlets are inoculated with a calibrated uredospores suspension of the reference *P. pachyrhizi* strain THAI1. The inoculated soybean leaves are incubated in a climatic chamber.

The fungicidal activity of the captan-cyclodextrin prototype composition and Captan 50 WP compositions is measured.

Results show that the invention captan-cyclodextrin prototype composition has an added value in terms of persistence treatment compared to the reference Captan 50 WP towards *P. pachyrhizi* strain THAI1 in soybean.

Example 3. Preparation of Mancozeb-Cyclodextrin Complexes (DT-CL-M2260-03T)

The preparation of the complexes was performed by dissolving 2-hydroxypropyl beta-CD (HPBCD 190 g) in water (755 ml) at 25° C. Mancozeb (82 g) was added and homogenized thoroughly by stirring (using magnetic stirrer) for 3 hours. The resulting grayish yellow suspension was frozen and lyophilized. The freeze-dried composition was ground to fine powder and sieved through 0.5 mm mesh size screen. (Yield: 271 g; mancozeb content: 26.3 weight % by HPLC).

The obtained mancozeb-cyclodextrin prototype was diluted with ater to obtain an aqueous suspension composition.

The fungicidal efficacy of mancozeb as solid composition (commercial Dithane®75% WP) was compared to the fungicidal efficacy of mancozeb-cyclodextrin prototype (DT-CL-M2 260) at five rates. Mancozeb was used against different pathogens in different crops and the efficacy was measured.

Test 1: In Planta Evaluation of New Mancozeb-Cyclodextrin Compositions Towards Phytophtore Infection Strain Pi 61—Late Blight in Tomato.

Preventive Treatment Test:

The mancozeb-cyclodextrin compositions were prepared in a volume of water corresponding to 300 l/ha (9, 23, 94, 375 and 1500 g/ha, corresponding to 19.5, 78.1, 312.5, 1250 and 5000 mg a.i./L or ppm, respectively). Dithane® 75% WG and present invention compositions were sprayed by the aim of a hand sprayer on lower surface of the detached tomato leaves. Control plants were treated with distilled water. Three replicated (pots) of 6 tomato plant each were used for each condition tested.

Tomato leaves were inoculated with a calibrated Phytophtore infection strain Pi 61-late blight.

Disease assessments were carried out 5, 7, and 10 days post inoculation (dpi by measuring the length of the necrosis of the leaf fragment. The intensity of infection is then determined in percent of the total length of the leaf fragment.

The fungicidal activity of the mancozeb-cyclodextrin prototype composition and Dithane 75% WG composition was measured.

It was found that prototype DT-CL-M2-260 (EC50 of 75 g a.i/ha) had a higher efficiency than the reference Dithane®75 WG (EC50 of 300 g a.i/ha) towards Phytophtore infection strain Pi 61—late blight.

Figure 8:
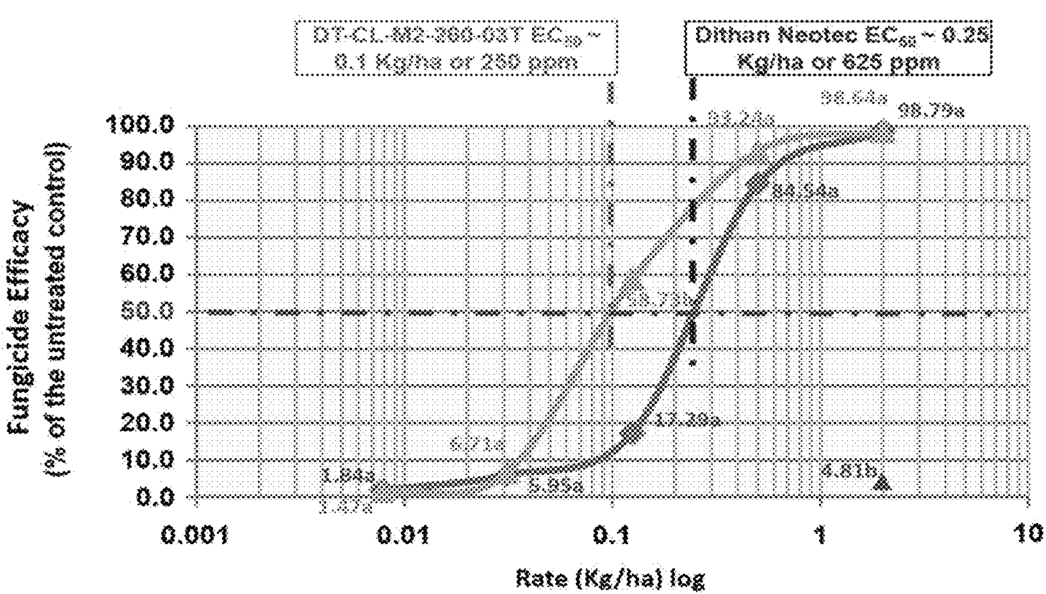
FIG. 8 shows the dose response curves obtained from the area under t e disease progress curve (AUDPC) values for Dithane 75 WG —◆— and DT-CL-M2-260 (—▲—) towards *Phytophthora infestans* strain PI61 and the determination of EC50 values (-•-).

The efficacy results are shown in FIG. 8.

Our results showed that the new mancozeb prototype formulation DT-CL-M2-260 had better preventive activity in controlled conditions than the Mancozeb reference formulation Dithane® 75 WG towards Phytophtore infection strain Pi 61—late blight in tomato.

Example 4. Preparation of Chlorantraniliprole-Cyclodextrin Complexes

The preparation of the complexes was performed by the kneading method.

In a mortar, 240 g of alpha cyclodextrin (calculated on dry basis) and chlorantraniliprole (100 g) were homogenized in dry powder form. Water (total amount of 150 ml) was added in small portions and homogenized forming a thick, concentrate suspension by pestle at room temperature and thoroughly homogenized by a pestle.

The resulting kneaded substance was dried for three days under vacuum and $P_2O_5$. The dried composition was ground to fine powder and sieved through 0.09 mm mesh size screen. (Chlorantraniliprole content: 30.6% by HPLC).

Alpha-cyclodextrin showed the highest complexation ability indicating that the cavity size of alpha-cyclodextrin is adequate for formation of the inclusion complexation.

The obtained chlorantraniliprole-cyclodextrin prototype was diluted with water to obtain an aqueous suspension composition.

Chlorantraniliprole was chemically interacted with cyclodextrin to form the complexed chlorantraniliprole cyclodextrin molecular assembly. The resulting guest-host complex was dissolved in water to obtain an aqueous composition. A composition comprising chlorantraniliprole (Coragen® 20%, 200 g/l suspension) was tested versus the cyclodextrin-complexed composition.

Insecticidal efficacy of chlorantraniliprole-cyclodextrin prototype as compared to commercial Coragen® product. The efficacy was tested in cotton on *lepidoptera.*

In planta Evaluation of new chlorantraniliprole-cyclodextrin prototypes insecticide compositions towards *Spodoptera littoralis* on cotton leaves.

Acute toxicity—Mortality Test:

Leaves of cotton seedlings were dipped in a series of different AI concentrations of prototype chlorantraniliprole cyclodextrin and Coragen® (20%) for 20 sec, then dried for 2 hours. Leaves were then detached and exposed to L1 of *Spodoptera littoralis* in Petri dishes (10-12 larvae/replicate). After 48 hours of feeding period, mortality was determined.

The insecticidal activity on cotton leaves treated with the chlorantraniliprole-cyclodextrin prototype composition and the Coragen® composition was measured.

Figure 9:
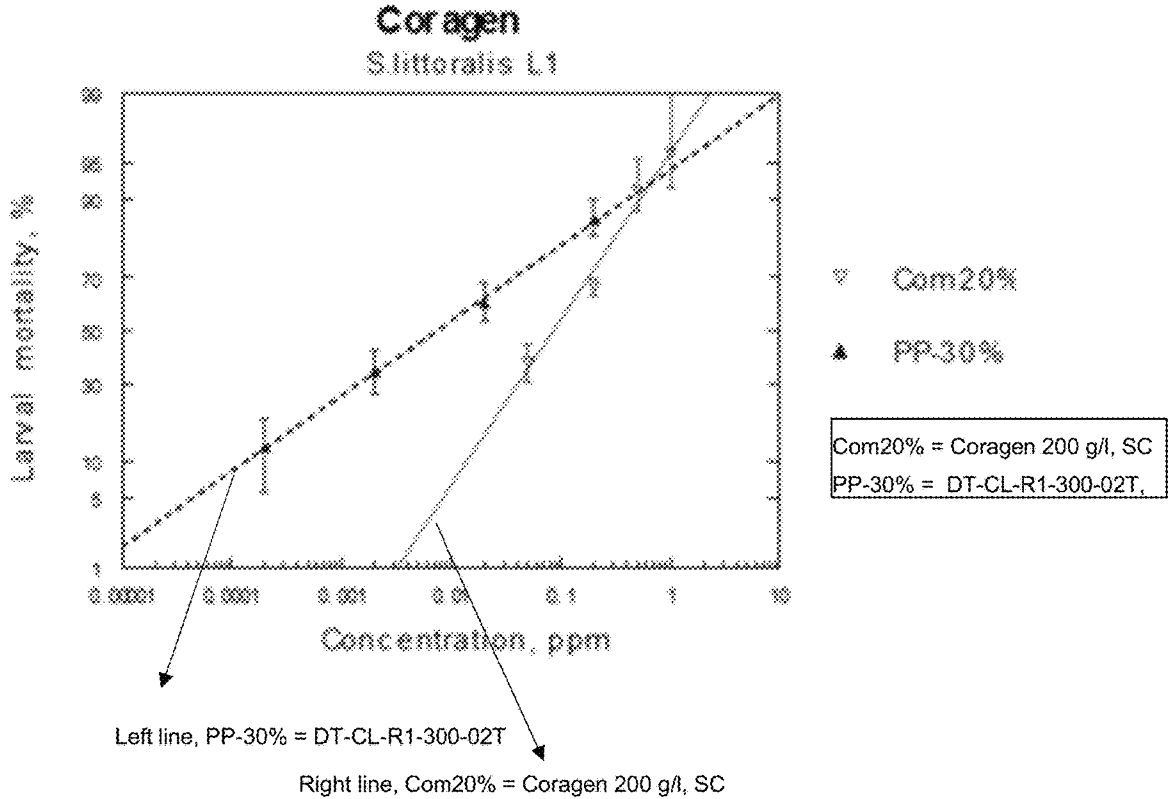
FIG. 9 shows the results from the in planta acute toxicity test on L1 *Spodoptera littoralis*. Larval mortality was evaluated after application of chlorantraniliprole as DT-CL-R1-02T 300 (left line ▲, PP-30%=DT-CL-R1-300-02T) and Coragen®200 SC (right line ▽, Com20%=Coragen® 200 g/l, SC) at different rates.

Toxicity values (insecticidal activity) of chlorantraniliprole-cyclodextrin DT-CL-R1-300 and Coragen® towards *Spodoptera littoralis* on cotton leaves are summarized in Table 4 and FIG. 9.

TABLE 4

Efficacy of chlorantraniliprole (Coragen) on *S. littoralis* L1

| Formulation | n | Slope ± SEM | $LC_{10}$ (F.L.) | $LC_{50}$ (F.L.) | $LC_{90}$ (F.L.) |
|---|---|---|---|---|---|
| chlorantraniliprole (Coragen), 20% | 303 | 1.60 ± 0.24 | 0.02 (0.01-0.03) | 0.09 (0.06-0.13) | 0.6 (0.4-1.0) |
| DT-CL-R1-300-02T, 30% | 420 | 1.25 ± 0.16 | 0.0002 (0.-0.0013) | 0.009 (0.002-0.033) | 0.3 (0.1-1.0) |

For chlorantraniliprole, an improvement of knock down effect for the invention prototype was well shown, which means higher mortality at lower rates.

Persistence Efficiency Evaluation

Cotton plants are treated with prototype chlorantraniliprole-cyclodextrin (DT-CL-R1-300) and Coragen® (20%). After 3, 7, 14 and 21 days, the treated cotton plants are exposed to *Spodoptera littoralis.*

The insecticidal activity on cotton plants treated with the chlorantraniliprole-cyclodextrin prototype composition and Coragen® composition are measured.

Results show that the invention chlorantraniliprole-cyclodextrin composition prototype DT-CL-R1-300 brings an added value in terms of persistence compared to the reference Coragen® towards *Spodoptera littoralis* on cotton plant.

Example 5. Preparation of Indoxacarb-Cyclodextrin Complexes

The preparation of the complexes is performed by suspension method.

The content of indoxacarb in the complex is determined by HPLC.

The preparation of the complexes is performed by dissolving methyl-beta-cyclodextrin (350 g (50%) as 175 g of RAMEB) in water (350 g) at 25° C. Indoxacarb (75 g) is added and homogenized thoroughly by stirring (using magnetic stirrer) for 4 hours. The resulting solution is frozen and sieved through 1 mm mesh size.

Indoxacarb is chemically interacted with cyclodextrin to form the complexed indoxacarb cyclodextrin molecular assembly. The resulting guest-host complex is added to water to obtain an aqueous composition.

Insecticidal efficacy of indoxacarb-cyclodextrin prototype is compared to commercial STEWARD® 150 EC product. The efficacy is tested towards *Spodootera littoralis* on cotton leaves.

In planta evaluation of new indoxacarb-cyclodextrin prototype insecticide composition towards *Spodoptera littoralis* on cotton leaves.

Knock Down Treatment Test:

Cotton leaves are treated with indoxacarb-cyclodextrin prototype d STEWARD® 150 EC. The treated cotton leaves are exposed to *Spodoptera littoralis* for 3 days.

The insecticidal activity of indoxacarb-cyclodextrin prototypes and STEWARD® 150 EC compositions is measured.

Results show that the invention indoxacarb-cyclodextrin prototypes compositions bring an added value in terms of knock down treatment compared to the reference STEWARD® 150 EC towards *Spodoptera littoralis* on cotton leaves.

Persistence Efficiency Evaluation

Cotton leaves are treated with various indoxacarb-cyclodextrin prototypes and STEWARD®150 EC in different concentrations. After 3, 7, 14 and 1 days, the treated cotton seedlings are exposed to *Spodoptera littoralis.*

The insecticidal activity on cotton seedlings treated with indoxacarb-cyclodextrin prototypes and STEWARD® 150 EC compositions is measured.

Results show that the invention indoxacarb-cyclodextrin compositions prototypes bring an added value in terms of persistence compared to the reference STEWARD® 150 EC towards *Spodoptera littoralis* on cotton leaves.

Example 6: Preparation of Metaflumizone-Cyclodextrin Complexes

The preparation of the complexes is performed by suspension method.

The content of metaflumizone in the complex is determined by HPLC. Phase solubility isotherms are carried out for metaflumizone-cyclodextrin complexes.

Metaflumizone is chemically interacted with cyclodextrin to form the complexed metaflumizone cyclodextrin molecular assembly. The resulting guest-host complex is dissolved in water to obtain an aqueous composition.

Insecticidal efficacy of metaflumizone-cyclodextrin prototype is compared to commercial Alverde® 24 SC product. The efficacy is tested towards *Spodoptera littoralis* on cotton leaves.

In planta evaluation of new metaflumizone-cyclodextrin prototypes insecticide composition towards *Spodoptera littoralis* on cotton leaves.

Knock Down Treatment Test:

Cotton seedlings are treated with prototype metaflumizone-cyclodextrin and Alverde® 24 SC. The treated seedlings are exposed to *Spodoptera littoralis* for 3 days.

The insecticidal activity on cotton seedlings treated with metaflumizone-cyclodextrin prototype composition and Alverde® 24 SC composition is measured.

Results show that metaflumizone-cyclodextrin compositions bring an added value in terms of knock down treatment compared to the reference Alverde® 24 SC towards *Spodoptera littoralis* on cotton leaves.

Persistence Efficiency Evaluation

Cotton seedlings are treated with various prototypes metaflumizone-cyclodextrin and Alverde® 24 SC in different concentrations. After 3, 7, 14 and 21 days, the treated cotton leaves are exposed to *Spodoptera littoralis.*

The insecticidal activity on cotton leaves treated with metaflumizone-cyclodextrin prototype and Alverde® 24 SC compositions is measured.

Results show that metaflumizone-cyclodextrin compositions bring an added value in terms of Persistence treatment compared to the reference Alverde® 24 SC towards *Spodoptera littoralis* on cotton leaves.

Example 8: Preparation of Pendimethalin-Cyclodextrin Complexes

The preparation of the complexes is performed by suspension method.

The content of pendimethalin in the complex is determined by HPLC. Phase solubility isotherms are carried out for pendimethalin-cyclodextrin complexes.

Pendimethalin is chemically interacted with cyclodextrin to form the complexed pendimethalin cyclodextrin molecular assembly. The resulting guest-host complex is dissolved in water to obtain an aqueous composition.

Herbicidal efficacy of the pendimethalin-cyclodextrin prototype is compared to commercial Anthem® (400 g/l SC) product. The efficacy is tested on different weeds such as *Alopecurus myosuroides* (ALOMY), *Lolium perenne* (LOLPE), *Matricaria recutita* (MATCH), *Papaver rhoeas* (PAPRH) and *Veronica persica* (VERPE).

Efficacy is evaluated for the new pendimethalin-cyclodextrin prototype herbicide composition for the control of different weeds, pre-emergence, s ch as *Alopecurus myosuroides* (ALOMY), *Lolium perenne* (LOLPE), *Matricaria*

*recutita* (MATCH), *Papaver rhoeas* (PAPRH) and *Veronica persica* (VERPE) at various days after emergence (7, 14, 21 and 28 or more as needed).

Efficacy is expressed as % control for weeds and is monitored with respect to the vigor of the plants per pot.

The herbicidal activity of pendimethalin-cyclodextrin prototype and Anthem® (400 g/l SC) compositions is measured.

Results show that the pendimethalin-cyclodextrin prototypes compositions bring an added value in terms of weed control compared to the reference Anthem® (400 g/l SC) towards different weeds such as *Alopecurus myosuroides* (ALOMY), *Lolium perenne* (LOLPE), *Matricaria recutita* (MATCH), *Papaver rhoeas* (PAP RH) and *Veronica persica* (VERPE).

The invention claimed is:

1. An agrochemically active pesticidal complex in dry powder form, wherein the pesticidal complex comprises at least one pesticide and cyclodextrin, wherein the pesticide is selected from the group consisting of dithiocarbamate fungicide, oxadiazine insecticide, semicarbazone insecticide, and dinitroaniline herbicide, wherein the pesticidal complex is free of adjuvants, and wherein the pesticide is in solid form and interacts with the cyclodextrin in the absence of an organic solvent.

2. The agrochemically active pesticidal complex of claim 1, wherein:

a. the pesticide is:

i. the dithiocarbamate fungicide and the dithiocarbamate fungicide is mancozeb, ii. the oxadiazine insecticide and the oxadiazine insecticide is indoxacarb, iii. the semicarbazone insecticide and the semicarbazone insecticide is metaflumizone, or iv. the dinitroaniline herbicide and the dinitroaniline herbicide is pendimethalin, b. the cyclodextrin is selected from the group consisting of α-cyclodextrin, β-cyclodextrin, γ-cyclodextrin and any combination thereof, c. the molar ratio between the pesticide and the cyclodextrin is 1:1 to 1:50, d. the weight ratio between the pesticide and the cyclodextrin is 1:1 to 1:50, and/or e. molecules of the pesticide are adsorbed on molecules of the cyclodextrin.

3. The agrochemically active pesticidal complex of claim 1, wherein the cyclodextrin is:

a. methylated β-cyclodextrin, b. 2-hydroxypropyl-β-dextrin, c. an alkylated cyclodextrin wherein hydroxy groups of the cyclodextrin are alkylated with a C1-C5 alkyl group, d. an alkylated cyclodextrin wherein an alkyl group is substituted with hydroxyl group, e. an alkylated cyclodextrin wherein an alkyl group or hydroxyl group is substituted with sulfonic acid salt selected from sodium, aluminum, potassium, calcium, and ammonium salts and/or the sulphonic acid salt comprising four methylene units, f. methyl derivative of cyclodextrin, g. hydroxypropyl derivative of cyclodextrin, h. quaternary ammonium derivative of cyclodextrin, i. sulfo-butyl ether derivative of cyclodextrin, j.

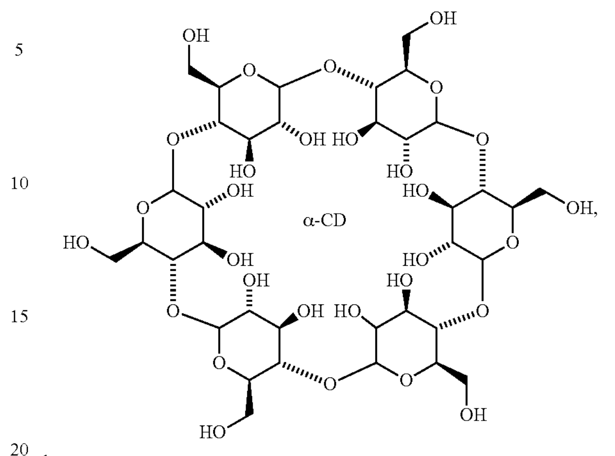

α-CD k.

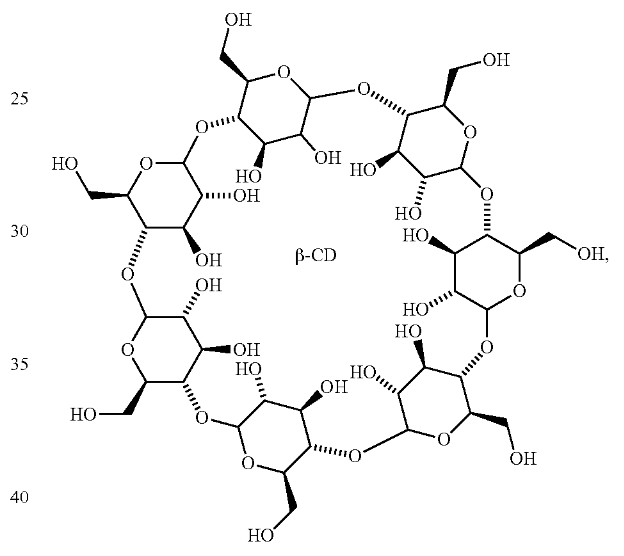

β-CD l.

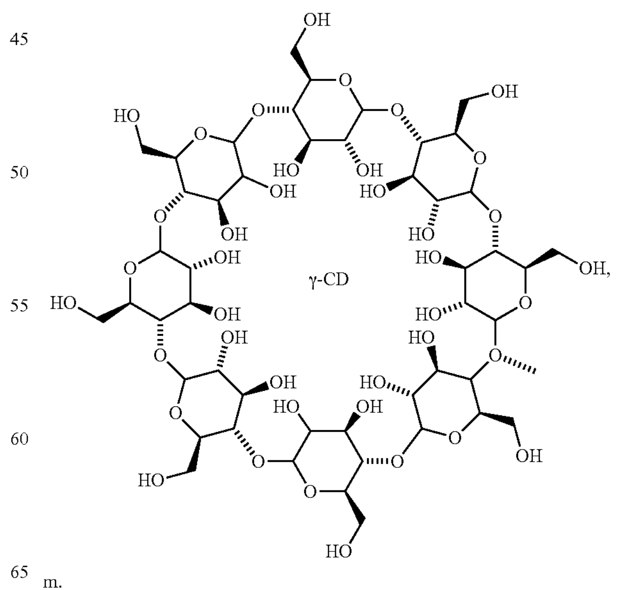

γ-CD m.

-continued

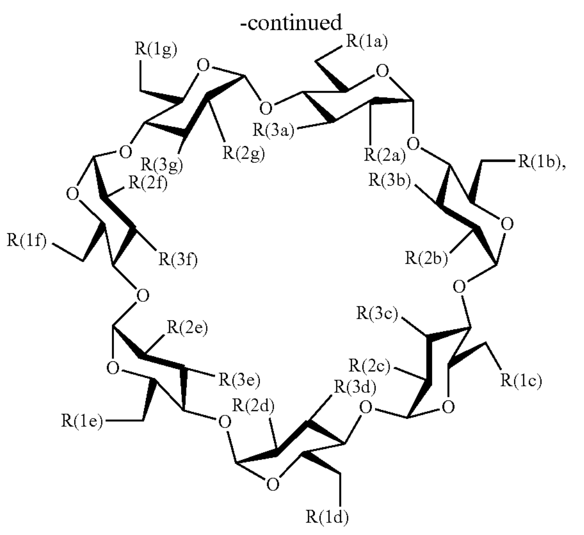

wherein R(1a-f), R(2a-f), R(3a-f) is independently —OH or —O—CH2-CH(OH)—CH3

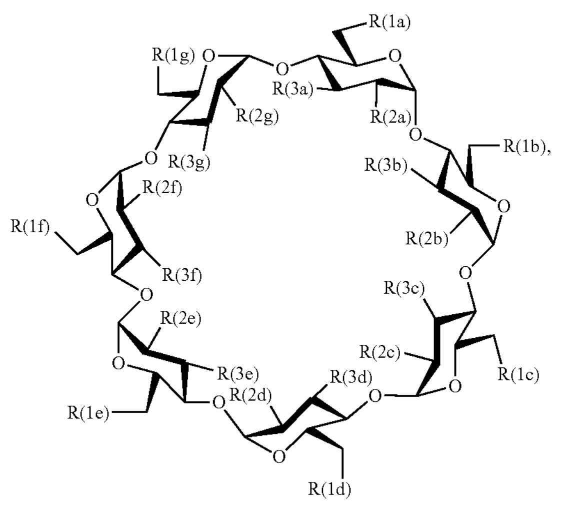

wherein R(1a-f), R(2a-f), R(3a-f) is independently —OH or —O—CH2-CH2-CH2-CH2-SO3Na, or

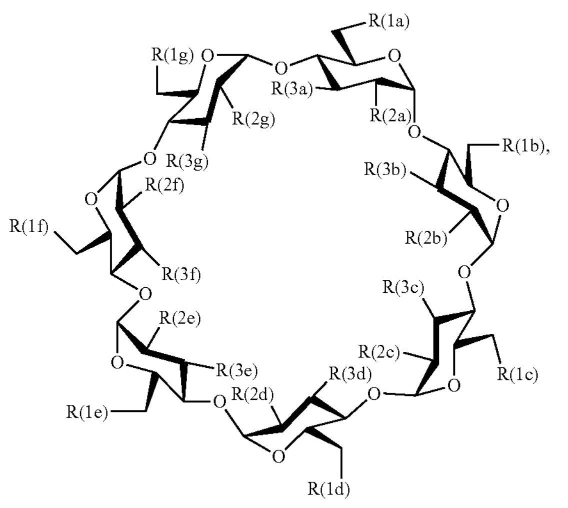

wherein R(1a-f), R(2a-f), R(3a-f) is independently —OH or —O—CH3.

4. The agrochemically active pesticidal complex of claim 3, wherein:

a. the pesticide is folpet and cyclodextrin is α-cyclodextrin, b. the pesticide is indoxacarb and cyclodextrin is methylated b-cyclodextrin.

5. The agrochemically active pesticidal complex of claim 1, wherein the pesticidal complex is a pesticidal guest/hos inclusion complex comprising (i) guest pesticide and (ii) host cyclodextrin.

6. The pesticidal guest/host inclusion complex of claim 5, wherein:

a. the guest/host inclusion complex comprises guest folpet and host cyclodextrin in weight ratio of 1:2, b. the guest/host inclusion complex comprises guest captan and host cyclodextrin in weight ratio of 1:1 to 1:5, c. the guest/host inclusion complex comprises guest mancozeb and host cyclodextrin in weight ratio of 1:1 to 1:50, d. the guest/host inclusion complex comprises guest indoxacarb and host cyclodextrin in weight ratio of 1:1 to 1:5, e. the guest/host inclusion complex comprises guest metaflumizone and host cyclodextrin in weight ratio of 1:1 to 1:5, OR f. the guest/host inclusion complex comprises guest folpet and host methylated β-cyclodextrin in weight ratio of 1:2.

7. A pesticidal delivery system comprising the agrochemically active pesticidal complex of claim 1 and a pesticide not reacted with the cyclodextrin.

8. The pesticidal delivery system of claim 7, wherein the pesticidal delivery system is prepared by:

a. preparing a suspension of pesticide in the presence of cyclodextrin and water, and stirring the resulting suspension until reaction of formation of the agrochemically active pesticidal complex is complete, removing water without removing the non-reacted pesticide, wherein the complex comprises the same pesticide active ingredient as the non-reacted pesticide, b. (i) homogenizing cyclodextrin and pesticide in dry powder form to obtain a mixture, (ii) adding w ter to the powder mixture of step (i), and (iii) allowing the homogenized powder to form a thick, concentrated suspension by a pestle at room temperature and thoroughly homogenized by pestle to form the agrochemically active pesticidal complex, c. homogenizing cyclodextrin and pesticide in form of dry powder, adding water to the powder mixture in small portions, such that the powder forms a thick, concentrated suspension in form of dry powder by a pestle at room temperature, homogenizing thoroughly by pestle to form the agrochemically active pesticidal complex, freezing and lyophilizing the homogenized suspension to obtain a freeze-dried composition, and optionally, grounding the freeze-dried composition to fine powder, d. suspending one or more pesticides in form of dry powder into a cyclodextrin solution in water to form the agrochemically active pesticidal complex, and isolating the complex and the non-reacted pesticide, or e. homogenizing the pesticide and cyclodextrin in form of dry powder to obtain a physical powder mixture blend of the agrochemically active pesticidal complex, adding water to the powder, homogenizing to form a concentrated suspension and drying the concentrated suspension.

9. The pesticidal delivery system of claim 8, wherein:

a. the pesticidal delivery system is prepared by preparing a suspension of pesticide in the presence of cyclodextrin and water, and stirring the resulting suspension until reaction of formation of the agrochemically active pesticidal complex is complete, removing water without removing the non-reacted pesticide, wherein the complex comprises the same pesticide active ingredient as the non-reacted pesticide, wherein water is removed by lyophilization, spray drying, vacuum drying, film drying, heating, or any combination thereof wherein the non-reacted pesticide is not removed, b. the pesticidal delivery system is prepared by (i) homogenizing cyclodextrin and pesticide in dry powder form to obtain a mixture, (ii) adding water to the powder mixture of step (i), and (iii) allowing the homogenized powder to form a thick, concentrated suspension by a pestle at room temperature and thoroughly homogenized by pestle to form the agrochemically active pesticidal complex, and wherein:

i. the concentrated suspension is dried by vacuum drying, or ii. the concentrated suspension is dried by vacuum drying and the dried composition is ground to fine powder, or c. the pesticidal delivery system is prepared by suspending one or more pesticides in form of of dry powder into a cyclodextrin solution in water to form the agrochemically active pesticidal complex, and isolating the complex and the non-reacted pesticide, wherein the removal of water and the non-reacted pesticide is carried by lyophilization or drying.

10. The pesticidal delivery system of claim 7, wherein:

a. the pesticide interacts with the cyclodextrin through intermolecular forces;

b. the pesticide interacts non-covalently with the cyclodextrin and/or c. the pesticide interacts with the cyclodextrin through ionic interactions, and/or d. the pesticide active ingredient interacts with the cyclodextrin through hydrogen bonds, and/or e. the pesticide interacts with the cyclodextrin through dipole-dipole interactions, and/or f. the pesticide interacts with the cyclodextrin through van der Waals interactions, and/or g. the pesticide interacts with the cyclodextrin through adsorption interactions, and/or h. the pesticide is complexed with the cyclodextrin, i. the pesticide is encapsulated by or within the cyclodextrin, j. the pesticidal delivery system comprises between 20% and 90% of the pesticide reacted with cyclodextrin in the agrochemically active pesticidal complex, and between 10% and 80% of the pesticide not reacted with cyclodextrin, k. cyclodextrin is selected from the group consisting of α-cyclodextrin, β-cyclodextrin, γ-cyclodextrin and any combination thereof, and/or l. molecules of pesticide active ingredient are adsorbed on cyclodextrin molecules, and wherein the pesticidal delivery system is free of surfactants, organic solvent, adjuvants, wetting agents, spreading agents or penetrants.

11. The pesticidal delivery system of claim 7, wherein the cyclodextrin is:

a. methylated β-cyclodextrin, b. 2-hydroxypropyl-β-dextrin, c. an alkylated cyclodextrin wherein hydroxy groups of the cyclodextrin are alkylated with a C1-C5 alkyl group, d. an alkylated cyclodextrin wherein an alkyl group is substituted with hydroxyl group, e. an alkylated cyclodextrin wherein an alkyl group or hydroxyl group is substituted with sulfonic acid salt selected from the group consisting of sodium, aluminum, potassium, calcium, and ammonium salts and/or the sulphonic acid salt comprising four methylene units, f. methyl derivative of cyclodextrin, g. hydroxypropyl derivative of cyclodextrin, h. quaternary ammonium derivative of cyclodextrin, i. sulfo-butyl ether derivative of cyclodextrin, j.

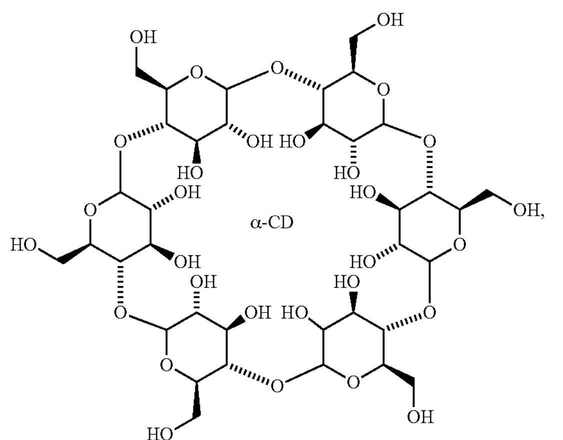

α-CD k.

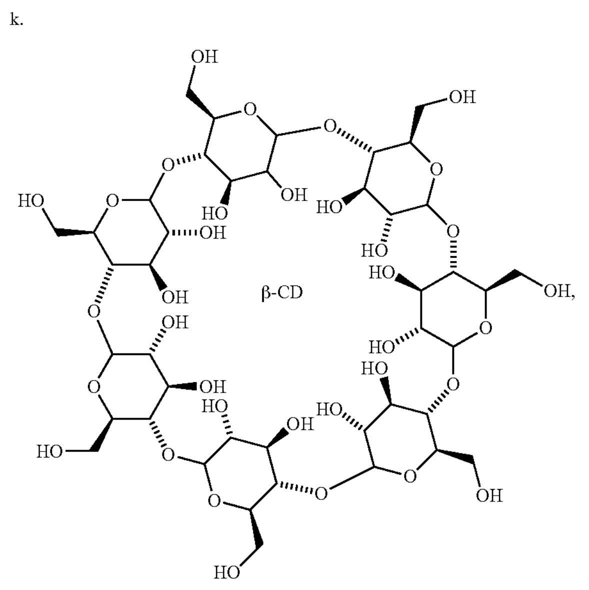

β-CD l.

-continued

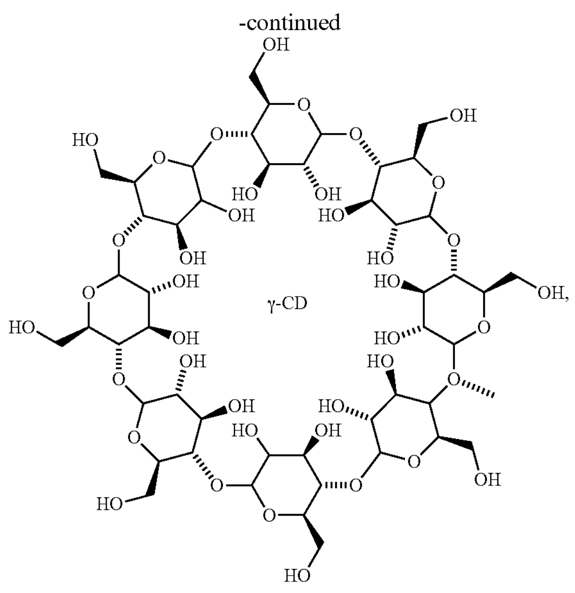

m.

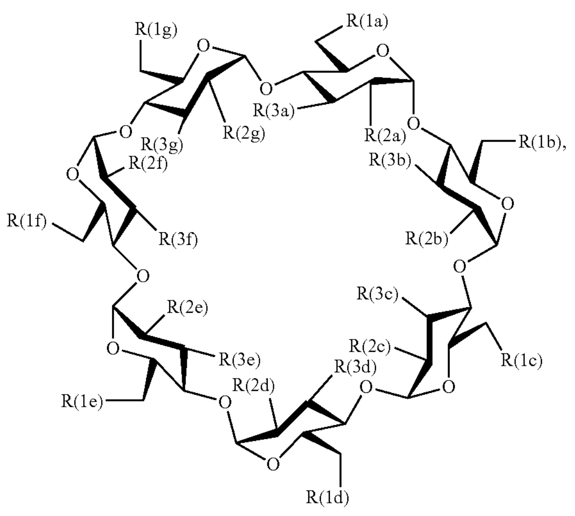

wherein R(1a-f), R(2a-f), R(3a-f) is independently —OH or —O—CH2-CH(OH)—CH3

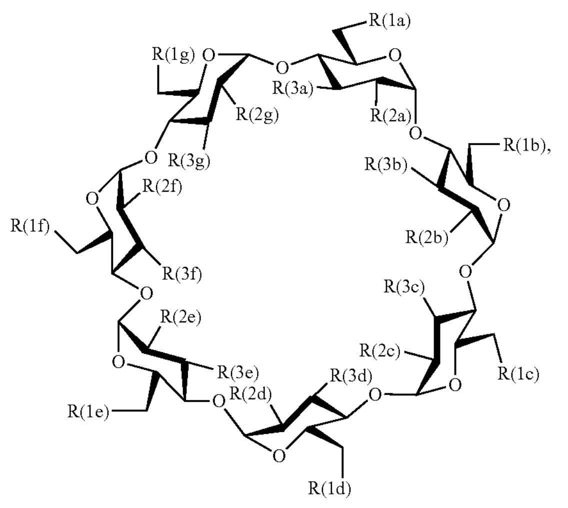

wherein R(1a-f), R(2a-f), R(3a-f) is independently —OH or —O—CH2-CH2-CH2-CH2-SO3Na, or

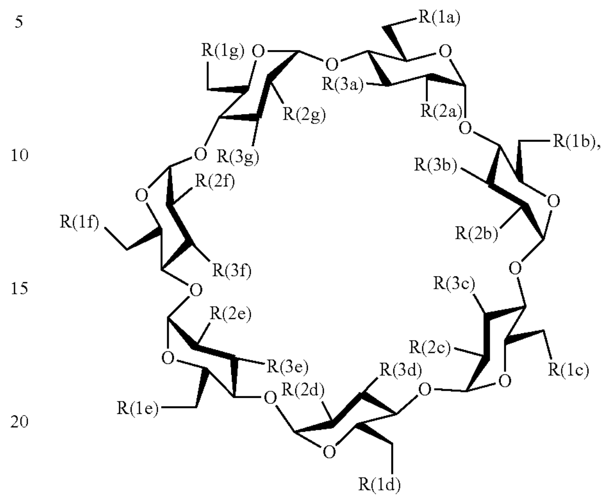

wherein R(1a-f), R(2a-f), R(3a-f) is independently —OH or —O—CH3.

12. A pesticidal delivery system comprising (i) an amount of at least one pesticide selected from the group consisting of dithiocarbamate fungicide, oxadiazine insecticide, semicarbazone insecticide, dinitroaniline herbicide and any combination thereof, and (ii) at least one cyclodextrin, wherein 20%-90% of the pesticide interacts with the cyclodextrin, and 10%-80% of the pesticide is not reacted with the cyclodextrin, and the pesticidal delivery system is free of surfactants, organic solvent, suspending agents or other adjuvants, selected from ionic, or non-ionic surfactant, wetting agents, spreading agents and penetrants, and wherein the pesticide in form of a solid substance interact with cyclodextrin in the absence of an organic solvent.

13. A pesticidal composition comprising the pesticidal complex of claim 1 and water.

14. The pesticidal composition of claim 13, wherein:

a. the concentration of cyclodextrin in the composition is between 0.1 to 20 g/kg, b. the concentration of the pesticide in the composition is between 0.1 to 20 g/kg, c. the amount of the cyclodextrin in the composition is 10 to 90% by weight based on the total weight of the composition, d. the amount of the pesticide in the composition is 10 to 50% by weight based on the total weight of the composition, e. the pesticidal composition is free of adjuvants, f. the composition further comprises an agriculturally acceptable carrier, one or more additional agrochemicals and/or one or more agricultural additive, and/or g. the cyclodextrin is selected from the group consisting of α-cyclodextrin, β-cyclodextrin, γ-cyclodextrin and any combination thereof.

15. The pesticidal composition of claim 13, wherein the cyclodextrin is:

a. methylated β-cyclodextrin, b. 2-hydroxypropyl-β-dextrin, c. a. an alkylated cyclodextrin wherein, hydroxy groups of the cyclodextrin are alkylated with a C1-C5 alkyl group, d. an alkylated cyclodextrin wherein, an alkyl group is substituted with hydroxyl group, e. an alkylated cyclodextrin wherein, an alkyl group or hydroxyl group is substituted with sulfonic acid salt selected from sodium, aluminum, potassium, calcium, and ammonium salts and/or the sulphonic acid salt comprising four methylene units, f. methyl derivative of cyclodextrin, g. hydroxypropyl derivative of cyclodextrin, h. quaternary ammonium derivative of cyclodextrin, i. sulfo-butyl ether derivative of cyclodextrin, or j.

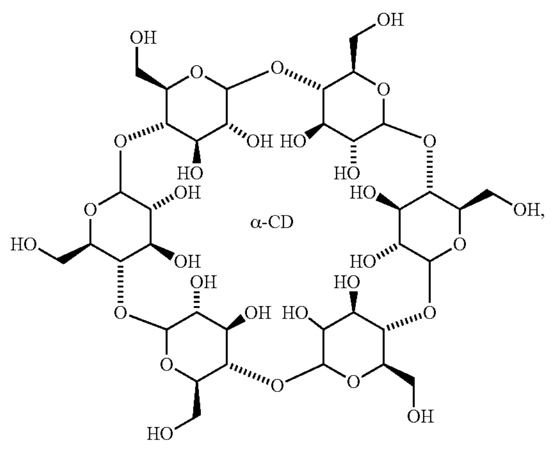

k.

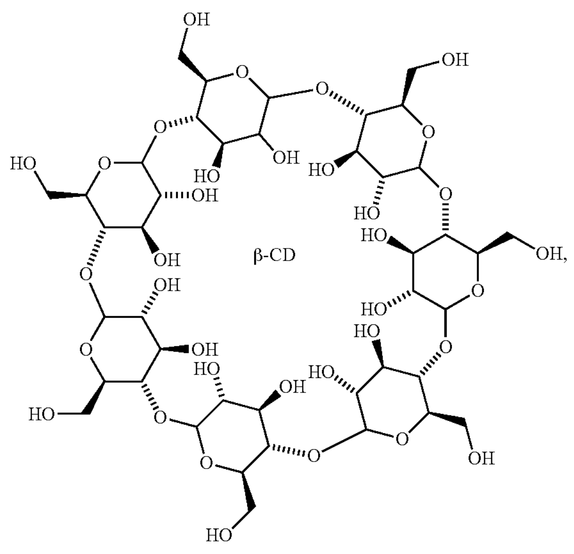

l.

-continued

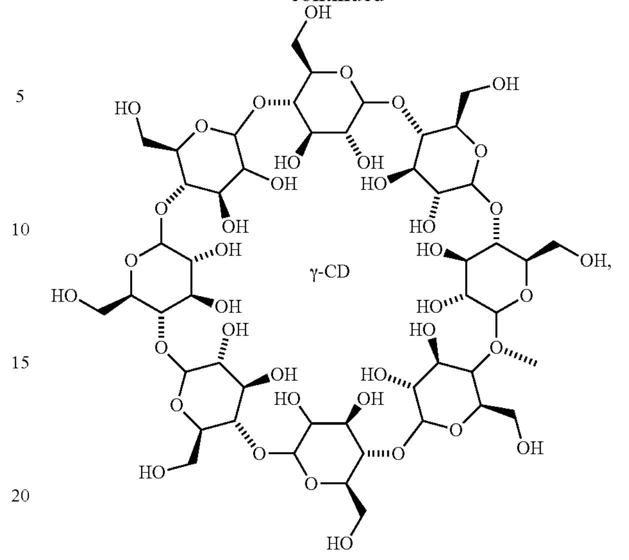

m.

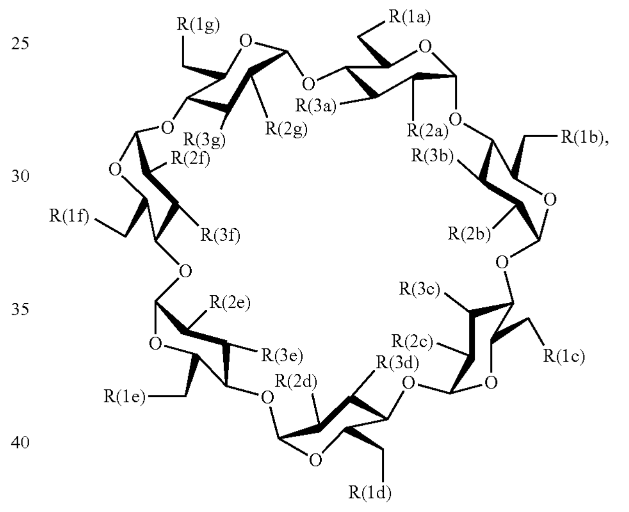

wherein R(1a-f), R(2a-f), R(3a-f) is independently —OH or —O—CH2-CH(OH)—CH3

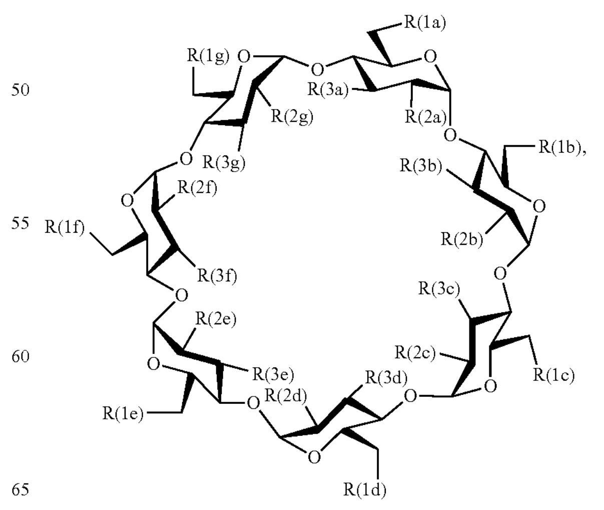

wherein R(1a-f), R(2a-f), R(3a-f) is independently —OH or —O—CH2-CH2-CH2-CH2-SO3Na, or

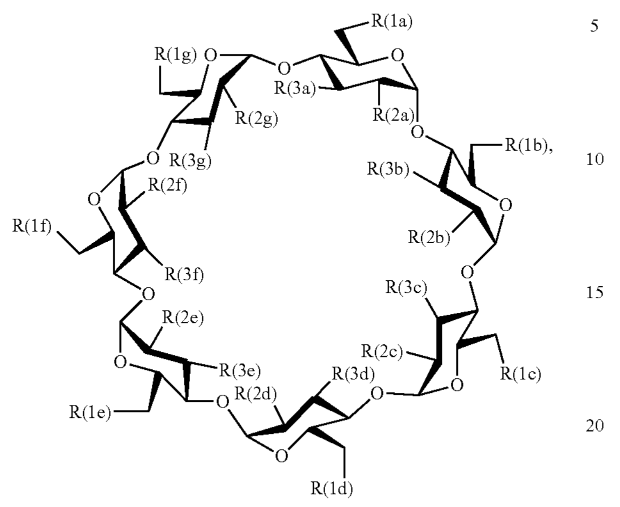

wherein R(1a-f), R(2a-f), R(3a-f) is independently —OH or —O—CH3.

16. A process for preparing the pesticidal composition of claim 13, wherein the process comprises (i) complexing interacting the pesticide in form of solid substance within the cyclodextrin in the absence of an organic solvent to form a pesticide-cyclodextrin inclusion complex, and (ii) dissolving or diluting the pesticide-cyclodextrin inclusion complex in an aqueous carrier to form the pesticidal composition.

17. A method for controlling pest using a pesticide comprising applying the agrochemically active pesticidal complex of claim 1 to a plant or soil.

18. A process for preparing a composition comprising the pesticidal delivery system of claim 12, wherein the process comprises dissolving or diluting the pesticidal delivery system in an aqueous carrier to form a composition, wherein the pesticidal delivery system is prepared by a water process and said system comprises:

a. an amount of one or more pesticides selected from dithiocarbamate fungicide, oxadiazine insecticide, semicarbazone insecticide and dinitroaniline herbicide and any combination thereof, and b. one or more cyclodextrins such that the weight or molar ratio between the pesticide and the cyclodextrin is from 1:1 to 1:50, c. wherein molecules of the pesticide are partially interacted with molecules of the cyclodextrin through intermolecular force(s), partially interacted chemically with molecules of the cyclodextrin(s), partially adsorbed chemically with molecules of the cyclodextrin(s), or partially non-covalently interacted with molecules of the cyclodextrin through intermolecular force(s), such that from 20% to 90% of the molecules of the pesticide are interacted with the molecules of the cyclodextrin(s), hereinafter referred to as "pesticidal complex", d. such that the pesticide delivery system comprises pesticide, pesticidal complex, and cyclodextrin, in which the pesticidal complex is free of organic solvents and the cyclodextrin acts as a built-in adjuvant for the pesticide, and the pesticide delivery system is free of additional adjuvants or other additives for increasing the activity of the pesticide, wherein the process comprises:

i. a suspension method by preparing a physical powder mixture blend or ii. a kneading method by preparing a physical powder mixture blend, iii. isolating, drying or removing water and iv. grinding to powder, which process comprises:

(a) dissolving or suspending the cyclodextrin in water to prepare a solution, adding pesticide to the solution thus obtained, to prepare a suspension, and stirring t e thus obtained suspension, or (b) preparing a suspension comprising the pesticide and the cyclodextrin and adding water to the suspension and stirring the suspension, or (c) suspending pesticide into a cyclodextrin solution, and isolating the complex and the nonreacted pesticide without removing the non-reacted pesticide, or (d) homogenizing the cyclodextrin and the pesticide in dry powder form to obtain a mixture, adding water to the powder mixture thus obtained and allowing the homogenized powder to form a thick, concentrated suspension such as by a pestle at room temperature and thoroughly homogenized such as by pestle, (e) after the pesticide is partially interacted with the cyclodextrin, removing the water, wherein water is removed, using drying techniques such as, lyophilization such as freeze drying, spray drying, film drying, heating, vacuum drying and any combination thereof, without removing the non-reacted pesticide, or isolating of the complex and the non-reacted pesticide by lyophilization or drying, and (f) grinding to powder, to obtain the pesticide delivery syst m comprising the pesticidal complex, the non-reacted pesticide and the cyclodextrin as a built-in adjuvant for the pesticide, optionally in a package.

19. A pesticide delivery system prepared by the process of claim 18, wherein the pesticide delivery system comprises:

a. one or more pesticides;

b. a pesticidal complex comprising an amount of the one or more pesticides and of cyclodextrin, which pesticidal complex is free of organic solvents and free of additional adjuvants or other additives for increasing activity of the pesticide, and c. cyclodextrin;

wherein the pesticide is selected from the group consisting of dithiocarbamate fungicide, oxadiazine insecticide, semicarbazone insecticide, dinitroaniline herbicide and any combination thereof wherein the weight or molar ratio between the pesticide and the cyclodextrin is from 1:1 to 1:50 and wherein the pesticidal complex includes molecules of the pesticide adsorbed with molecules of the cyclodextrin, wherein:

i. the dithiocarbamate fungicide is selected from the group consisting of mancozeb, zineb, thiram, ziram, ferbam, metiram, propineb, maneb and any combination thereof, or ii. the dinitroaniline herbicide is selected from the group consisting benfluralin, butralin, chlornidine, dinitramine, dipropalin, ethalfluralin, fluchloralin, isopropalin, methalpropalin, nitralin, oryzalin, pendimethalin, prodiamine, profluralin and any combination thereof, and/or iii. the cyclodextrin is selected from a group consisting of α (alpha)-cyclodextrin, β (beta)-cyclodextrin, γ (gamma)-cyclodextrin and any combination thereof, wherein the pesticidal delivery system is optionally comprised within a package.

20. The pesticidal delivery system of claim 19, wherein:

a. the dithiocarbamate fungicide is mancozeb, b. the oxadiazine insecticide is indoxacarb, c. the semicarbazone insecticide is metaflumizone, d. the dinitroaniline herbicide other than trifluanilin, e. the dinitroaniline herbicide is pendimethalin, f. the cyclodextrin is substituted with one or more alkyl group, an alkyl group, and/or a C1-C5 alkyl group, wherein the alkyl group is substituted with a hydroxyl group or sulfobutyl salt, and/or g. the cyclodextrin is a methyl-betacyclodextrin, a hydroxypropyl-beta-cyclodextrin, a sulfobutylether-beta-cyclodextrin or has one or more of the following structures:

h.

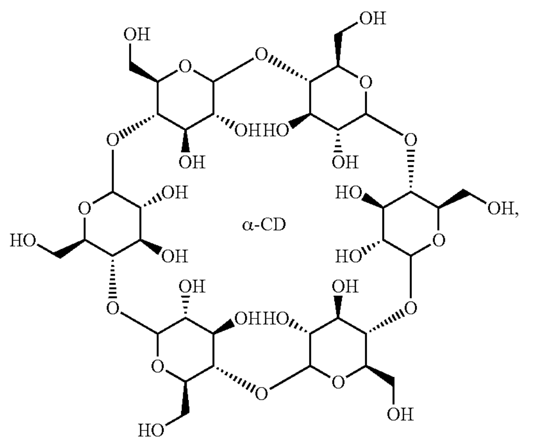

i.

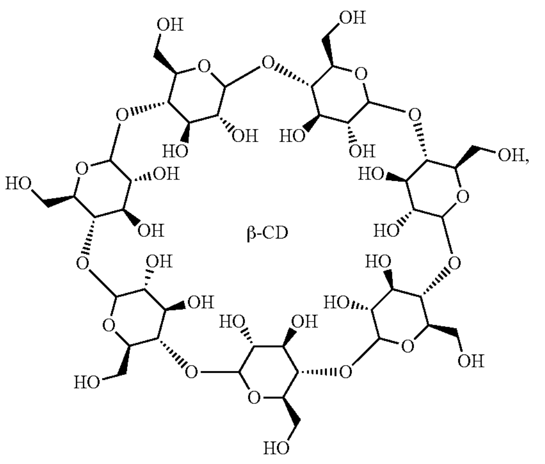

-continued j.

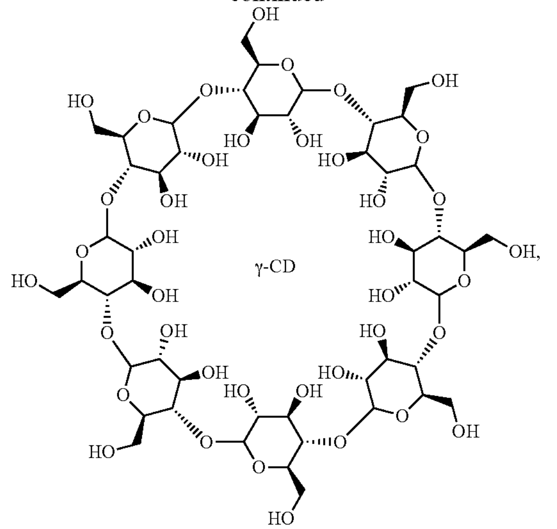

k.

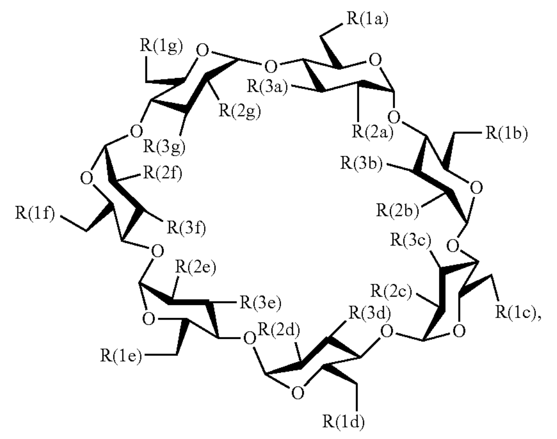

wherein R(1a-f), R(2a-f), R(3a-f) is independently —OH or —O—CH2-CH(OH)—CH3 l.

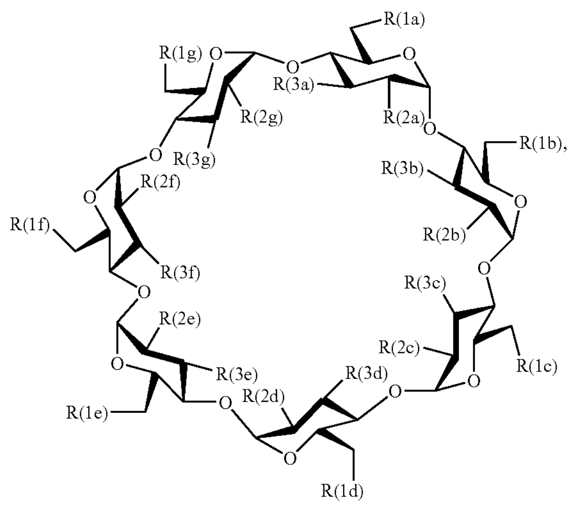

wherein R(1a-f), R(2a-f), R(3a-f) is independently —OH or —O—CH2 CH2-CH2-CH2-SO3Na, or

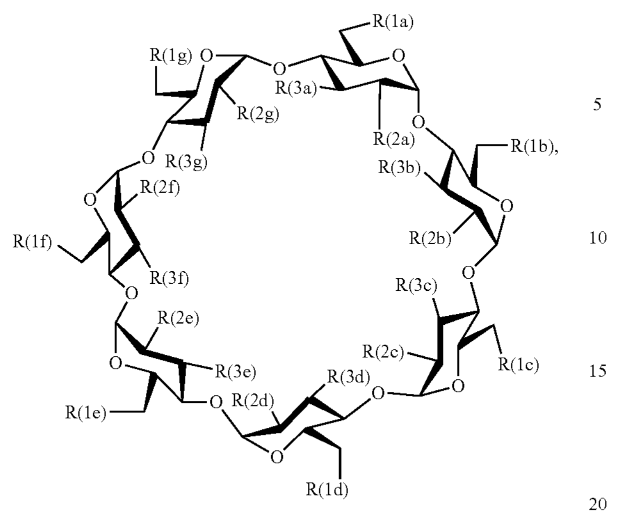
wherein R(1a-f), R(2a-f), R(3a-f) is independently —OH or —O—CH3.
* * * * *